(12) United States Patent
Almeida Dominguez et al.

(10) Patent No.: US 11,596,155 B2
(45) Date of Patent: Mar. 7, 2023

(54) METHOD FOR MANUFACTURING A FOOD PRODUCT, A FOOD PRODUCT PRODUCED BY A FOOD PRODUCT MANUFACTURING SYSTEM, AND FOOD PRODUCT MANUFACTURING SYSTEM

(71) Applicant: Kellogg Company, Battle Creek, MI (US)

(72) Inventors: Helbert David Almeida Dominguez, Battle Creek, MI (US); Stephen Vanos, Battle Creek, MI (US)

(73) Assignee: KELLOGG COMPANY, Battle Creek, MI (US)

(*) Notice: Subject to any disclaimer, the term of this patent is extended or adjusted under 35 U.S.C. 154(b) by 558 days.

(21) Appl. No.: 15/380,538

(22) Filed: Dec. 15, 2016

(65) Prior Publication Data
US 2017/0172159 A1    Jun. 22, 2017

Related U.S. Application Data

(60) Provisional application No. 62/269,291, filed on Dec. 18, 2015.

(51) Int. Cl.
*A21D 13/00* (2017.01)
*A21C 3/02* (2006.01)
(Continued)

(52) U.S. Cl.
CPC .............. *A21D 13/00* (2013.01); *A21C 3/024* (2013.01); *A21C 9/04* (2013.01); *A21C 9/08* (2013.01); *A21D 13/22* (2017.01); *A23P 20/20* (2016.08)

(58) Field of Classification Search
CPC ............ A21D 13/00; A21C 3/024; A21C 9/08
See application file for complete search history.

(56) References Cited

U.S. PATENT DOCUMENTS 2,099,614 A * 11/1937 Marsden ................ A21C 11/10
                                                         425/299
2,121,128 A    6/1938 Loose et al.
(Continued)

FOREIGN PATENT DOCUMENTS

DE    2414177    9/1975
EP    1164855    1/2002
(Continued)

OTHER PUBLICATIONS

PCT/USOO/08452 International Search Report dated Aug. 7, 2000.
PCT/US2016/066963 International Search Report dated Mar. 28, 2017.

*Primary Examiner* — Katherine D Leblanc
(74) *Attorney, Agent, or Firm* — Honigman LLP

(57) ABSTRACT

A method for manufacturing a food product includes depositing a first foodstuff; transporting the first foodstuff in a first driven direction; depositing a second foodstuff upon a portion of an upper surface of the first foodstuff; transporting the first foodstuff with the second foodstuff deposited thereupon in the first driven direction; separating the first foodstuff with the second foodstuff metered thereupon into a plurality of sheet segments; serially transporting each sheet segment of the plurality of sheet segments from the first driven direction to a second driven direction that is transverse to the first driven direction; compressing the serially transported sheet segments for forming a plurality of thickness segments including the first foodstuff and the second foodstuff that define an elongated, food product body; separating the elongated, food product body into a plurality of food product body units; and finishing the plurality of food product body units.

17 Claims, 19 Drawing Sheets

(51) Int. Cl.
  *A21C 9/08*  (2006.01)
  *A23P 20/20*  (2016.01)
  *A21D 13/22*  (2017.01)
  *A21C 9/04*  (2006.01)

(56) References Cited

U.S. PATENT DOCUMENTS

| | | |
|---|---|---|
| 2,687,699 A | 8/1954 | Oakes |
| 2,804,831 A | 9/1957 | Oakes |
| 2,851,966 A | 9/1958 | Oakes |
| 2,998,318 A | 8/1961 | Forkner |
| 3,250,626 A | 5/1966 | Thelen |
| 3,250,627 A | 5/1966 | Thelen |
| 3,317,323 A | 5/1967 | Lawrence |
| 3,656,967 A | 4/1972 | Barton et al. |
| 3,676,151 A | 7/1972 | Scharschmidt |
| 3,753,733 A | 8/1973 | Bell |
| 3,767,823 A | 10/1973 | Wheeler |
| 4,000,324 A | 12/1976 | Horn |
| 4,004,035 A | 1/1977 | Hirzel et al. |
| 4,612,198 A | 9/1986 | Wallin et al. |
| 4,618,498 A | 10/1986 | Thulin |
| 4,623,542 A | 11/1986 | Wallin et al. |
| 4,679,496 A | 7/1987 | Simelunas et al. |
| 4,741,916 A | 5/1988 | Heidel et al. |
| 4,761,290 A | 8/1988 | Meraj et al. |
| 4,832,970 A | 5/1989 | Maliy et al. |
| 5,036,756 A | 8/1991 | Lindee |
| 5,202,138 A | 4/1993 | Stypula |
| 5,405,626 A | 4/1995 | Van Der Graaf et al. |
| 5,514,397 A | 5/1996 | Shapiro |
| 6,048,556 A | 4/2000 | Sanguinetti et al. |
| 6,267,998 B1 | 7/2001 | Bauman et al. |
| 6,790,467 B2 * | 9/2004 | Kostival ............... A21D 6/001 426/128 |
| 6,858,241 B1 | 2/2005 | Kershman et al. |
| 2003/0113426 A1 | 6/2003 | Tence et al. |
| 2005/0175740 A1 | 8/2005 | McWatters et al. |
| 2013/0011523 A1 | 1/2013 | Belzowski et al. |
| 2015/0359257 A1 | 12/2015 | Meulendijks et al. |

FOREIGN PATENT DOCUMENTS

| | | |
|---|---|---|
| GB | 507859 | 6/1939 |
| GB | 523792 | 7/1940 |
| JP | S52-015880 | 2/1977 |
| JP | S61-040748 | 2/1986 |
| JP | H06-038562 | 5/1994 |
| JP | H10-174574 | 6/1998 |
| JP | H10-174575 | 6/1998 |
| JP | 2002-191343 | 7/2002 |
| JP | 2008-289377 A | 12/2008 |
| JP | 2013-521813 A | 6/2013 |
| WO | 9108671 | 6/1991 |
| WO | WO1995031905 A1 * | 11/1995 |
| WO | 9944428 | 9/1999 |
| WO | 2000/059309 | 10/2000 |

* cited by examiner

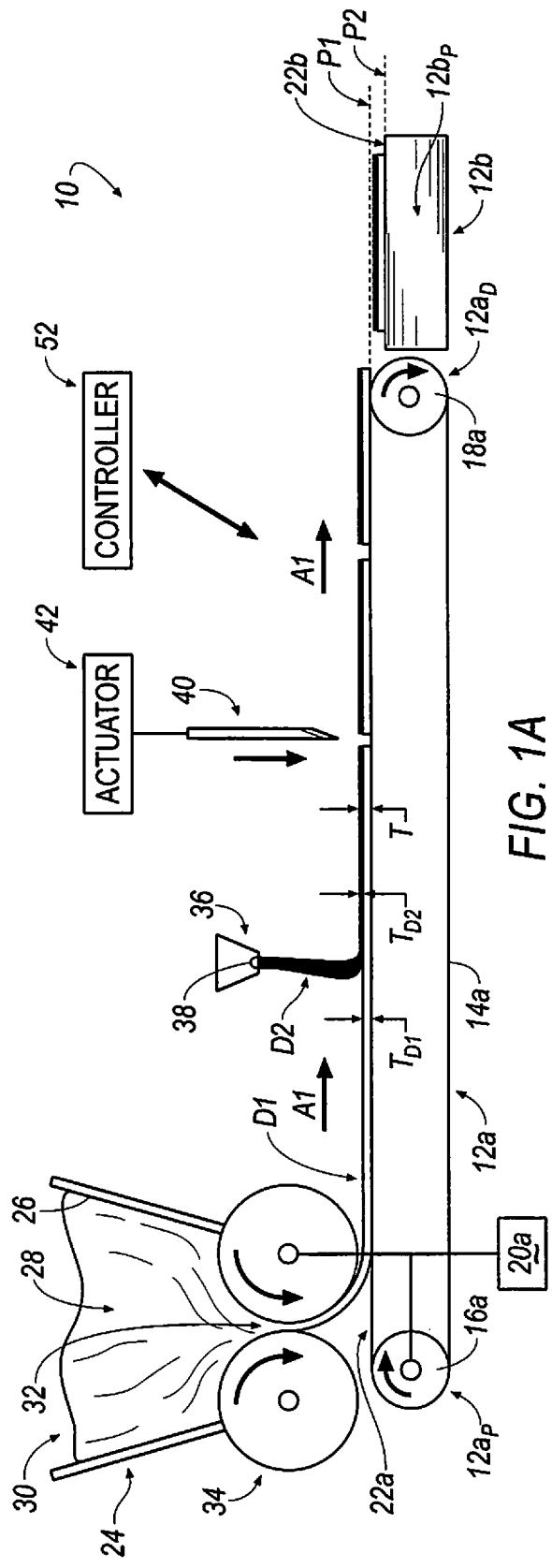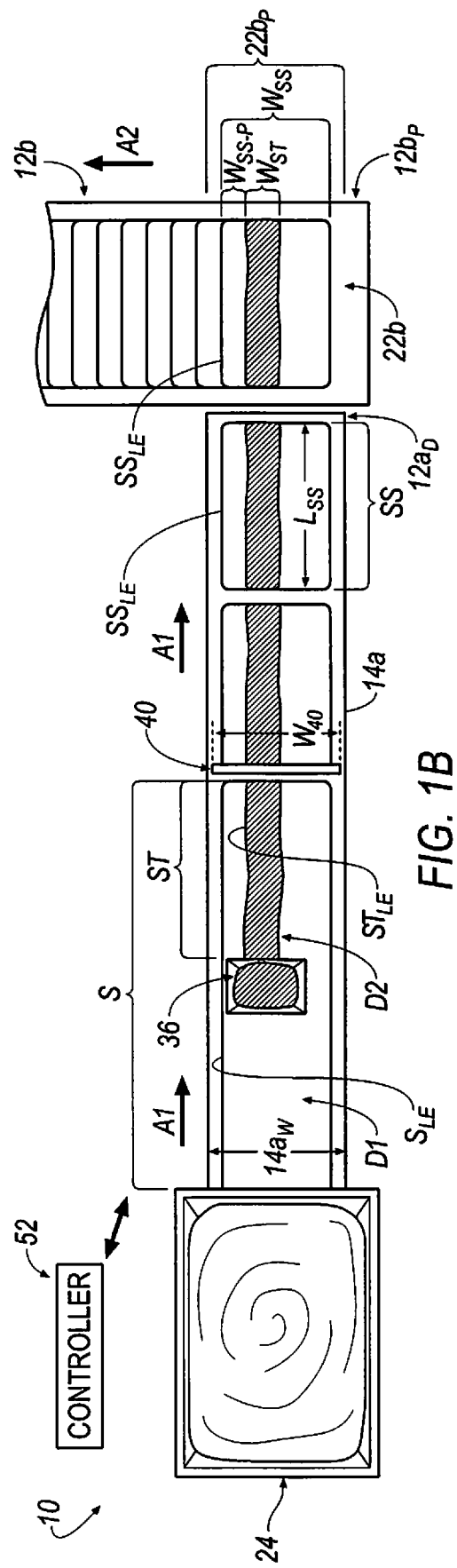
FIG. 1A
FIG. 1B

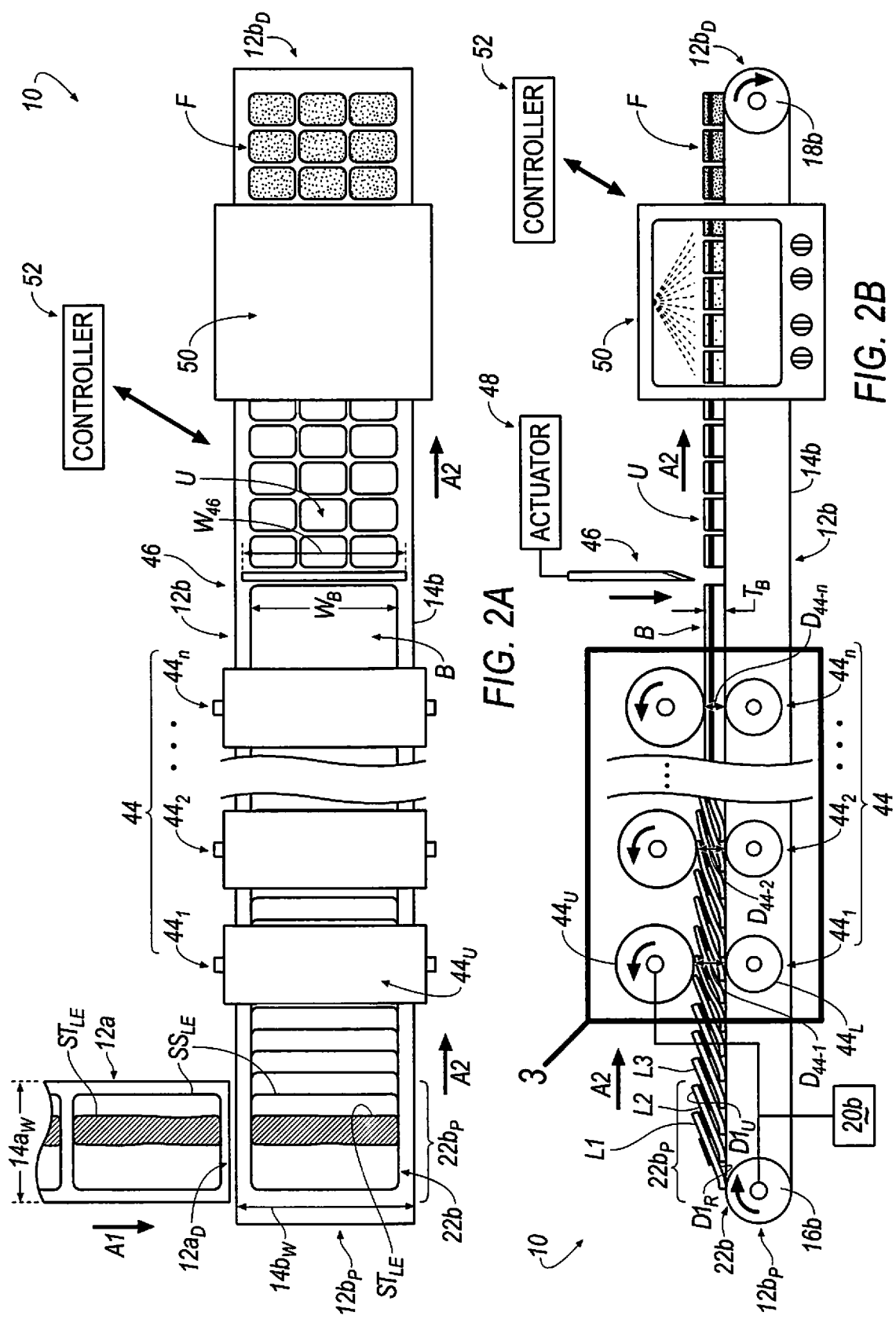

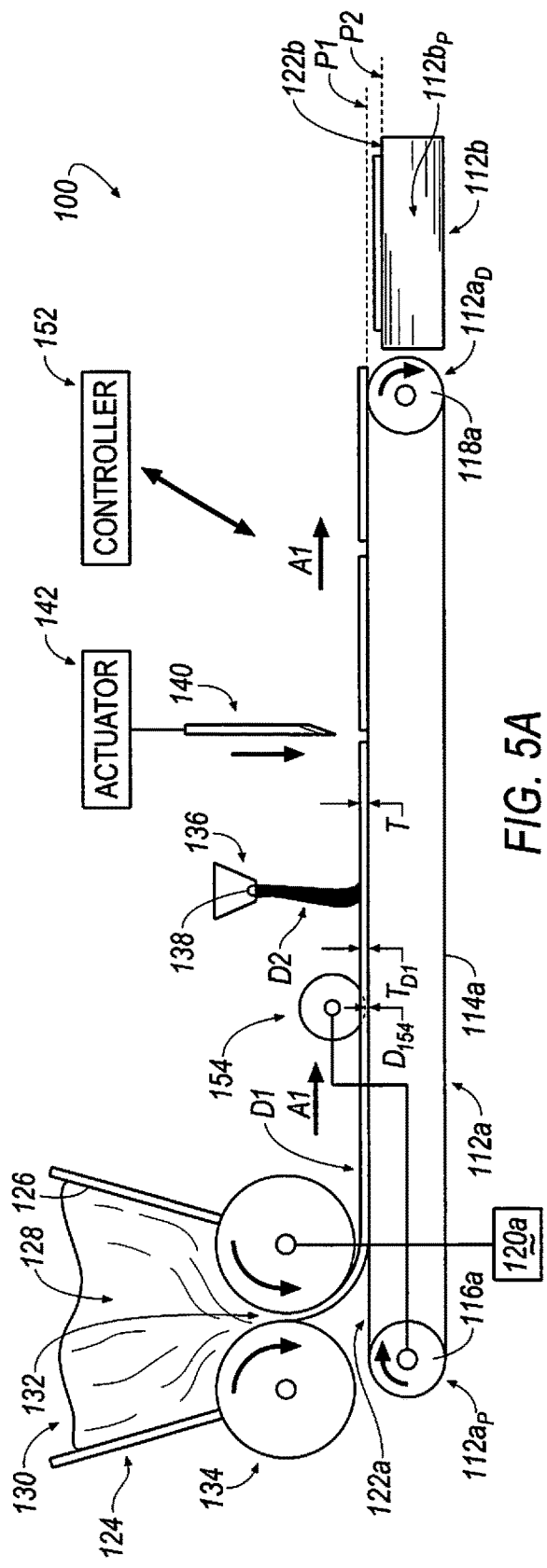
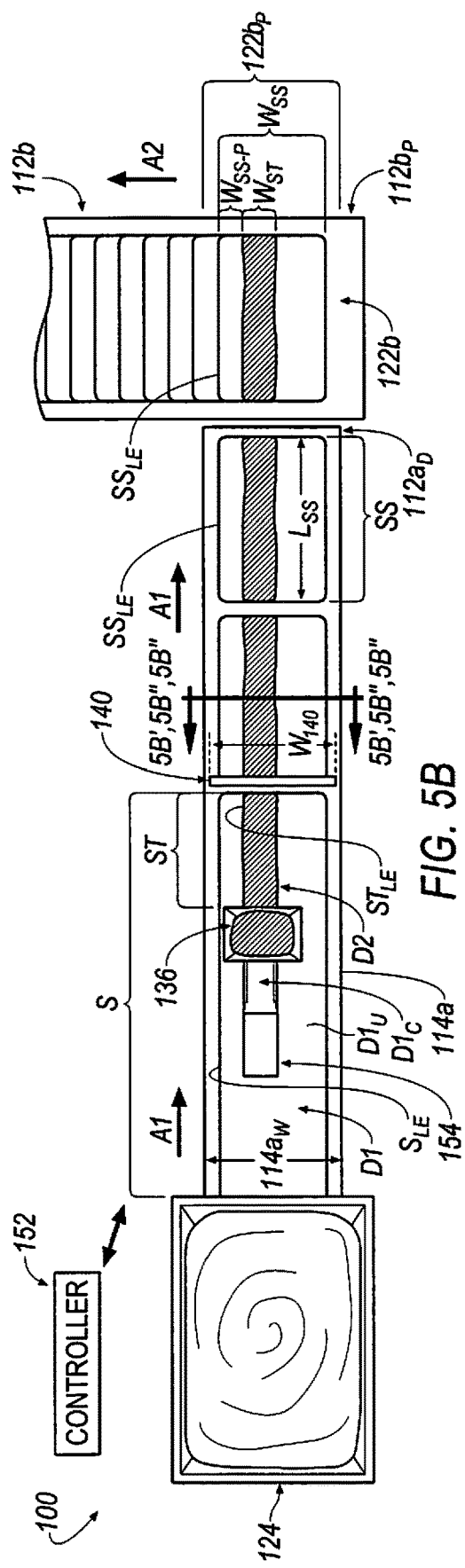

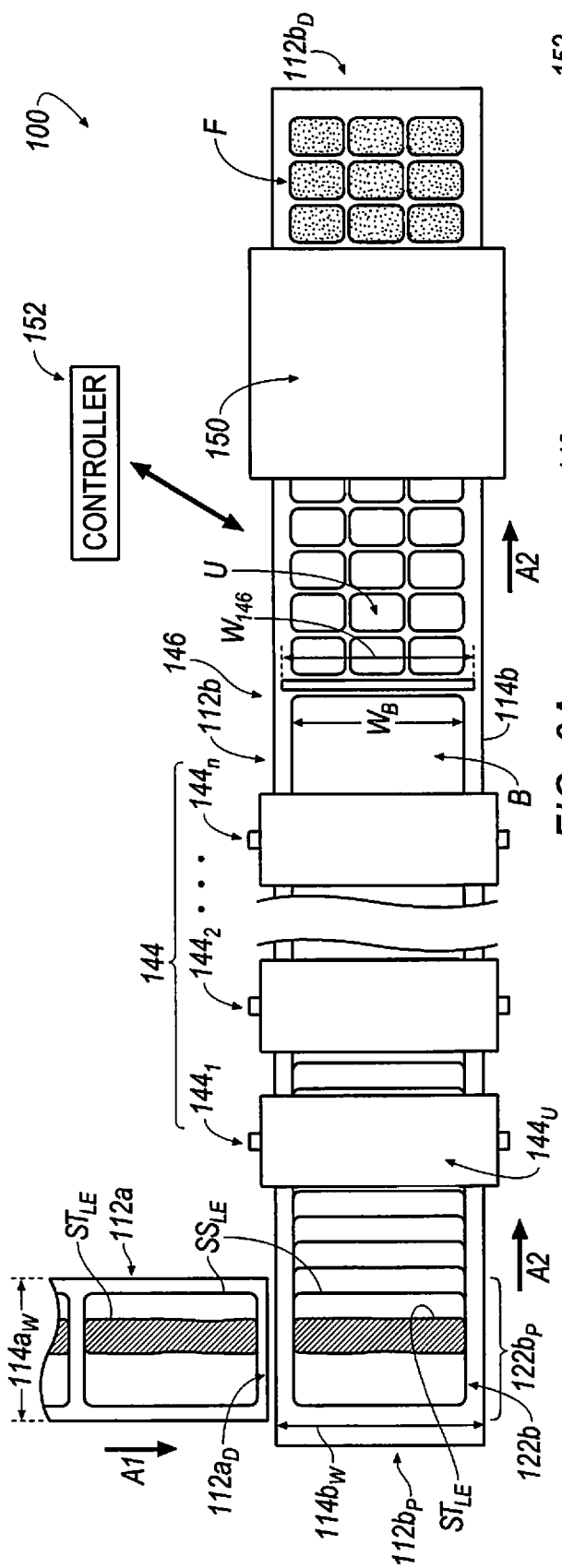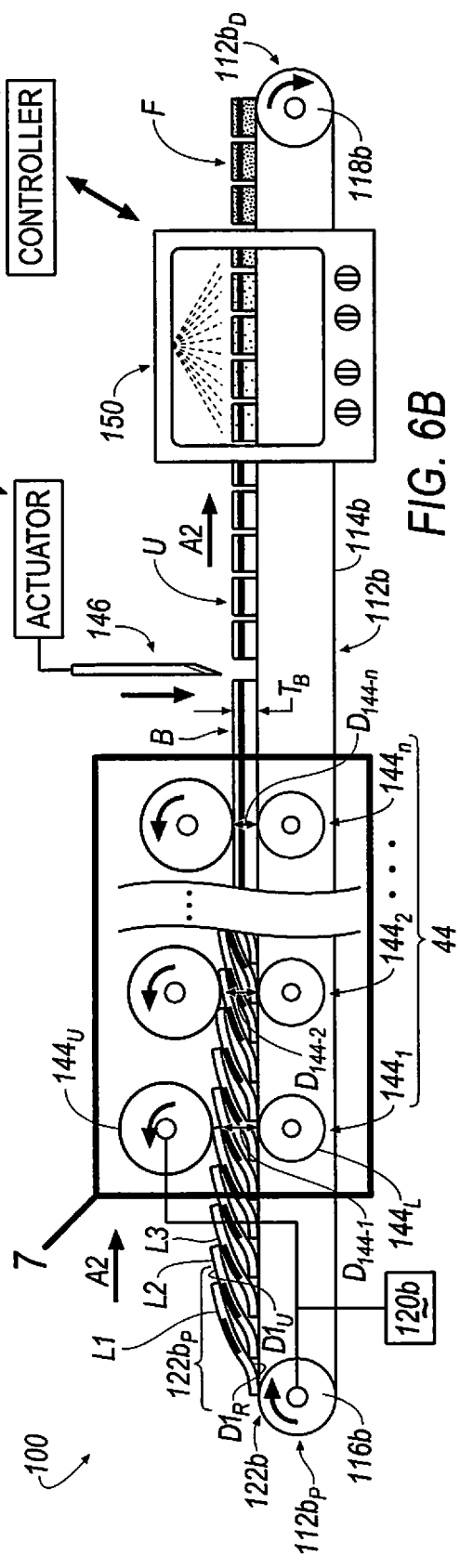

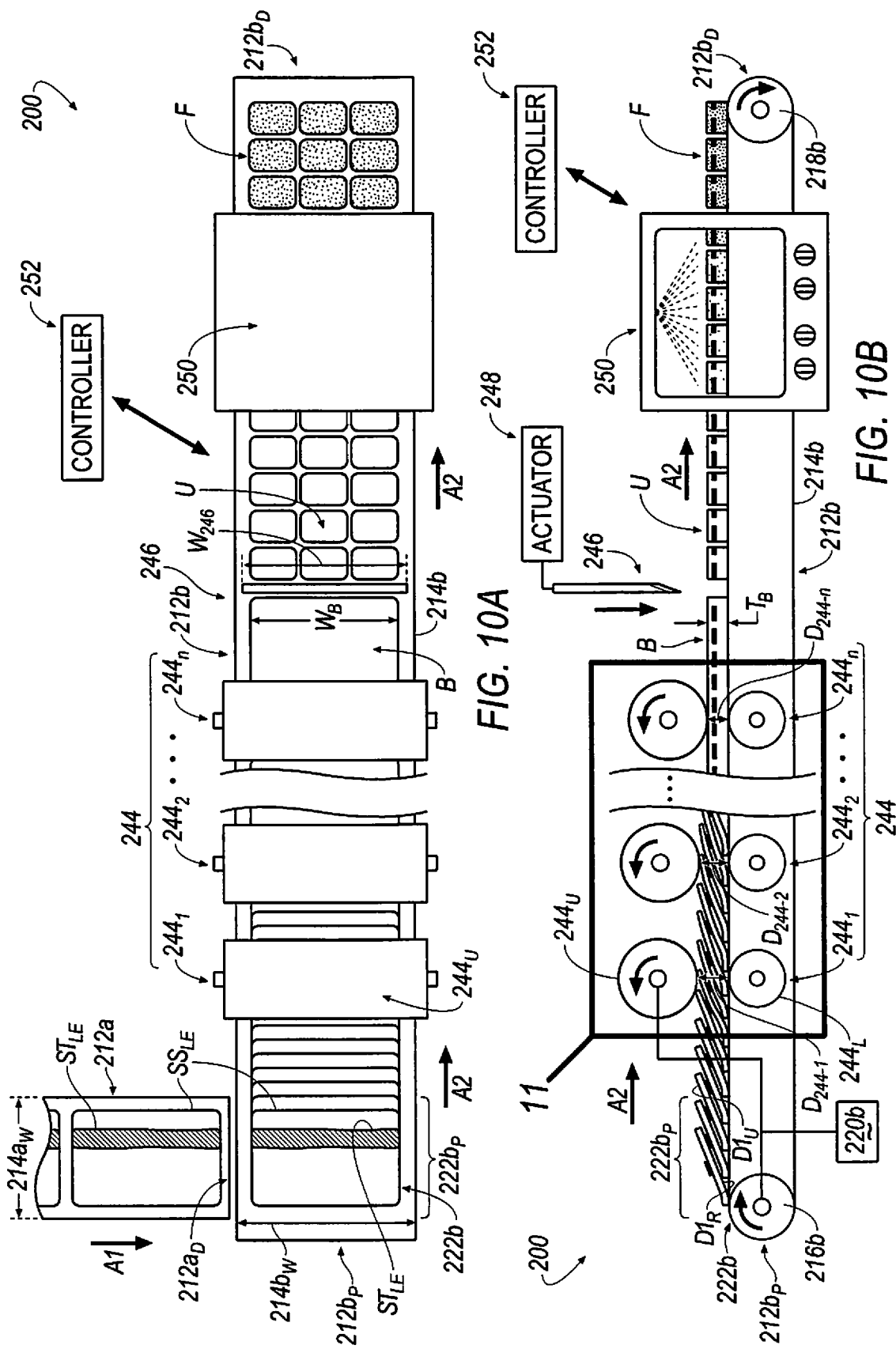

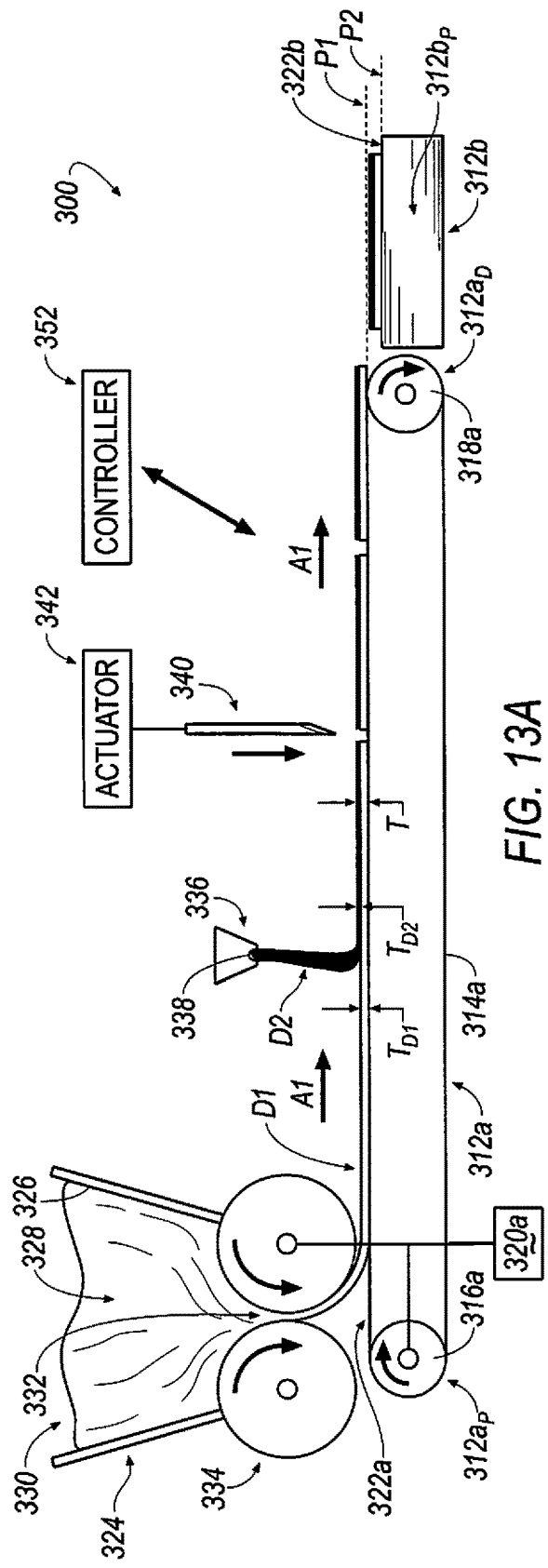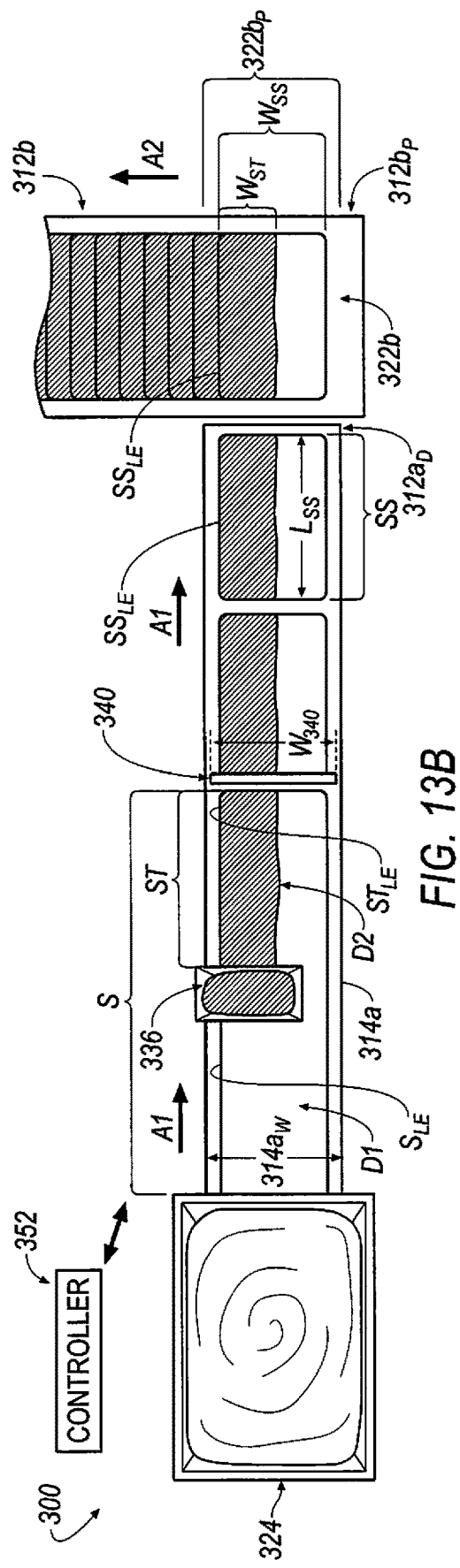
FIG. 13A
FIG. 13B

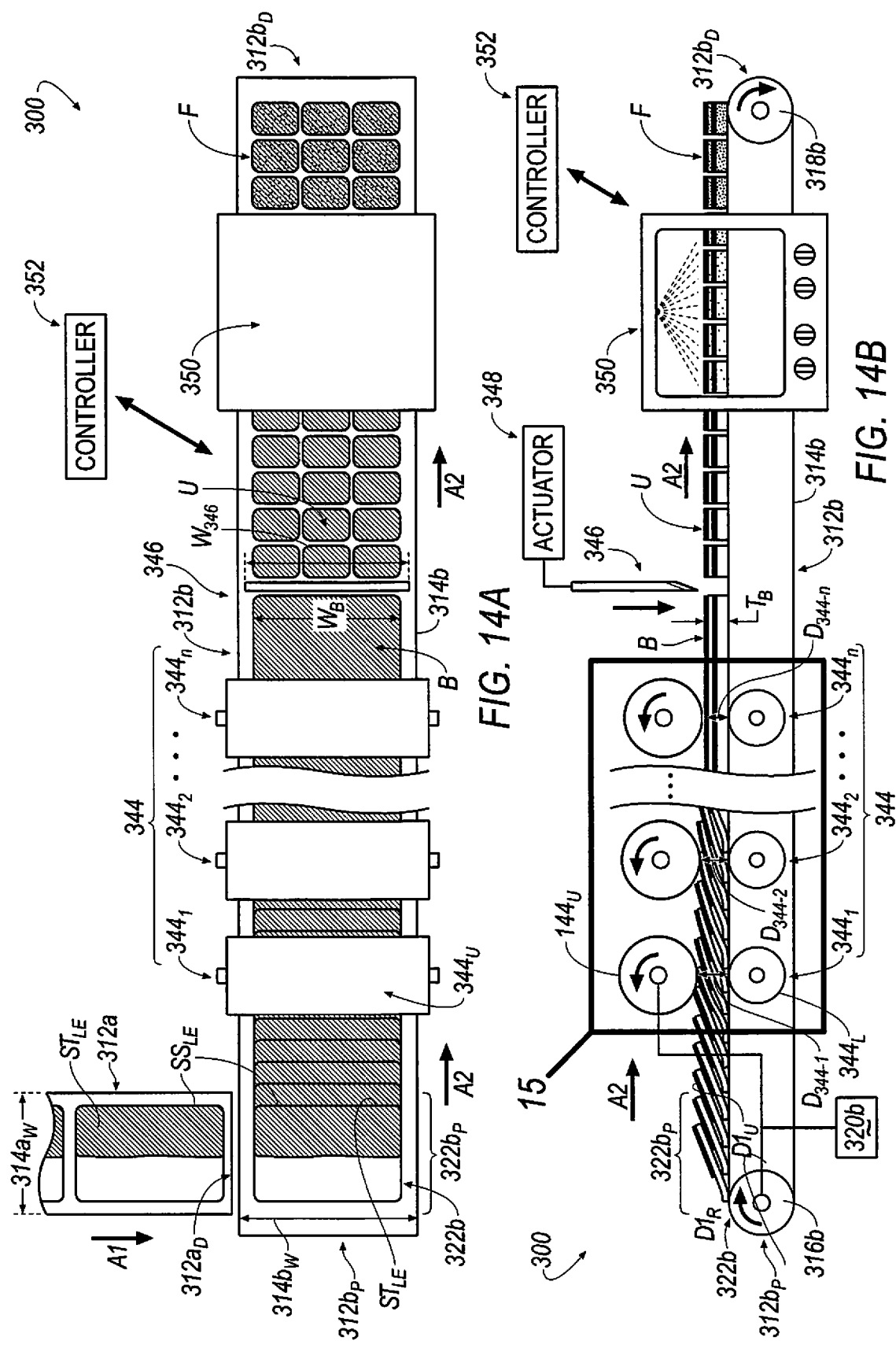

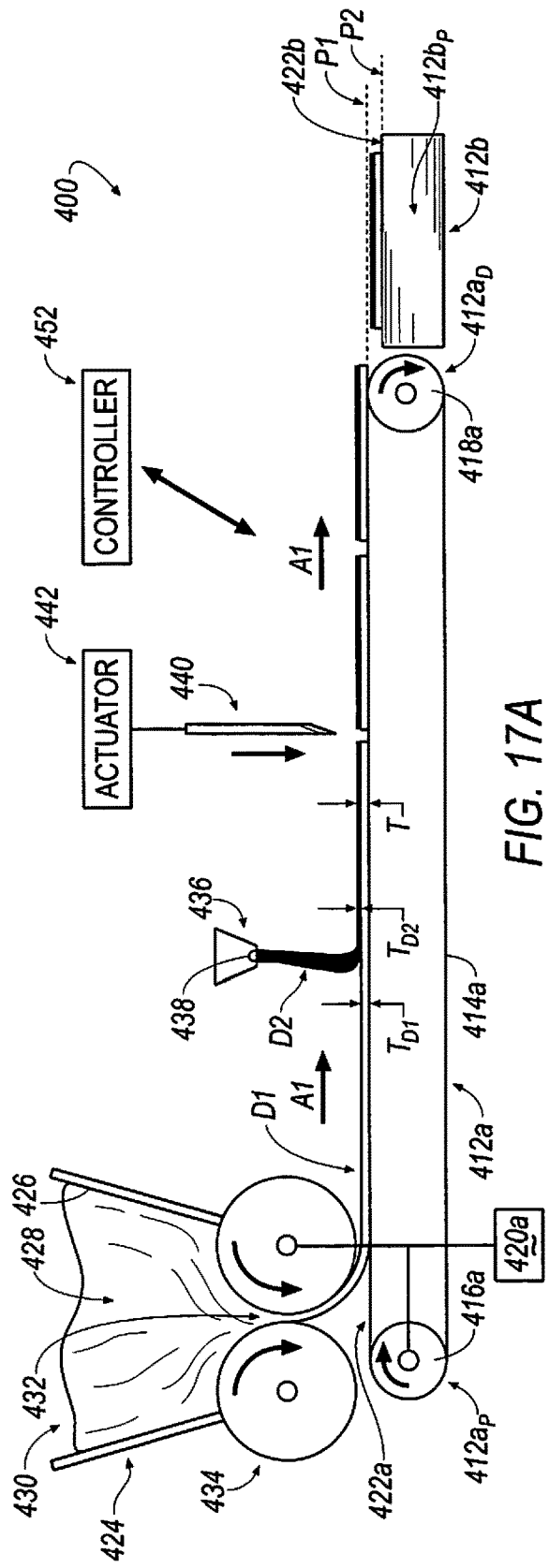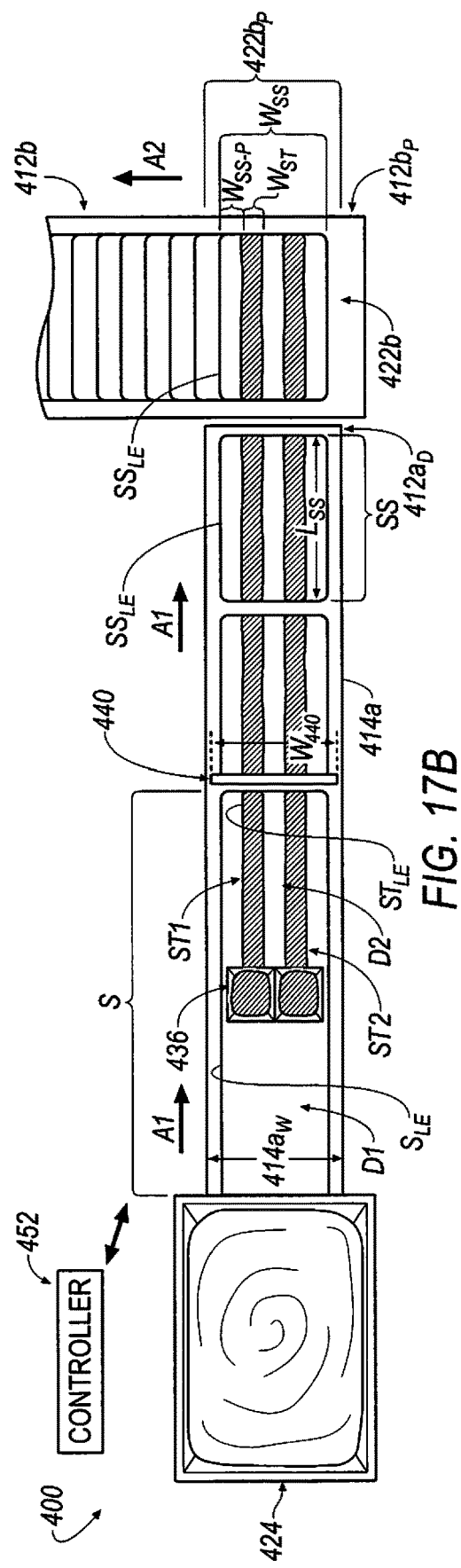

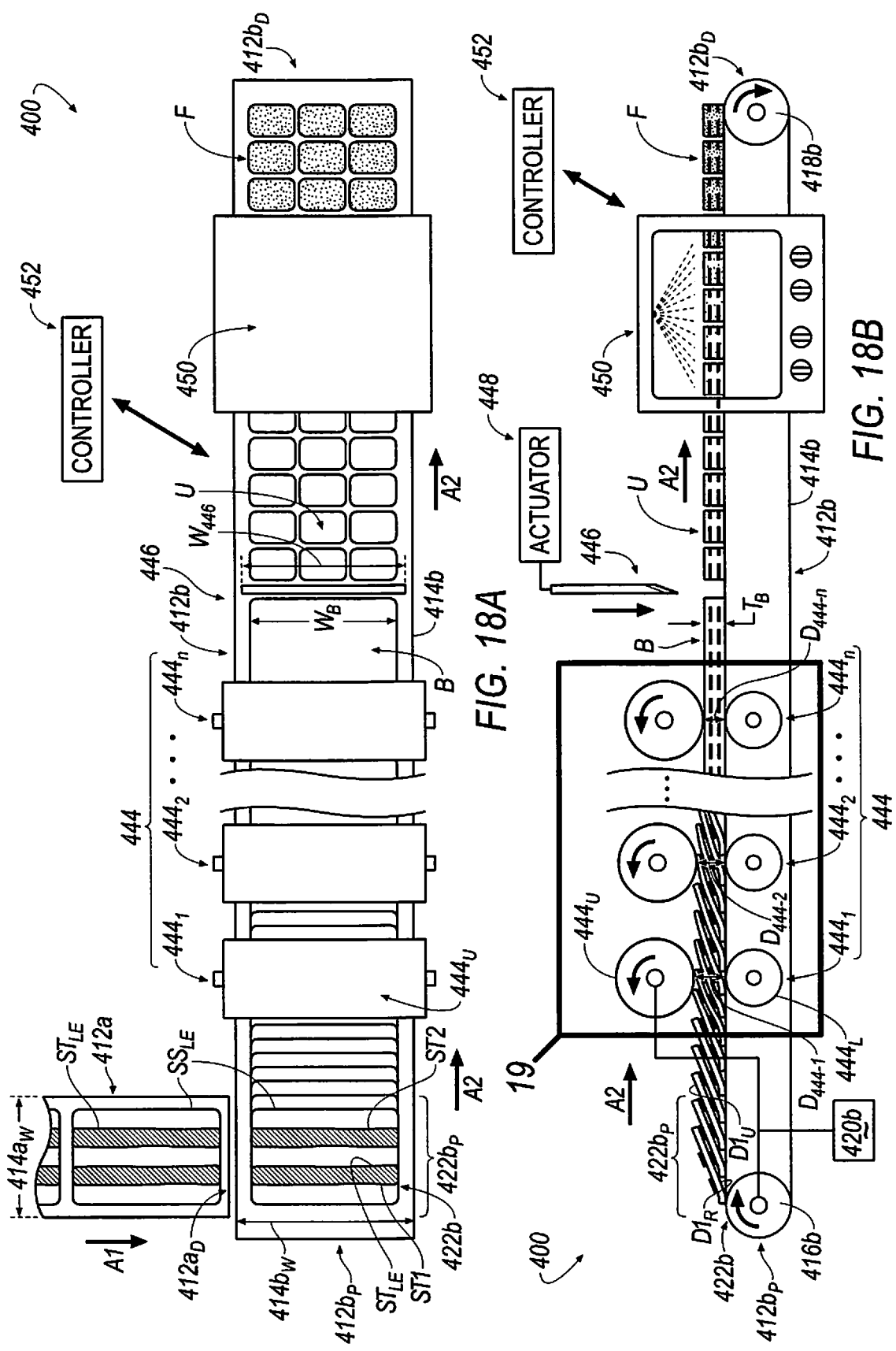

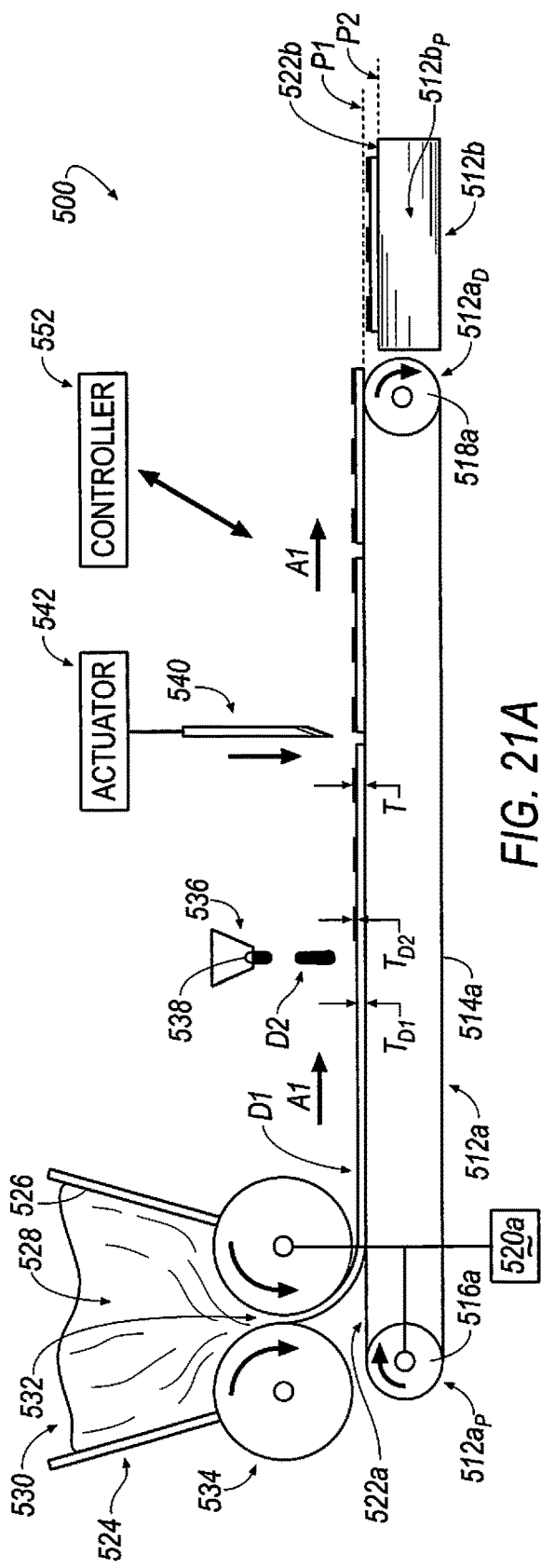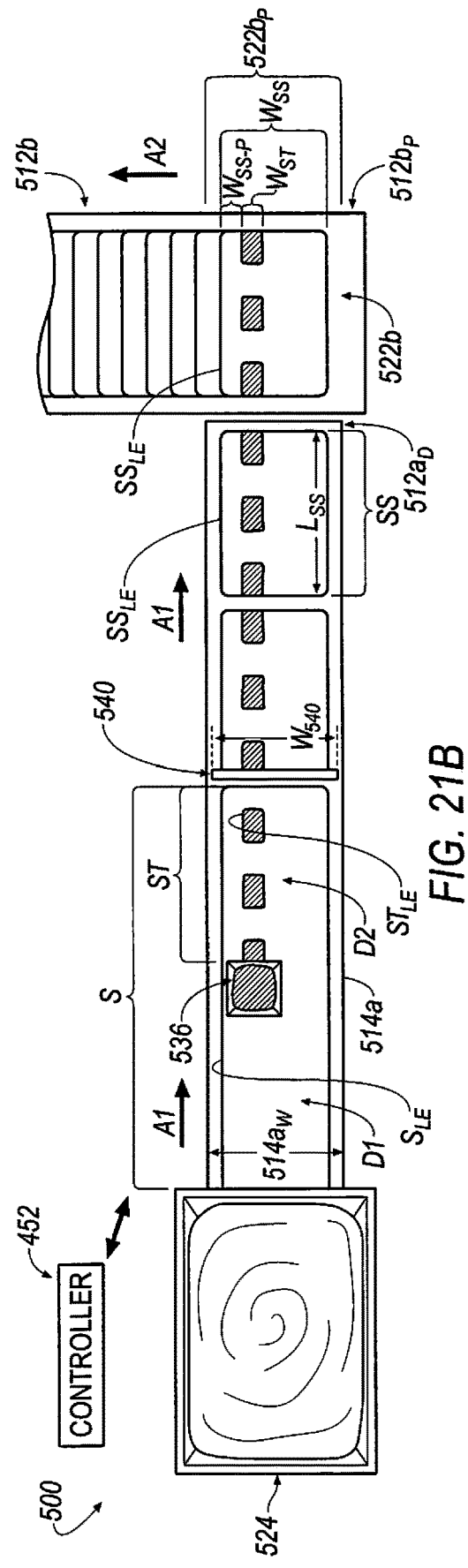

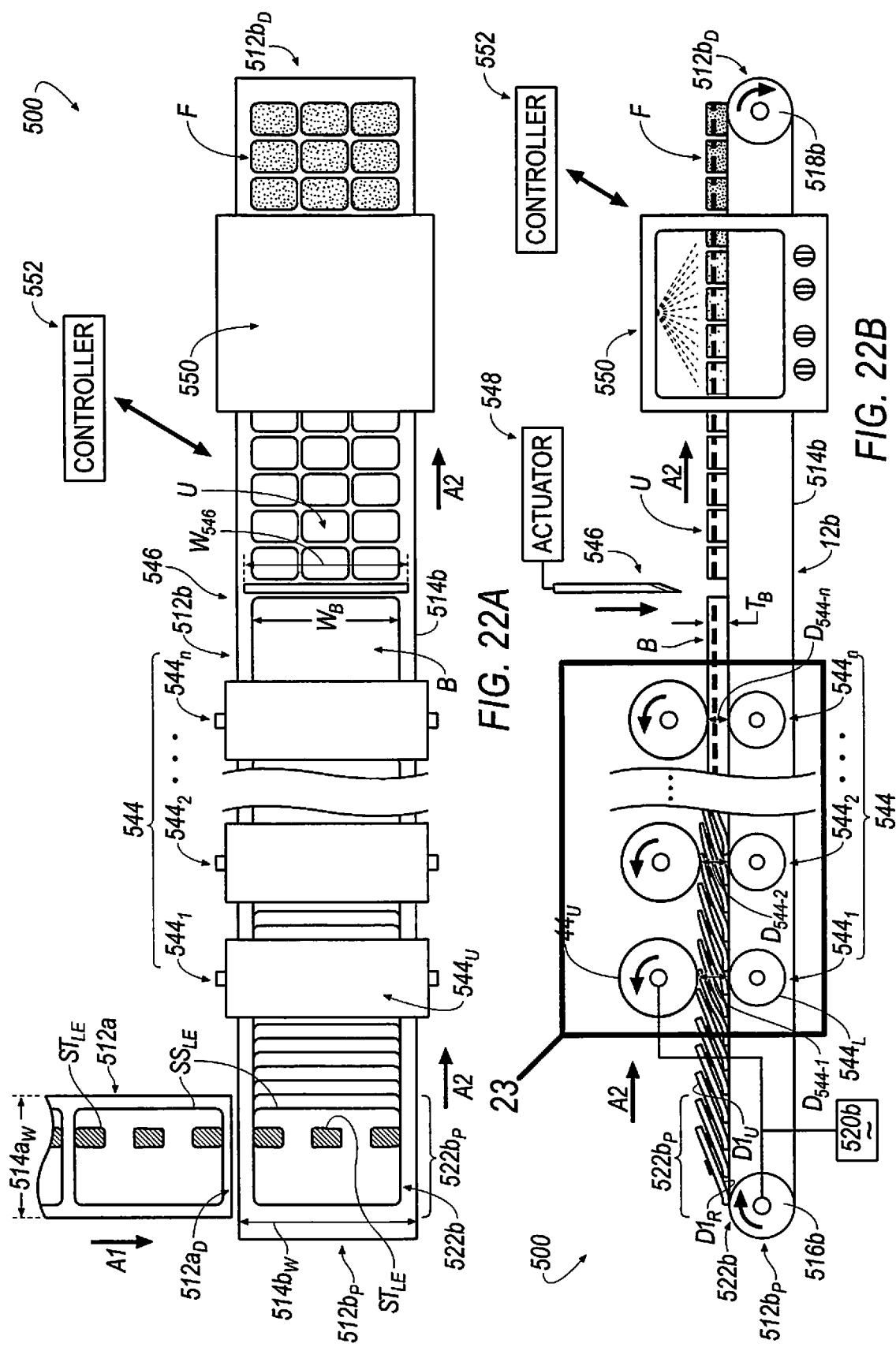

METHOD FOR MANUFACTURING A FOOD PRODUCT, A FOOD PRODUCT PRODUCED BY A FOOD PRODUCT MANUFACTURING SYSTEM, AND FOOD PRODUCT MANUFACTURING SYSTEM

CROSS-REFERENCE TO RELATED APPLICATIONS

This application claims priority under 35 U.S.C. § 119(3) to U.S. Provisional Application 62/269,291, filed on Dec. 18, 2015, the entire contents of which are incorporated herein by reference.

TECHNICAL FIELD

This disclosure relates to a method for manufacturing a food product, a food product produced by a food product manufacturing system, and a food product manufacturing system.

BACKGROUND

This section provides background information related to the present disclosure and is not necessarily prior art.

Food product manufacturing systems are known, and are used to manufacture certain pastries and baked goods. For example, food product manufacturing systems can be used to manufacture food products that include multiple layers of foodstuff. In some examples, food product manufacturing systems can be used to roll, stack, and/or fold various layers of foodstuff in order to manufacture a food product. While existing food product manufacturing systems perform adequately for their intended purpose, improvements to food product manufacturing systems are continuously being sought in order to advance the arts.

SUMMARY

In one configuration, a method for manufacturing a food product is provided and includes: metering a first foodstuff deposit; transporting the first foodstuff deposit in a first driven direction; metering a second foodstuff deposit upon a portion of an upper surface of the first foodstuff deposit as the first foodstuff deposit is transported in the first driven direction; transporting the first foodstuff deposit with the second foodstuff deposit metered thereupon in the first driven direction; separating the first foodstuff deposit with the second foodstuff deposit metered thereupon into a plurality of sheet segments; serially transporting each sheet segment of the plurality of sheet segments from the first driven direction to a second driven direction that is orthogonal to the first driven direction such that a portion of the second foodstuff deposit of a sheet segment that was previously serially transported from the first driven direction to the second driven direction is at least partially encapsulated by opposing layers of the first foodstuff deposit defined by: a first foodstuff deposit of a sheet segment that supports the second foodstuff deposit that was previously serially transported from the first driven direction to the second driven direction and a first foodstuff deposit of a sheet segment that was immediately subsequently serially transported from the first driven direction to the second driven direction; compressing the serially transported sheet segments including the portion of the second foodstuff deposit that is at least partially encapsulated by the opposing layers of the first foodstuff deposit for forming a plurality of thickness segments including the first foodstuff deposit and the second foodstuff deposit that define an elongated, pre-baked food product body; separating the elongated, pre-baked food product body into a plurality of pre-baked food product body units; and finishing the plurality of pre-baked food product body units.

In one configuration, the forming the plurality of thickness segments that define the pre-baked food product body may additionally include: forming a first thickness segment defined by approximately one layer of the first foodstuff deposit; forming a second thickness segment defined by approximately one uninterrupted layer of the second foodstuff deposit; and forming a third thickness segment defined by approximately two layers of the first foodstuff deposit.

In another configuration, the first thickness segment is an uppermost segment of the pre-baked food product body and the third thickness segment is a lowermost segment of the pre-baked food product body. The second thickness segment is disposed between the first thickness segment and the third thickness segment.

In yet another configuration, the forming the plurality of thickness segments that define the pre-baked food product body includes: forming a first thickness segment defined by approximately one layer of the first foodstuff deposit; forming a second thickness segment defined by, in part, by approximately one interrupted layer of the second foodstuff deposit; and forming a third thickness segment defined by approximately two layers of the first foodstuff deposit. The second foodstuff deposit defining the second thickness segment is interrupted with portions of the first foodstuff deposit extending into the second thickness segment from one or both of the first thickness segment and the third thickness segment.

In some configurations, the first thickness segment is an uppermost segment of the pre-baked food product body and the third thickness segment is a lowermost segment of the pre-baked food product body. The second thickness segment is disposed between the first thickness segment and the third thickness segment.

In one configuration, the forming the plurality of thickness segments that define the pre-baked food product body includes: forming a first thickness segment defined by approximately one layer of the second foodstuff deposit; forming a second thickness segment defined by approximately one layer of the first foodstuff deposit; forming a third thickness segment defined by approximately one layer of the second foodstuff deposit; and forming a fourth thickness segment defined by approximately two layers of the first foodstuff deposit.

In another configuration, the first thickness segment is an uppermost segment of the pre-baked food product body and the fourth thickness segment is a lowermost segment of the pre-baked food product body. The second thickness segment is disposed between the first thickness segment and the third thickness segment. The third thickness segment is disposed between the second thickness segment and the fourth thickness segment.

In yet another configuration, the forming the plurality of thickness segments that define the pre-baked food product body includes: forming a first thickness segment defined by approximately one layer of the first foodstuff deposit; forming a second thickness segment defined by, in part, by approximately one interrupted layer of the second foodstuff deposit; forming a third thickness segment defined by approximately two layers of the first foodstuff deposit; forming a fourth thickness segment defined by, in part, by approximately one interrupted layer of the second foodstuff deposit; and forming a fifth thickness segment defined by approximately one layer of the first foodstuff deposit.

In some configurations, the second foodstuff deposit defining the second thickness segment is interrupted with portions of the first foodstuff deposit extending into the second thickness segment from one or both of the first thickness segment and the third thickness segment. The second foodstuff deposit defining the fourth thickness segment is interrupted with portions of the first foodstuff deposit extending into the fourth thickness segment from one or both of the third thickness segment and the fifth thickness segment. The first thickness segment is an uppermost segment of the pre-baked food product body and wherein the fifth thickness segment is a lowermost segment of the pre-baked food product body. The second thickness segment is disposed between the first thickness segment and the third thickness segment. The third thickness segment is disposed between the second thickness segment and the fourth thickness segment. The fourth thickness segment is disposed between the third thickness segment and the fifth thickness segment.

In one configuration, prior to the metering the second foodstuff deposit upon the portion of the upper surface of the first foodstuff deposit step, the method may additionally include: selectively arranging a second foodstuff dispenser over a portion of a width of a first foodstuff supporting surface for metering the second foodstuff deposit upon the portion of the upper surface of the first foodstuff deposit in the form of at least one strip.

In another configuration, the at least one strip of the second foodstuff deposit includes one strip. The one strip of the second foodstuff deposit is defined by a width that is less than a width of the first foodstuff deposit.

In yet another configuration, the metering the second foodstuff deposit upon the portion of the upper surface of the first foodstuff deposit step may additionally include: flowing the second foodstuff deposit without any interruption such that that one strip of the second foodstuff deposit defines an uninterrupted strip.

In some configurations, the metering the second foodstuff deposit upon the portion of the upper surface of the first foodstuff deposit may additional include: periodically interrupting a flow of the second foodstuff deposit such that that one strip of the second foodstuff deposit defines an interrupted strip.

In one configuration, the width of the one strip of the second foodstuff deposit is approximately equal to one-third of the width of the first foodstuff deposit.

In another configuration, the width of the one strip of the second foodstuff deposit is approximately equal to one-fifth of the width of the first foodstuff deposit.

In yet another configuration, the one strip of the second foodstuff deposit is metered upon the portion of the upper surface of the first foodstuff deposit at a distance away from a leading edge of the first foodstuff deposit.

In some configurations, the distance away from the leading edge of the first foodstuff deposit is approximately equal to one-fourth of the width of the first foodstuff deposit.

In one configuration, the at least one strip of the second foodstuff deposit includes one strip. The one strip of the second foodstuff deposit is defined by a width that is approximately equal to half of a width of the first foodstuff deposit.

In another configuration, the one strip of the second foodstuff deposit that is metered upon the portion of the upper surface of the first foodstuff deposit is aligned with and extends from a leading edge of the first foodstuff deposit.

In yet another configuration, the at least one strip of the second foodstuff deposit includes a first strip and a second strip. Each of the first strip and the second strip of the second foodstuff deposit are each defined by a width that is less than a width of the first foodstuff deposit.

In some configurations, the width of each of the first strip and the second strip of the second foodstuff deposit is approximately equal to one-fifth of the width of the first foodstuff deposit.

In one configuration, prior to metering the second foodstuff deposit upon the portion of an upper surface of the first foodstuff deposit, the method may additionally include: forming a second-foodstuff-deposit-receiving-channel in the upper surface of the first foodstuff deposit.

In another configuration, the metering the second foodstuff deposit upon the portion of an upper surface of the first foodstuff deposit includes: metering the second foodstuff deposit into the second-foodstuff-deposit-receiving-channel.

In yet another configuration, the method may also include: entirely filling the second-foodstuff-deposit-receiving-channel with the second foodstuff deposit.

In some configurations, the method may also include partially filling the second-foodstuff-deposit-receiving-channel with the second foodstuff deposit.

In one configuration, the method may also include: overfilling the second-foodstuff-deposit-receiving-channel with the second foodstuff deposit.

An article of food is also provided. The article of food includes a body having a first foodstuff deposit and a second foodstuff deposit. At least a portion of the second foodstuff deposit is at least partially encapsulated by opposing layers of the first foodstuff deposit for defining the body to include a plurality of thickness segments defined by at least three thickness segments.

In one configuration, the plurality of thickness segments include: a first thickness segment defined by approximately one layer of the first foodstuff deposit, a second thickness segment defined by approximately one uninterrupted layer of the second foodstuff deposit, and a third thickness segment defined by approximately two layers of the first foodstuff deposit.

In another configuration, the first thickness segment is an uppermost segment of the body. The third thickness segment is a lowermost segment of the body. The second thickness segment is disposed between the first thickness segment and the third thickness segment.

In yet another configuration, the plurality of thickness segments include: a first thickness segment defined by approximately one layer of the first foodstuff deposit, a second thickness segment defined by, in part, by approximately one interrupted layer of the second foodstuff deposit, and a third thickness segment defined by approximately two layers of the first foodstuff deposit.

In some configurations, the second foodstuff deposit defining the second thickness segment is interrupted with portions of the first foodstuff deposit extending into the second thickness segment from one or both of the first thickness segment and the third thickness segment.

In one configuration, the first thickness segment is an uppermost segment of the body. The third thickness segment is a lowermost segment of the body. The second thickness segment is disposed between the first thickness segment and the third thickness segment.

In another configuration, the plurality of thickness segments include: a first thickness segment defined by approximately one layer of the second foodstuff deposit, a second thickness segment defined by approximately one layer of the first foodstuff deposit, a third thickness segment defined by approximately one layer of the second foodstuff deposit, and a fourth thickness segment defined by approximately two layers of the first foodstuff deposit.

In yet another configuration, the first thickness segment is an uppermost segment of the body. The fourth thickness segment is a lowermost segment of the body. The second thickness segment is disposed between the first thickness segment and the third thickness segment. The third thickness segment is disposed between the second thickness segment and the fourth thickness segment.

In some configurations, the plurality of thickness segments include: a first thickness segment defined by approximately one layer of the first foodstuff deposit, a second thickness segment defined by, in part, by approximately one interrupted layer of the second foodstuff deposit, a third thickness segment defined by approximately two layers of the first foodstuff deposit, a fourth thickness segment defined by, in part, by approximately one interrupted layer of the second foodstuff deposit, and a fifth thickness segment defined by approximately one layer of the first foodstuff deposit.

In one configuration, the second foodstuff deposit defining the second thickness segment is interrupted with portions of the first foodstuff deposit extending into the second thickness segment from one or both of the first thickness segment and the third thickness segment. The second foodstuff deposit defining the fourth thickness segment is interrupted with portions of the first foodstuff deposit extending into the fourth thickness segment from one or both of the third thickness segment and the fifth thickness segment.

In another configuration, the first thickness segment is an uppermost segment of the body. The fifth thickness segment is a lowermost segment of the body. The second thickness segment is disposed between the first thickness segment and the third thickness segment. The third thickness segment is disposed between the second thickness segment and the fourth thickness segment. The fourth thickness segment is disposed between the third thickness segment and the fifth thickness segment.

In yet another configuration, the body is baked to form a food product defined by a cookie, cracker, or bread.

In some configurations, the first foodstuff deposit includes dough.

In one configuration, the second foodstuff deposit includes one or more of a filling, a food coloring and a vitamin supplement.

A first of two portions of a food product manufacturing system is provided and includes: a first conveyor, a first foodstuff deposit hopper, a second foodstuff deposit hopper and a first slicing blade. The first conveyor has a proximal end and a distal end. The first foodstuff deposit hopper is located near the proximal end of the first conveyor and is arranged over a portion of a foodstuff receiving surface of a belt of the first conveyor. The second foodstuff deposit hopper is located downstream of the first foodstuff deposit hopper and upstream of the distal end of the first conveyor. The second foodstuff deposit hopper is selectively spatially arranged over a portion but not all of a width of the belt of the first conveyor defining the foodstuff receiving surface of a belt of the first conveyor. The first slicing blade is located downstream of the second foodstuff deposit hopper and upstream of the distal end of the first conveyor. The first slicing blade is arranged over a portion of the foodstuff receiving surface of a belt of the first conveyor.

In one configuration, the first of the two portions of the food product manufacturing system may also include a foodstuff channel-forming member located downstream of the first foodstuff deposit hopper and upstream of the second foodstuff deposit hopper. The foodstuff channel-forming member is aligned with the second foodstuff deposit hopper such that the foodstuff channel-forming member is selectively spatially arranged over a portion but not all of a width of the belt of the first conveyor. The foodstuff channel-forming member is arranged at a distance away from the foodstuff receiving surface of the belt of the first conveyor.

In another configuration, the first foodstuff hopper includes a sidewall defining a foodstuff-containing cavity. Access to the foodstuff-containing cavity is permitted by an upper opening and a lower opening. The first foodstuff hopper includes a pair of metering rollers that are arranged about the lower opening.

In yet another configuration, the second foodstuff hopper includes a foodstuff metering valve.

In some configurations, the first slicing blade is connected to an actuator.

In one configuration, the belt of the first conveyor is rotatably supported by a proximal roller located at the proximal end of the first conveyor and a distal roller located at the distal end of the first conveyor.

A second of the two portions of the food product manufacturing system is also provided and includes: a second conveyor. The second conveyor has a proximal end and a distal end. The second conveyor is orthogonally arranged with respect to the first conveyor. The proximal end of the second conveyor is arranged proximate the distal end of the first conveyor. A first plane aligned with and extending across the foodstuff receiving surface of the belt of the first conveyor is located spatially above a second plane aligned with and extending across a foodstuff receiving surface of a belt of the second conveyor. The second plane is located spatially below the first plane. A driven direction of the belt of the first conveyor is orthogonal to a driven direction of the belt of the second conveyor.

In one configuration, the second of the two portions of the food product manufacturing system may also include: one or more pairs of compression rollers arranged about the belt of the second conveyor. The one or more pairs of compression rollers is/are located near the proximal end of the second conveyor and downstream of a portion of the foodstuff receiving surface of the belt of the second conveyor that is aligned with the width of the belt of the first conveyor.

In another configuration, each pair compression rollers of the one or more pairs of compression rollers includes: an upper compression roller and a lower compression roller. The lower compression roller is arranged adjacent the belt of the second conveyor. A surface of the belt of the second conveyor that the lower compression roller is arranged adjacent is opposite the foodstuff receiving surface of the belt of the second conveyor. The upper compression roller is arranged in a spaced-apart relationship with respect to the foodstuff receiving surface of the belt of the second conveyor. A gap or spacing between the upper compression roller and the foodstuff receiving surface of the belt of the second conveyor is defined by a distance.

In yet another configuration, the one or more pairs of compression rollers includes more than one pairs of compression rollers. The distance between the upper compression roller and the foodstuff receiving surface of the belt of the second conveyor of adjacent pairs of compression rollers of the more than one pairs of compression rollers progressively decreases in dimension.

In some configurations, the second of the two portions of the food product manufacturing system may also include: a second slicing blade. The second slicing blade is located downstream of the one or more pairs of compression rollers and upstream of the distal end of the second conveyor. The second slicing blade is arranged over a portion of the foodstuff receiving surface of the belt of the second conveyor.

In one configuration, the second slicing blade is connected to an actuator.

In another configuration, the second of the two portions of the food product manufacturing system may also include: an oven located downstream of the second slicing blade and upstream of the distal end of the second conveyor. The oven is arranged about the foodstuff receiving surface of the belt of the second conveyor.

In yet another configuration, the belt of the second conveyor is rotatably supported by a proximal roller located at the proximal end of the second conveyor and a distal roller located at the distal end of the second conveyor.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a side view of a portion of an exemplary food product manufacturing system.

FIG. 1B is a top view of the portion of the food product manufacturing system of FIG. 1A.

FIG. 2A is a top view of another portion of the food product manufacturing system of FIG. 1A.

FIG. 2B is a side view of the food product manufacturing system of FIG. 2A.

FIG. 5A is a side view of a portion of an exemplary food product manufacturing system.

FIG. 5B' is a cross-sectional view of a plurality of layers of first and second foodstuff deposits and a portion of the food product manufacturing system according to line 5B'-5B' of FIG. 5B.

FIG. 5B" is a cross-sectional view of a plurality of layers of first and second foodstuff deposits and a portion of the food product manufacturing system according to line 5B"-5B" of FIG. 5B.

FIG. 5B''' is a cross-sectional view of a plurality of layers of first and second foodstuff deposits and a portion of the food product manufacturing system according to line 5B'''-5B''' of FIG. 5B.

FIG. 6A is a top view of another portion of the food product manufacturing system of FIG. 5A.

FIG. 6B is a side view of the food product manufacturing system of FIG. 5A.

FIG. 10A is a top view of another portion of the food product manufacturing system of FIG. 9A.

FIG. 10B is a side view of the food product manufacturing system of FIG. 10A.

FIG. 13A is a side view of a portion of an exemplary food product manufacturing system.

FIG. 13B is a top view of the portion of the food product manufacturing system of FIG. 13A.

FIG. 14A is a top view of another portion of the food product manufacturing system of FIG. 13A.

FIG. 14B is a side view of the food product manufacturing system of FIG. 14A.

FIG. 17A is a side view of a portion of an exemplary food product manufacturing system.

FIG. 17B is a top view of the portion of the food product manufacturing system of FIG. 17A.

FIG. 18A is a top view of another portion of the food product manufacturing system of FIG. 17A.

FIG. 18B is a side view of the food product manufacturing system of FIG. 18A.

FIG. 21A is a side view of a portion of an exemplary food product manufacturing system.

FIG. 21B is a top view of the portion of the food product manufacturing system of FIG. 21A.

FIG. 22A is a top view of another portion of the food product manufacturing system of FIG. 21A.

FIG. 22B is a side view of the food product manufacturing system of FIG. 22A.

Like reference symbols in the various drawings indicate like elements.

DETAILED DESCRIPTION

Figure 3:
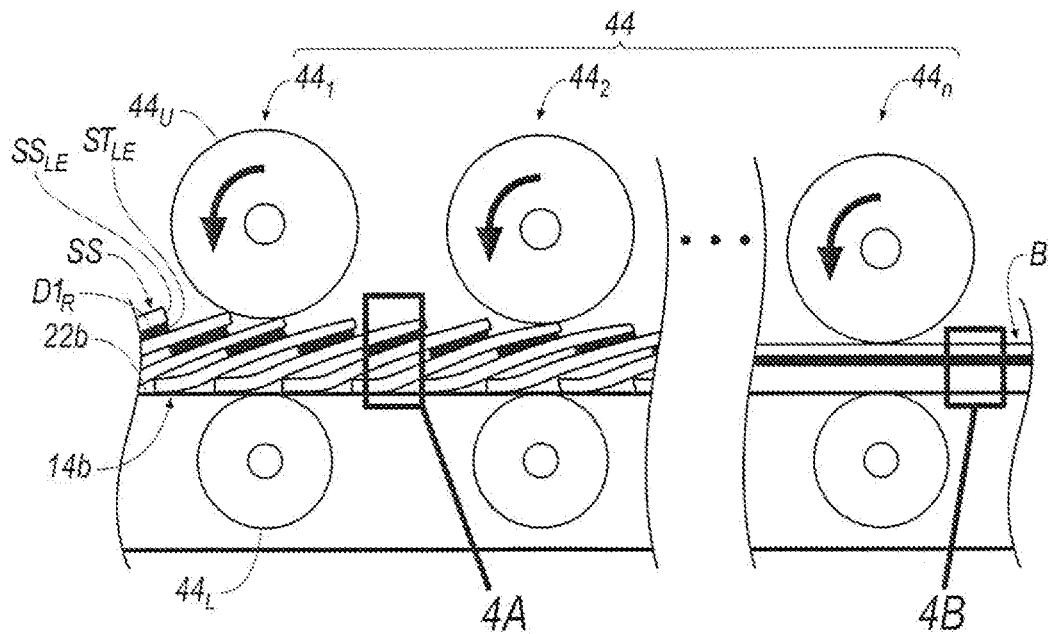
FIG. 3 is an enlarged view of a portion of the food product manufacturing system according to line 3 of FIG. 2B.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A food product (e.g., cookies, crackers, bread or the like) that is manufactured by a food product manufacturing system may include several layers of a first foodstuff deposit (e.g., dough) that at least partially encapsulates a second foodstuff deposit (e.g., a filling, such as, for example, a fruit filling, a food coloring, a supplement, such as, for example, a vitamin supplement, or the like). The food product manufacturing system may include a first conveyor and a second conveyor; the second conveyor may be orthogonally arranged with respect to the first conveyor. The food product manufacturing system may further include but is not limited to including: a first foodstuff deposit hopper arranged over the first conveyor, a foodstuff channel-forming member arranged about the first conveyor, a second foodstuff deposit hopper arranged over the first conveyor, a first slicing blade arranged over the first conveyor, one or more pairs of compression rollers arranged about the second conveyor, a second slicing blade arranged over the second conveyor and an oven arranged about the second conveyor.

As will be described in more detail herein, the food product manufacturing systems, including the configuration of the first and second conveyors, the first and/or second foodstuff deposit hoppers, the first and/or second slicing blades, and/or the one or more pairs of compression rollers, provides an efficient and versatile system and process for manufacturing a multi-layered food product. In particular, the food product manufacturing systems and methods described herein reduce the amount of time required for making a multi-layered food product by allowing for the concurrent deposition of multiple layers of second foodstuff and the concurrent deposition of multiple types of second foodstuff. Accordingly, the food product manufacturing systems and methods allow for the efficient manufacture of a food product having a variety of colors, flavors, textures, and/or nutrients, for example.

Referring to FIGS. 1A-1B and 2A-2B, an exemplary food product manufacturing system is shown generally at 10. FIGS. 1A-1B illustrate a first portion of the food product manufacturing system 10. FIGS. 2A-2B illustrate a second portion of the food product manufacturing system 10. The food product manufacturing system 10 is hereinafter referred to as "the system."

The system 10 manufactures a food product F (see, e.g., FIGS. 2A-2B). In some configurations, the food product F may include a baked food product. Accordingly, the food product F may be referred to herein as a baked food product F; however, it will be appreciated that the food product F may include other types of food products within the scope of the present disclosure. For example, the food product F may include a fried food product F, a roasted food product F, a toasted food product F, a freeze dried food product F, a cold set food product F, and/or a dehydrated food product F.

Figures 4A, 4B:
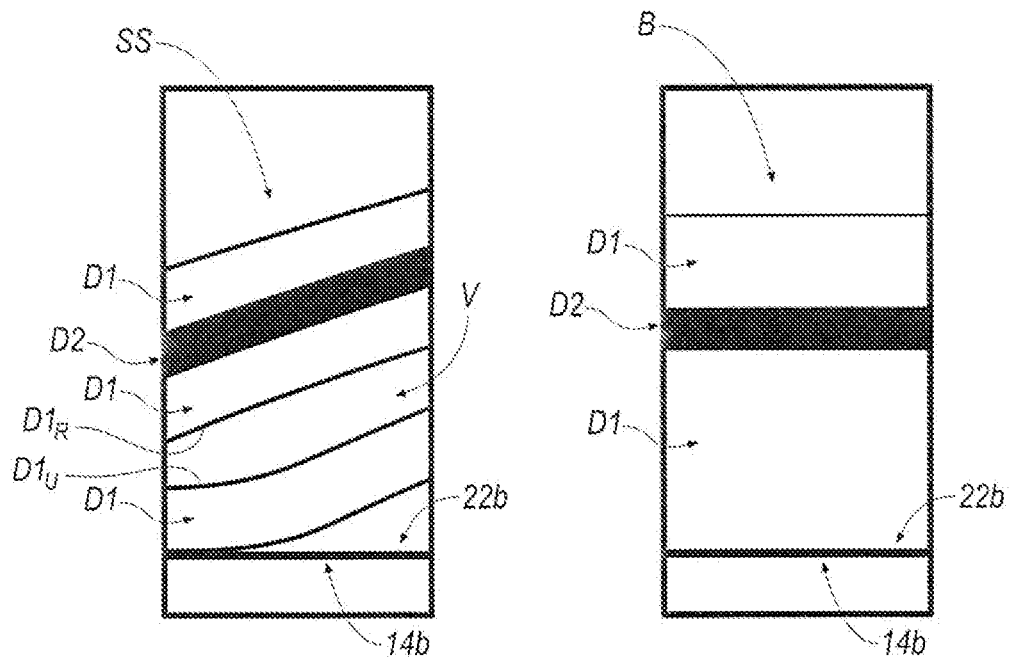
FIG. 4A is an enlarged view of a plurality of layers of first and second foodstuff deposits and a portion of the food product manufacturing system according to line 4A of FIG. 3.
FIG. 4B is an enlarged view of a plurality of layers of first and second foodstuff deposits defining a pre-baked food product body and a portion of the food product manufacturing system according to line 4B of FIG. 3.

The baked food product F is derived from at least a first foodstuff deposit D1 (see, e.g., FIGS. 1A, 1B) and a second foodstuff deposit D2 (see, e.g., FIGS. 1A, 1B). The baked food product F may be defined by several layers of the first foodstuff deposit D1 (e.g., approximately three layers of the first foodstuff deposit D1 as seen in FIGS. 3 and 4A) and at least one layer of the second foodstuff deposit D2 (e.g. approximately one layer of the second foodstuff deposit D2 as seen in FIGS. 3 and 4A). At least two layers of the first foodstuff deposit D1 encapsulates the at least one layer of the second foodstuff deposit D2. The first foodstuff deposit D1 may include a sheeted matrix such as dough, cereal, granola, and/or grains, for example. The second foodstuff deposit D2 may include a filling (such as, e.g., a fruit filling, spice(s), cream(s), salt, sugar, nuts, and/or cheese powder), a food coloring, a supplement (such as, e.g., a vitamin supplement) or the like.

As will be described in the following disclosure, the first foodstuff deposit D1 is metered in the form of an elongated sheet S (see, e.g., FIG. 1B). The second foodstuff deposit D2 is metered in the form of at least one strip ST (see, e.g., FIG. 1B) upon the elongated sheet S. The elongated sheet S including the at least one strip ST metered there-upon is subsequently divided into a plurality of sheet segments SS (see, e.g., FIG. 1B).

As seen in FIGS. 1A-1B, 2A-2B, the at least one strip ST metered upon the elongated sheet S is numerically defined to include one strip ST. Although one strip ST is metered upon the elongated sheet S according to the example described at FIGS. 1A-1B, 2A-2B, the at least one strip ST may be numerically defined to include more than one strip ST (see, e.g., FIGS. 17A-17B, 18A-18B where a first strip ST1 and a second strip ST2 are metered upon an elongated sheet S). Therefore, the at least one strip ST may include any desirable number of strips ST such as, for example, one, two, three, fourth, five or "n" strips (whereby "n" is any integer).

Referring to FIG. 1B, each sheet segment SS is defined by a length Lss. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 1B, the at least one strip ST is defined by a width $W_{ST}$. The width $W_{ST}$ of the at least one strip ST is less than the width $W_{SS}$ of each sheet segment SS. In an example, the width $W_{ST}$ of the at least one strip ST may be approximately equal to one-third of the width $W_{SS}$ of each sheet segment SS.

Furthermore, in order to realize the selective layering of the baked food product F described above at FIGS. 3 and 4A, whereby at least two layers of the first foodstuff deposit D1 encapsulates the at least one layer of the second foodstuff deposit D2, the at least one strip ST may be selectively metered upon the elongated sheet S at a distance away from a leading edge $S_{LE}$ of the elongated sheet S. The distance away from the leading edge $S_{LE}$ may be defined by a portion $W_{SS-P}$ of the width $W_{SS}$ of the elongated sheet S/each sheet segment SS. The portion $W_{SS-P}$ of the width $W_{SS}$ of the elongated sheet S/each sheet segment SS may be defined by a distance between the leading edge $S_{LE}$ of the elongated sheet S and a leading edge $ST_{LE}$ of the one strip ST. In an example, the distance (i.e., the portion $W_{SS-P}$ of the width $W_{SS}$ of each sheet segment SS) between the leading edge $ST_{LE}$ of the one strip ST and the leading edge $SS_{LE}$ of the sheet segment SS may be approximately equal to one-fourth of the width $W_{SS}$ of the elongated sheet S/each sheet segment SS.

With reference to FIGS. 1A and 1B, the system 10 may include a first conveyor 12a having a proximal end $12a_P$ and a distal end $12a_D$. The first conveyor 12a may include a belt 14a defined by a width $14a_W$ (see, e.g., FIG. 1B). The belt 14a may be rotatably supported by a proximal roller 16a (see, e.g., FIG. 1A) located at the proximal end $12a_P$ of the first conveyor 12a and a distal roller 18a (see, e.g., FIG. 1A) located at the distal end $12a_D$ of the first conveyor 12a.

A motor 20a (see, e.g., FIG. 1A) may be connected to one or both of the proximal roller 16a and the distal roller 18a in order to impart rotation of one or both of the proximal roller 16a and the distal roller 18a such that one or both of the proximal roller 16a and the distal roller 18a may rotatably drive the belt 14a according to the direction of arrow A1. Depending upon the rotated state of the belt 14a relative to the proximal roller 16a and the distal roller 18a, a segment of the belt 14a may generally define a foodstuff receiving surface 22a.

With reference to FIGS. 1A-1B and 2A-2B, the system 10 may include a second conveyor 12b having a proximal end $12b_P$ and a distal end $12b_D$. The second conveyor 12b may include a belt 14b defined by a width $14b_W$ (see, e.g., FIG. 2A) that is rotatably supported by a proximal roller 16b (see, e.g., FIG. 2B) located at the proximal end $12b_P$ of the second conveyor 12b and a distal roller 18b (see, e.g., FIG. 2B) located at the distal end $12b_D$ of the second conveyor 12b.

A motor 20b (see, e.g., FIG. 2B) may be connected to one or both of the proximal roller 16b and the distal roller 18b in order to impart rotation of one or both of the proximal roller 16b and the distal roller 18b such that one or both of the proximal roller 16b and the distal roller 18b may rotatably drive the belt 14b according to the direction of arrow A2. It will be appreciated that, in some configurations, the direction of arrow A2 may be opposite the direction of arrow A2 illustrated throughout the figures (see, e.g., FIGS. 1B and 2B). For example, the direction of arrow A2 may be offset by 180 degrees from the direction illustrated throughout the figures. Depending upon the rotated state of the belt 14b relative to the proximal roller 16b and the distal roller 18b, a segment of the belt 14b may generally define a foodstuff receiving surface 22b.

As seen in FIGS. 1B and 2A, the second conveyor 12b may be transversely arranged with respect to the first conveyor 12a. In an example configuration, the second conveyor 12b is orthogonally arranged with respect to the first conveyor 12a. Accordingly, the driven direction A2 of the belt 14b of the second conveyor 12b may be orthogonal to the driven direction A1 of the belt 14a of the first conveyor 12a.

As seen in FIGS. 1A-1B and 2A, the proximal end $12b_P$ of the second conveyor 12b may be located near the distal end $12a_D$ of the first conveyor 12a. Furthermore, as seen in FIG. 2A, a portion $22b_P$ of the foodstuff receiving surface 22b of the belt 14b of the second conveyor 12b that may be located near the proximal end $12b_P$ of the second conveyor 12b may be approximately equal to and may be aligned with the width $14a_W$ of the belt 14a of the first conveyor 12a.

As seen in FIG. 1A, a first plane P1 may be aligned with and may extend across the foodstuff receiving surface 22a of the belt 14a of the first conveyor 12a. A second plane P2 may be aligned with and may extend across the foodstuff receiving surface 22b of the belt 14b of the second conveyor 12b. The second plane P2: (1) may not intersect with the first plane P1, (2) may be substantially parallel to the first plane P1, and (3) may be located spatially below the first plane P1 (i.e., the foodstuff receiving surface 22b of the belt 14b of the second conveyor 12b may be located below the foodstuff receiving surface 22a of the belt 14a of the first conveyor 12a such that sheet segments SS are permitted to fall with the assistance of gravity from the foodstuff receiving surface 22a of the belt 14a of the first conveyor 12a to the foodstuff receiving surface 22b of the belt 14b of the second conveyor 12b as the sheet segments SS are transported upon the belt 14a according to the direction of the arrow A1). As will be described in the following disclosure, by arranging the proximal end $12b_P$ of the second conveyor 12b near the distal end $12a_D$ of the first conveyor 12a, and, in conjunction with the arrangement the foodstuff receiving surface 22b of the belt 14b of the second conveyor 12b spatially below the foodstuff receiving surface 22a of the belt 14a of the first conveyor 12a, successive sheet segments SS may be transported from the distal end $12a_D$ of the first conveyor 12a to the proximal end $12b_P$ of the second conveyor 12b in a partially overlapped fashion in order to encapsulate at least one layer of the second foodstuff deposit D2 between at least two layers of the first foodstuff deposit D1 as described above.

Referring to FIGS. 1A and 1B, the system 10 may also include a first foodstuff deposit hopper 24. The first foodstuff hopper 24 may be located near the proximal end $12a_P$ of the first conveyor 12a and may be arranged over a portion of the foodstuff receiving surface 22a of the belt 14a of the first conveyor 12a. The first foodstuff hopper 24 may include a sidewall 26 defining a foodstuff-containing cavity 28. Access to the foodstuff-containing cavity 28 is permitted by an upper opening 30 and a lower opening 32. The first foodstuff hopper 24 may also include a pair of metering rollers 34 that are arranged about the lower opening 32.

Prior to being arranged upon the foodstuff receiving surface 22a of the belt 14a of the first conveyor 12a, the first foodstuff deposit D1 may be stowed within the foodstuff-containing cavity 28. The first foodstuff deposit D1 is evacuated out of the foodstuff-containing cavity 28 by way of the lower opening 32 of the first foodstuff hopper 24. The motor 20a may be connected to the pair of metering rollers 34 to impart rotation to the pair of metering rollers 34 for metering the first foodstuff deposit D1 upon the foodstuff receiving surface 22a of the belt 14a of the first conveyor 12a at a controlled rate. The controlled metering rate of the first foodstuff deposit D1 in combination with a speed of rotation of one or both of the proximal roller 16a and the distal roller 18a rotatably driving the belt 14a according to the direction of arrow A1 results in the first foodstuff deposit D1 being arranged upon the foodstuff receiving surface 22a of the belt 14a of the first conveyor 12a in a substantially uniform thickness $T_{D1}$.

Referring to FIGS. 1A and 1B, the system 10 may also include a second foodstuff deposit hopper 36. The second foodstuff hopper 36 is located downstream of the first foodstuff deposit hopper 24 and upstream of the distal end $12a_D$ of the first conveyor 12a. The second foodstuff deposit hopper 36 may be arranged over a portion but not all of the width $14a_W$ of the belt 14a of the first conveyor 12a defining the foodstuff receiving surface 22a of the belt 14a of the first conveyor 12a that supports the first foodstuff deposit D1 metered from the first foodstuff hopper 24. The second foodstuff hopper 36 may be selectively spatially arranged over the portion of the foodstuff receiving surface 22a of the belt 14a of the first conveyor 12a in order to meter the second foodstuff deposit D2 upon the first foodstuff deposit D1 at the above-described distance (see, e.g., $W_{SS-P}$) away from a leading edge $S_{LE}$ of the elongated sheet S. A metering rate of the second foodstuff deposit D2 from the second foodstuff hopper 36 may be determined by, for example: (1) the physical characteristics (e.g. viscosity) of the second foodstuff deposit D2, (2) an open/partially open state of a foodstuff metering valve 38 of the second foodstuff hopper 36 and (3) the speed of rotation of one or both of the proximal roller 16a and the distal roller 18a rotatably driving the belt 14a according to the direction of arrow A1. As such, the second foodstuff deposit D2 may be metered upon the first foodstuff deposit D1 in a substantially uniform thickness $T_{D2}$.

Referring to FIGS. 1A and 1B, the system 10 may also include a first slicing blade 40. The first slicing blade 40 may be located downstream of the second foodstuff deposit hopper 36 and upstream of the distal end $12a_D$ of the first conveyor 12a. The first slicing blade 40 may be arranged over a portion of the foodstuff receiving surface 22a of the belt 14a of the first conveyor 12a that supports the first foodstuff deposit D1 including the second foodstuff deposit D2 metered thereupon. The first slicing blade 40 is defined by a width W40 (see, e.g., FIG. 1B) that may be greater than the width $W_{SS}$ of the elongated sheet S/each sheet segment SS.

Referring to FIG. 1A, an actuator 42 may be connected to the first slicing blade 40 in order to impart a periodic plunging motion to the first slicing blade 40 for causing the first slicing blade 40 to penetrate through both of the thickness $T_{D1}$ of the first foodstuff deposit D1 and the thickness $T_{D2}$ of the second foodstuff deposit D2. The periodic plunging motion of the first slicing bade 40 in combination with the speed of rotation of one or both of the proximal roller 16a and the distal roller 18a rotatably driving the belt 14a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length $L_{SS}$.

The speed of rotation of one or both of the proximal roller 16a and the distal roller 18a rotatably driving the belt 14a according to the direction of arrow A1 serially transports each sheet segment SS toward the distal end $12a_D$ of the first conveyor 12a. Once each sheet segment SS reaches the distal end $12a_D$ of the first conveyor 12a, each sheet segment SS is permitted to fall with the assistance of gravity from the foodstuff receiving surface 22a of the belt 14a of the first conveyor 12a toward the foodstuff receiving surface 22b of the belt 14b of the second conveyor 12b. The portion $22b_P$ of the foodstuff receiving surface 22b of the belt 14b of the second conveyor 12b that may be located near the proximal end $12b_P$ of the second conveyor 12b and aligned with the width $14a_W$ of the belt 14a of the first conveyor 12a at least partially directly receives each sheet segment SS from the distal end $12a_D$ of the first conveyor 12a.

The speed of rotation of one or both of the proximal roller 16b and the distal roller 18b rotatably driving the belt 14b of the second conveyor 12b according to the direction of arrow A2 transports each sheet segment SS toward the distal end $12b_D$ of the second conveyor 12b. As seen in FIG. 2B, the speed of rotation of one or both of the proximal roller 16b and the distal roller 18b rotatably driving the belt 14b of the second conveyor 12b may be selectively controlled (and, in some instances, is referenced from the speed of rotation of one or both of the proximal roller 16a and the distal roller 18a rotatably driving the belt 14a of the first conveyor 12a)

in order to arrange: (1) a first portion of a rear surface $D1_R$ of the first foodstuff deposit D1 of a sheet segment SS transported from foodstuff receiving surface 22a of the belt 14a of the first conveyor 12a upon the foodstuff receiving surface 22b of the belt 14b of the second conveyor 12b and (2) a second portion of the rear surface $D1_R$ of the first foodstuff deposit D1 of the sheet segment SS transported from foodstuff receiving surface 22a of the belt 14a of the first conveyor 12a over: the second foodstuff deposit D2 and a portion of an upper surface $D1_U$ of a first foodstuff deposit D1 of a sheet segment SS that was immediately previously transported from foodstuff receiving surface 22a of the belt 14a of the first conveyor 12a upon the foodstuff receiving surface 22b of the belt 14b of the second conveyor 12b. As a result, a portion of the sheet segment SS that was previously transported from the foodstuff receiving surface 22a of the belt 14a of the first conveyor 12a to the foodstuff receiving surface 22b of the belt 14b of the second conveyor 12b may be partially laminated by the rear surface $D1_R$ of the first foodstuff deposit D1 of the sheet segment SS that is subsequently transported from the foodstuff receiving surface 22a of the belt 14a of the first conveyor 12a to the foodstuff receiving surface 22b of the belt 14b of the second conveyor 12b in order to thereby entirely encapsulate the second foodstuff deposit D2 between at least two layers of the first foodstuff deposit D1 defined by: (a) the first foodstuff deposit D1 directly supporting the second foodstuff deposit D2 and the rear surface $D1_R$ of the first foodstuff deposit D1 of the sheet segment SS that is subsequently transported from the foodstuff receiving surface 22a of the belt 14a of the first conveyor 12a to the foodstuff receiving surface 22b of the belt 14b of the second conveyor 12b. Furthermore, a portion of the rear surface $D1_R$ of the first foodstuff deposit D1 of the sheet segment SS that is subsequently transported from the foodstuff receiving surface 22a of the belt 14a of the first conveyor 12a to the foodstuff receiving surface 22b of the belt 14b of the second conveyor 12b is disposed over a portion of the upper surface $D1_U$ first foodstuff deposit D1 that: (1) does not support the second foodstuff deposit D2 and (2) is not defined by the width $W_{SS}$ of each sheet segment SS between the leading edge $ST_{LE}$ of the elongated strip ST and the leading edge $SS_{LE}$ of the sheet segment SS.

Referring to FIGS. 1B and 2A, regarding the encapsulation of the second foodstuff deposit D2 between at least two layers of the first foodstuff deposit D1 described above, in an example, the speed of rotation of one or both of the proximal roller 16b and the distal roller 18b rotatably driving the belt 14b of the second conveyor 12b may be selectively controlled in order to arrange a leading edge $SS_{LE}$ of a sheet segment SS in the immediate process of being transported from the foodstuff receiving surface 22a of the belt 14a of the first conveyor 12a to the foodstuff receiving surface 22b of the belt 14b of the second conveyor 12b at least directly over, or, alternatively, slightly ahead (as seen in FIGS. 2B and 3) of a leading edge $ST_{LE}$ of a strip ST (defined by the second foodstuff deposit D2) of a sheet segment SS that was immediately previously transported from the foodstuff receiving surface 22a of the belt 14a of the first conveyor 12a to the foodstuff receiving surface 22b of the belt 14b of the second conveyor 12b. In this regard, the leading edge $ST_{LE}$ of a strip ST of the sheet segment SS in the immediate process of being transported from the foodstuff receiving surface 22a of the belt 14a may be aligned with, or slightly trail, a trailing edge of the strip ST of the sheet segment SS that was immediately previously transported from the foodstuff receiving surface 22a of the belt 14a. It will be appreciated that if, as discussed above, the direction of arrow A2 is opposite the direction of arrow A2 illustrated throughout the figures, the leading edges $ST_{LE}$ and $SS_{LE}$ of the strip ST and the sheet segment SS, respectively, may become trailing edges. Regardless of the direction of arrow A2 (i.e., as illustrated or a direction opposite the illustrated direction), the strip ST of each sheet segment SS that had been previously transported from the foodstuff receiving surface 22a of the belt 14a of the first conveyor 12a to the foodstuff receiving surface 22b of the belt 14b of the second conveyor 12b is covered by a portion of the rear surface $D1_R$ of the first foodstuff deposit D1 of a sheet segment SS that was subsequently deposited thereon.

Referring to FIGS. 2A and 2B, the system 10 may also include one or more pairs of compression rollers $44_1$, $44_2 \ldots 44_n$ arranged about the belt 14b of the second conveyor 12b. If more than one pair of compression rollers $44_1, 44_2 \ldots 44_n$ are included in the system 10, the more than one pair of compression rollers $44_1, 44_2 \ldots 44_n$ may be referred to as a plurality of compression rollers 44. The one or more pairs of compression rollers $44_1, 44_2 \ldots 44_n$ arranged about the second conveyor 12b may be located near the proximal end $12b_P$ of the second conveyor 12b and downstream of the portion $22b_P$ of the foodstuff receiving surface 22b of the belt 14b of the second conveyor 12b that is aligned with the width $14a_W$ of the belt 14a of the first conveyor 12a.

Each pair compression rollers $44_1, 44_2 \ldots 44_n$ of the one or more pairs compression rollers $44_1, 44_2 \ldots 44_n$ includes an upper compression roller $44_U$ and a lower compression roller $44_L$. The lower compression roller $44_L$ may be arranged adjacent the belt 14b of the second conveyor 12b. The surface of the belt 14b that the lower compression roller $44_L$ is arranged adjacent is opposite the foodstuff receiving surface 22b of the belt 14b of the second conveyor 12b.

The upper compression roller $44_U$ may be arranged in a spaced-apart relationship with respect to the foodstuff receiving surface 22b of the belt 14b of the second conveyor 12b. A gap or spacing between the upper compression roller $44_U$ and the foodstuff receiving surface 22b of the belt 14b of the second conveyor 12b is defined by a distance (see, e.g., $D_{44\text{-}1}, D_{44\text{-}1} \ldots D_{44\text{-}n}$). When more than one pair of compression rollers $44_1, 44_2 \ldots 44_n$ are included in the system 10, the distance $D_{44\text{-}1}, D_{44\text{-}1} \ldots D_{44\text{-}n}$ defining the gap or spacing between the upper compression roller $44_U$ and the foodstuff receiving surface 22b of the belt 14b of the second conveyor 12b for each successive pair of compression rollers $44_1, 44_2 \ldots 44_n$ may progressively decrease in dimension.

As one or both of the proximal roller 16b and the distal roller 18b rotatably drives the belt 14b of the second conveyor 12b according to the direction of arrow A2, the plurality of partially overlapped sheet segments SS are passed through the gaps or spacings defined by the distance $D_{44\text{-}1}, D_{44\text{-}1} \ldots D_{44\text{-}n}$. Because the partially overlapped sheet segments SS are defined by a height dimension that may be approximately equal to but slightly greater than the gap or spacing defined by the first distance $D_{44\text{-}1}$ associated with the first pair of compression rollers $44_1$, the upper compression roller $44_U$ of the first pair of compression rollers $44_1$ directly engages the upper surface $D1_U$ (defined by a first foodstuff deposit D1) of each sheet segment SS of the partially overlapped sheet segments SS for compressing the partially overlapped sheet segments SS between the upper compression roller $44_U$ of the first pair of compression rollers $44_1$ and the foodstuff receiving surface 22b of the belt 14b of the second conveyor 12b. As the partially overlapped sheet segments SS are passed through one or more subsequent gaps (e.g., $D_{44-1} \ldots D_{44-n}$) that progressively decrease in dimension, the partially overlapped sheet segments SS are further compressed in a substantially similar manner as described above.

As a result of being passed through the one or more gaps or spacings defined by the one or more pairs of compression rollers $44_1, 44_2 \ldots 44_n$ described above, most or all of the voids V (see, e.g., FIG. 4A) between opposing layers of the first foodstuff deposit D1 (i.e., defined by a gap or spacing between a portion of the rear surface $D1_R$ of the first foodstuff deposit D1 and a portion of the upper surface $D1_U$ of an adjacent first foodstuff deposit D1) are negated as a result of the one or more pairs of compression rollers $44_1, 44_2 \ldots 44_n$ compressing and thereby vertically shifting the material defining the first foodstuff deposit D1 into the gap or spacing defined by the voids V. When the material defining the first foodstuff deposit D1 is vertically shifted, the portion of the rear surface $D1_R$ of the first foodstuff deposit D1 and the portion of the upper surface $D1_U$ of the adjacent first foodstuff deposit D1 bind together. Furthermore, as the material defining the first foodstuff deposit D1 is shifted into the gap or spacing defined by the voids V, the second foodstuff deposit D2 in the form of at least one strip ST of each sheet segment SS is similarly vertically displaced into an area previously spatially occupied by the underlying (and vertically shifted) first foodstuff deposit D1. As the second foodstuff deposit D2 in the form of at least one strip ST of each sheet segment SS is shifted, the second foodstuff deposit D2 in the form of at least one strip ST of each sheet segment SS ultimately appears to merge into a substantially constant, uninterrupted layer defined by the second foodstuff deposit D2. After passing through the one or more gaps or spacings defined by the one or more pairs compression rollers $44_1, 44_2 \ldots 44_n$, the sheet segments SS are integrated into an elongated, pre-baked food product body B (see, e.g., FIGS. 2A-2B, 4B).

The elongated, pre-baked food product body B is generally defined by: (1) a first thickness segment defined by approximately one layer of the first foodstuff deposit D1, (2) a second thickness segment defined by approximately one layer of the second foodstuff deposit D2 and (3) a third thickness segment defined by approximately two layers of the first foodstuff deposit D1. As seen in FIG. 4B, a rear surface of the third thickness segment defined by approximately two layers of the first foodstuff deposit D1 is supported upon the foodstuff receiving surface 22b of the belt 14b of the second conveyor 12b.

Referring to FIGS. 2A and 2B, the system 10 may also include a second slicing blade 46. The second slicing blade 46 may be located downstream of the one or more compression rollers $44_1, 44_2 \ldots 44_n$ and upstream of the distal end $12b_D$ of the second conveyor 12b. The second slicing blade 46 may be arranged over a portion of the foodstuff receiving surface 22b of the belt 14b of the second conveyor 12b that supports the elongated, pre-baked food product body B. The second slicing blade 46 is defined by a width $W_{46}$ (see, e.g., FIG. 2A) that may be greater than a width $W_B$ (see, e.g., FIG. 2A) of the elongated, pre-baked food product body B.

Referring to FIG. 2B, an actuator 48 may be connected to the second slicing blade 46 in order to impart a periodic plunging motion to the second slicing blade 46 for causing the second slicing blade 46 to penetrate through a thickness $T_B$ (see, e.g., FIG. 2B) of the elongated, pre-baked food product body B. The periodic plunging motion of the second slicing bade 46 in combination with the speed of rotation of one or both of the proximal roller 16b and the distal roller 18b rotatably driving the belt 14b according to the direction of arrow A2 results in the elongated, pre-baked food product body B being cut into a plurality of pre-baked food product body units U having any desirable shape, size or dimension.

Referring to FIGS. 2A and 2B, the system 10 may also include a finishing apparatus, such as an oven 50. The oven 50 may be located downstream of the second slicing blade 46 and upstream of the distal end $12b_D$ of the second conveyor 12b. The oven 50 is arranged about the foodstuff receiving surface 22b of the belt 14b of the second conveyor 12b that supports the plurality of pre-baked food product body units U. As one or both of the proximal roller 16b and the distal roller 18b rotatably drives the belt 14b of the second conveyor 12b according to the direction of arrow A2, the plurality of pre-baked food product body units U are passed through the oven 50 in order to bake the plurality of pre-baked food product body units U. It will be appreciated that, while the finishing apparatus is shown and described herein as being an oven 50, the finishing apparatus may include other configurations within the scope of the present disclosure. For example, the finishing apparatus may include an apparatus that fries, roasts, freeze dries, cold sets, toasts, and/or dehydrates. In this regard, the plurality of pre-baked food product body units U may be passed through the finishing apparatus in order to fry, roast, freeze dry, cold set, toast and/or dehydrate the plurality of pre-baked food product body units U.

Upon the plurality of pre-baked food product body units U exiting the oven 50 according to the direction of arrow A2, the plurality of pre-baked food product body units U may then be referred to as baked food products F. As one or both of the proximal roller 16b and the distal roller 18b rotatably drives the belt 14b of the second conveyor 12b according to the direction of arrow A2, the baked food products F may fall with the assistance of gravity off of the distal end $12b_D$ of the second conveyor 12b for subsequent processing or packaging.

Referring to FIGS. 1A-1B, 2A-2B, the system 10 may also include a controller 52. The controller 52 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles).

The controller 52 may be communicatively coupled (i.e., wirelessly connected or hardwired) to any of the above-described components (e.g., components 20a, 20b, 34, 38, 42, 44, 48, 50) of the system 10 in order to control any of the components. For example, the controller 52 may control the motors 20a/20b for controlling the rate of rotation of the one or both of the proximal roller 16a/16b and the distal roller 18a/18b that rotatably drives the belt 14a/14b of the first conveyor 12a/the second conveyor 12b. In another example, the controller 52 may control the rotation of the pair of metering rollers 34 in order to control the rate of the amount of the first foodstuff deposit D1 being metered upon the foodstuff receiving surface 22a of the belt 14a of the first conveyor 12a. In yet another example, the controller 52 may control an open/partially open/closed state of the foodstuff metering valve 38 of the second foodstuff hopper 36 in order to control the rate of the amount of the second foodstuff deposit D2 being metered upon the first foodstuff deposit D1. In an example, the controller 52 may control the state of the actuator 42/48 for controlling the frequency of the periodic plunging motion of the first slicing blade 40/the second slicing blade 46. In another example, the controller 52 may control the motor 20b for controlling a rate of rotation of one or more of the upper compression roller $44_U$ and the lower compression roller $44_L$ of the one or more pairs compression rollers $44_1, 44_2 \ldots 44_n$. In yet another example, the controller 52 may control the on state, off state and/or temperature of the oven 50.

Figure 5B:
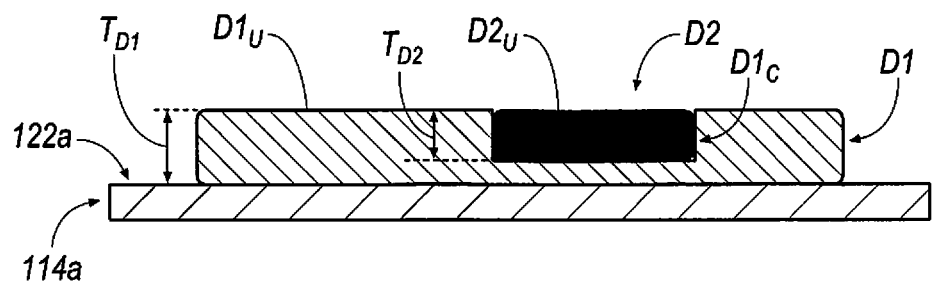
FIG. 5B is a top view of the portion of the food product manufacturing system of FIG. 5A.
Figure 5B:
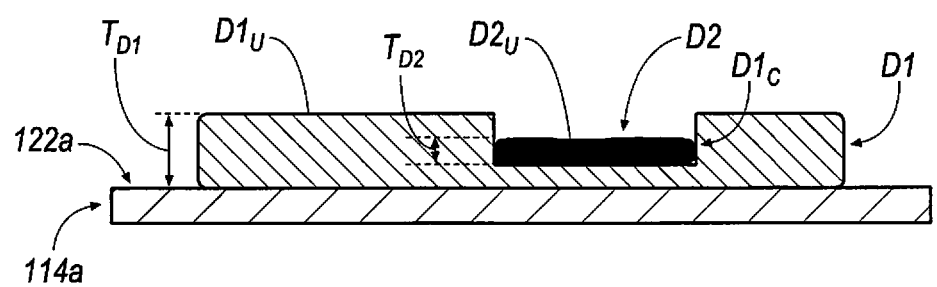
Figure 5B:
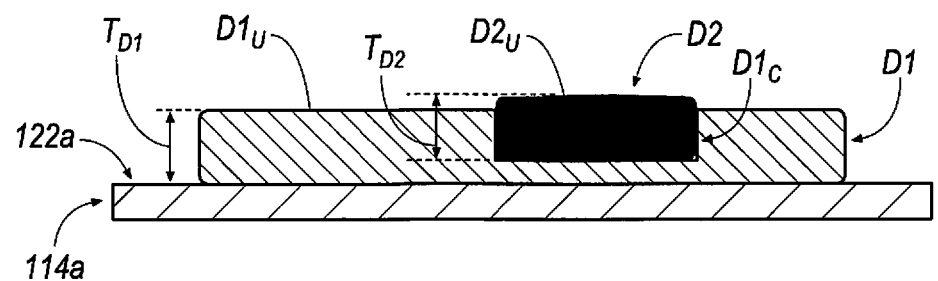

Referring to FIGS. 5A-5B and 6A-6B, an exemplary food product manufacturing system is shown generally at 100. FIGS. 5A-5B illustrates a first portion of the food product manufacturing system 100. FIGS. 6A-6B illustrates a second portion of the food product manufacturing system 100. The food product manufacturing system 100 is hereinafter referred to as "the system."

Figure 7:
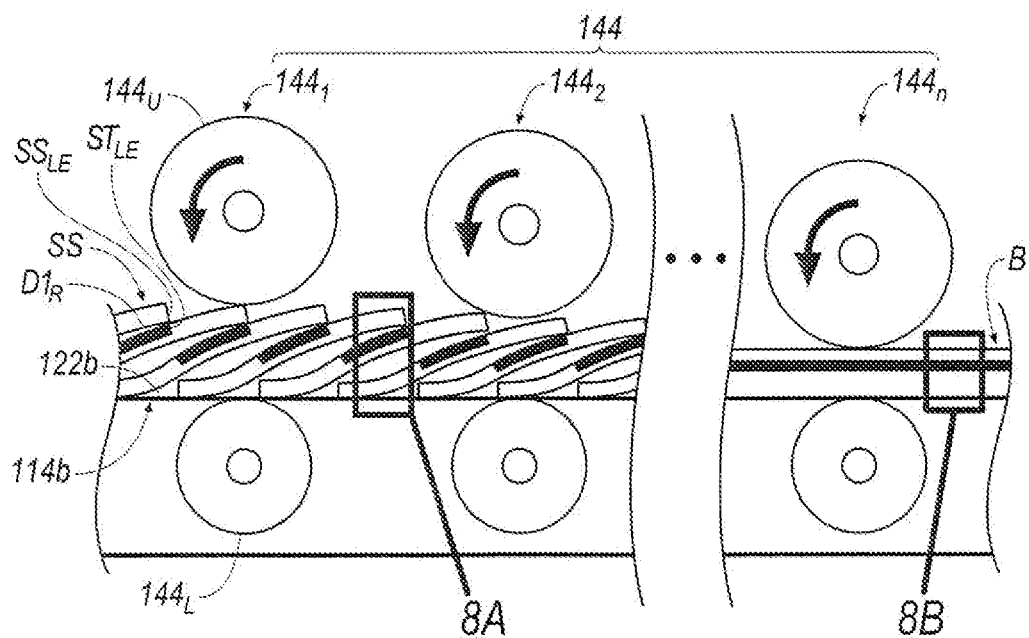
FIG. 7 is an enlarged view of a portion of the food product manufacturing system according to line 7 of FIG. 6B.
Figures 8A, 8B:
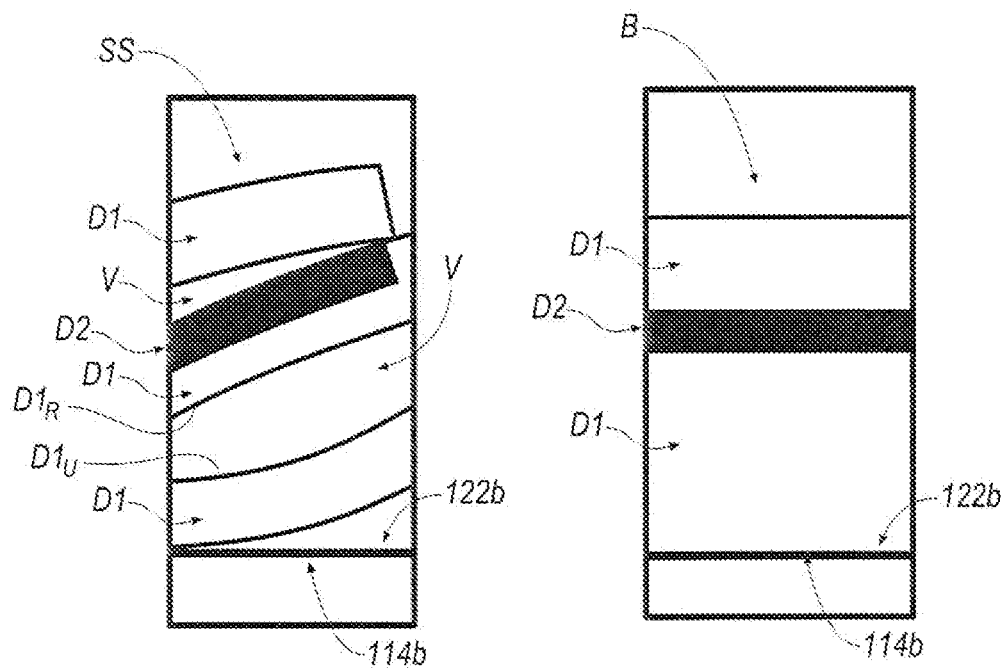
FIG. 8A is an enlarged view of a plurality of layers of first and second foodstuff deposits and a portion of the food product manufacturing system according to line 8A of FIG. 7.
FIG. 8B is an enlarged view of a plurality of layers of first and second foodstuff deposits defining a pre-baked food product body and a portion of the food product manufacturing system according to line 8B of FIG. 7.

The system 100 manufactures a baked food product F (see, e.g., FIGS. 6A-6B). The baked food product F is derived from at least a first foodstuff deposit D1 (see, e.g., FIGS. 5A, 5B) and a second foodstuff deposit D2 (see, e.g., FIGS. 5A, 5B). The baked food product F may be defined by several layers of the first foodstuff deposit D1 (e.g., approximately three layers of the first foodstuff deposit D1 as seen in FIGS. 7 and 8A) and at least one layer of the second foodstuff deposit D2 (e.g. approximately one layer of the second foodstuff deposit D2 as seen in FIGS. 7 and 8A). At least two layers of the first foodstuff deposit D1 encapsulates the at least one layer of the second foodstuff deposit D2. The first foodstuff deposit D1 may include dough. The second foodstuff deposit D2 may include a filling (such as, e.g., a fruit filling), a food coloring, a supplement (such as, e.g., a vitamin supplement) or the like.

As will be described in the following disclosure, the first foodstuff deposit D1 is metered in the form of an elongated sheet S (see, e.g., FIG. 5B). The second foodstuff deposit D2 is metered in the form of at least one strip ST (see, e.g., FIG. 5B) upon the elongated sheet S. The elongated sheet S including the at least one strip ST metered there-upon is subsequently divided into a plurality of sheet segments SS (see, e.g., FIG. 5B).

As seen in FIGS. 5A-5B, 6A-6B, the at least one strip ST metered upon the elongated sheet S is numerically defined to include one strip ST. Although one strip ST is metered upon the elongated sheet S according to the example described at FIGS. 5A-5B, 6A-6B, the at least one strip ST may be numerically defined to include more than one strip ST (see, e.g., FIGS. 17A-17B, 18A-18B where a first strip ST1 and a second strip ST2 are metered upon an elongated sheet S). Therefore, the at least one strip ST may include any desirable number of strips ST such as, for example, one, two, three, fourth, five or "n" strips (whereby "n" is any integer).

Referring to FIG. 5B, each sheet segment SS is defined by a length $L_{SS}$. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 5B, the at least one strip ST is defined by a width $W_{ST}$. The width $W_{ST}$ of the at least one strip ST is less than the width $W_{SS}$ of each sheet segment SS. As discussed in more detail below, the width $W_{ST}$ of the at least one strip ST may relate to a number of aligned layers L (FIG. 6B) formed by the sheet segments SS and the at least one strip ST. In an example, the width $W_{ST}$ of the at least one strip ST may be approximately equal to one-third of the width $W_{SS}$ of each sheet segment SS. In this regard, in some configurations, if the width $W_{ST}$ of the at least one strip ST is greater than one-third of the width $W_{SS}$ of each sheet segment SS, the at least one strip ST may define a continuous layer of the second foodstuff deposit D2 between consecutive layers of the first foodstuff deposit D1.

Furthermore, in order to realize the selective layering of the baked food product F described above whereby at least two layers of the first foodstuff deposit D1 encapsulates the at least one layer of the second foodstuff deposit D2, the at least one strip ST may be selectively metered upon the elongated sheet S at a distance away from a leading edge $S_{LE}$ of the elongated sheet S. The distance away from the leading edge $S_{LE}$ may be defined by a portion $W_{SS-P}$ of the width $W_{SS}$ of the elongated sheet S/each sheet segment SS. The portion $W_{SS-P}$ of the width $W_{SS}$ of the elongated sheet S/each sheet segment SS may be defined by a distance between the leading edge $S_{LE}$ of the elongated sheet S and a leading edge $ST_{LE}$ of the one strip ST. In an example, the distance (i.e., the portion $W_{SS-P}$ of the width $W_{SS}$ of each sheet segment SS) between the leading edge $ST_{LE}$ of the one strip ST and the leading edge $SS_{LE}$ of the sheet segment SS may be approximately equal to one-fourth of the width $W_{SS}$ of the elongated sheet S/each sheet segment SS.

With reference to FIGS. 5A and 5B, the system 100 may include a first conveyor 112a having a proximal end $112a_P$ and a distal end $112a_D$. The first conveyor 112a may include a belt 114a defined by a width $114a_W$ (see, e.g., FIG. 5B). The belt 114a may be rotatably supported by a proximal roller 116a (see, e.g., FIG. 5A) located at the proximal end $112a_P$ of the first conveyor 112a and a distal roller 118a (see, e.g., FIG. 5A) located at the distal end $112a_D$ of the first conveyor 112a.

A motor 120a (see, e.g., FIG. 5A) may be connected to one or both of the proximal roller 116a and the distal roller 118a in order to impart rotation of one or both of the proximal roller 116a and the distal roller 118a such that one or both of the proximal roller 116a and the distal roller 118a may rotatably drive the belt 114a according to the direction of arrow A1. Depending upon the rotated state of the belt 114a relative to the proximal roller 116a and the distal roller 118a, a segment of the belt 114a may generally define a foodstuff receiving surface 122a.

With reference to FIGS. 5A-5B and 6A-6B, the system 100 may include a second conveyor 112b having a proximal end $112b_P$ and a distal end $112b_D$. The second conveyor 112b may include a belt 114b defined by a width $114b_W$ (see, e.g., FIG. 6A) that is rotatably supported by a proximal roller 116b (see, e.g., FIG. 6B) located at the proximal end $112b_P$ of the second conveyor 112b and a distal roller 118b (see, e.g., FIG. 6B) located at the distal end $112b_D$ of the second conveyor 112b.

A motor 120b (see, e.g., FIG. 6B) may be connected to one or both of the proximal roller 116b and the distal roller 118b in order to impart rotation of one or both of the proximal roller 116b and the distal roller 118b such that one or both of the proximal roller 116b and the distal roller 118b may rotatably drive the belt 114b according to the direction of arrow A2. Depending upon the rotated state of the belt 114b relative to the proximal roller 116b and the distal roller 118b, a segment of the belt 114b may generally define a foodstuff receiving surface 122b.

As seen in FIGS. 5B and 6A, the second conveyor 112b may be transversely arranged with respect to the first conveyor 12a. In an example configuration, the second conveyor 12b is orthogonally arranged with respect to the first conveyor 112a. Accordingly, the driven direction A2 of the belt 114b of the second conveyor 112b is orthogonal to the driven direction A1 of the belt 114a of the first conveyor 112a.

As seen in FIGS. 5A-5B and 6A, the proximal end 112$b_P$ of the second conveyor 112b may be located near the distal end 112$a_D$ of the first conveyor 112a. Furthermore, as seen in FIG. 6A, a portion 122$b_P$ of the foodstuff receiving surface 122b of the belt 114b of the second conveyor 112b that may be located near the proximal end 112$b_P$ of the second conveyor 112b may be approximately equal to and may be aligned with the width 114$a_W$ of the belt 114a of the first conveyor 112a.

As seen in FIG. 5A, a first plane P1 may be aligned with and may extend across the foodstuff receiving surface 122a of the belt 114a of the first conveyor 112a. A second plane P2 may be aligned with and may extend across the foodstuff receiving surface 122b of the belt 114b of the second conveyor 112b. The second plane P2: (1) may not intersect with the first plane P1, (2) may be substantially parallel to the first plane P1, and (3) may be located spatially below the first plane P1 (i.e., the foodstuff receiving surface 122b of the belt 114b of the second conveyor 112b may be located below the foodstuff receiving surface 122a of the belt 114a of the first conveyor 112a such that sheet segments SS are permitted to fall with the assistance of gravity from the foodstuff receiving surface 122a of the belt 114a of the first conveyor 112a to the foodstuff receiving surface 122b of the belt 114b of the second conveyor 112b as the sheet segments SS are transported upon the belt 114a according to the direction of the arrow A1). As will be described in the following disclosure, by arranging the proximal end 112$b_P$ of the second conveyor 112b near the distal end 112$a_D$ of the first conveyor 112a, and, in conjunction with the arrangement the foodstuff receiving surface 122b of the belt 114b of the second conveyor 112b spatially below the foodstuff receiving surface 122a of the belt 114a of the first conveyor 112a, successive sheet segments SS may be transported from the distal end 112$a_D$ of the first conveyor 112a to the proximal end 112$b_P$ of the second conveyor 112b in a partially overlapped fashion in order to encapsulate at least one layer of the second foodstuff deposit D2 between at least two layers of the first foodstuff deposit D1 as described above.

Referring to FIGS. 5A and 5B, the system 100 may also include a first foodstuff deposit hopper 124. The first foodstuff hopper 124 may be located near the proximal end 112$a_P$ of the first conveyor 112a and may be arranged over a portion of the foodstuff receiving surface 122a of the belt 114a of the first conveyor 112a. The first foodstuff hopper 124 may include a sidewall 126 defining a foodstuff-containing cavity 128. Access to the foodstuff-containing cavity 128 is permitted by an upper opening 130 and a lower opening 132. The first foodstuff hopper 124 may also include a pair of metering rollers 134 that are arranged about the lower opening 132.

Prior to being arranged upon the foodstuff receiving surface 122a of the belt 114a of the first conveyor 112a, the first foodstuff deposit D1 may be stowed within the foodstuff-containing cavity 128. The first foodstuff deposit D1 is evacuated out of the foodstuff-containing cavity 128 by way of the lower opening 132 of the first foodstuff hopper 124. The motor 120a may be connected to the pair of metering rollers 134 to impart rotation to the pair of metering rollers 134 for metering the first foodstuff deposit D1 upon the foodstuff receiving surface 122a of the belt 114a of the first conveyor 112a at a controlled rate. The controlled metering rate of the first foodstuff deposit D1 in combination with a speed of rotation of one or both of the proximal roller 116a and the distal roller 118a rotatably driving the belt 114a according to the direction of arrow A1 results in the first foodstuff deposit D1 being arranged upon the foodstuff receiving surface 122a of the belt 114a of the first conveyor 112a in a substantially uniform thickness $T_{D1}$.

Referring to FIGS. 5A and 5B, the system 100 may also include a second foodstuff deposit hopper 136. The second foodstuff hopper 136 may be located downstream of the first foodstuff deposit hopper 124 and upstream of the distal end 112$a_D$ of the first conveyor 112a. The second foodstuff deposit hopper 136 may be arranged over a portion but not all of the width 114$a_W$ of the belt 114a of the first conveyor 112a defining the foodstuff receiving surface 122a of the belt 114a of the first conveyor 112a that supports the first foodstuff deposit D1 metered from the first foodstuff hopper 124. The second foodstuff hopper 136 may be selectively spatially arranged over the portion of the foodstuff receiving surface 122a of the belt 114a of the first conveyor 112a in order to meter the second foodstuff deposit D2 upon the first foodstuff deposit D1 at the above-described distance (see, e.g., $W_{SS-P}$) away from a leading edge $S_{LE}$ of the elongated sheet S. A metering rate of the second foodstuff deposit D2 from the second foodstuff hopper 136 may be determined by, for example: (1) the physical characteristics (e.g. viscosity) of the second foodstuff deposit D2, (2) an open/partially open state of a foodstuff metering valve 138 of the second foodstuff hopper 136 and (3) the speed of rotation of one or both of the proximal roller 116a and the distal roller 118a rotatably driving the belt 114a according to the direction of arrow A1. As such, the second foodstuff deposit D2 may be metered upon the first foodstuff deposit D1 in a substantially uniform thickness $T_{D2}$.

Referring to FIGS. 5A and 5B, the system 100 may also include a foodstuff channel-forming member 154. In some instances, the foodstuff channel-forming member 154 may include a wheel arranged at a distance $D_{154}$ (see, e.g., FIG. 5A) away from a portion of the foodstuff receiving surface 122a of the belt 114a of the first conveyor 112a. The motor 120a may be connected to the foodstuff channel-forming member 154 to impart rotation to the foodstuff channel-forming member 154. Alternatively, or, in addition to being connected to the motor 120a, the foodstuff channel-forming member 154 may be statically arranged over a portion of the foodstuff receiving surface 122a of the belt 114a of the first conveyor 112a at the distance $D_{154}$ by a support member (not shown).

The foodstuff channel-forming member 154 may be located downstream of the first foodstuff deposit hopper 124 and upstream of the second foodstuff deposit hopper 136. The distance $D_{154}$ at which the foodstuff channel-forming member 154 may be arranged over the foodstuff receiving surface 122a of the belt 114a of the first conveyor 112a is less than the thickness $T_{D1}$ of the metered first foodstuff deposit D1. As a result of the arrangement of the foodstuff channel-forming member 154 at the distance $D_{154}$ away from a portion of the foodstuff receiving surface 122a of the belt 114a of the first conveyor 112a, and, in light of the distance $D_{154}$ being less than the thickness $T_{D1}$ of the metered first foodstuff deposit D1, functionally, the foodstuff channel-forming member 154 interferes with the movement of the metered first foodstuff deposit D1 as the metered first foodstuff deposit D1 is transported upon the foodstuff receiving surface 122a of the belt 114a of the first conveyor 112a downstream in the direction of the arrow A1 toward the foodstuff channel-forming member 154. Therefore, the foodstuff channel-forming member 154 forms a secondfoodstuff-deposit-receiving-channel $D1_U$ (see, e.g., FIGS. 5B, 5B', 5B", 5B'") in the upper surface $D1_U$ of the first foodstuff deposit D1.

In a substantially similar fashion with respect to the second foodstuff deposit hopper 136, the foodstuff channel-forming member 154 may be selectively spatially arranged over the portion of the foodstuff receiving surface 122a of the belt 114a of the first conveyor 112a in order to form second-foodstuff-deposit-receiving-channel $D1_C$ in the upper surface $D1_U$ of the first foodstuff deposit D1 at the above-described distance (see, e.g., $W_{SS-P}$) away from a leading edge $S_{LE}$ of the elongated sheet S. Because the foodstuff channel-forming member 154 may be selectively spatially arranged over the portion of the foodstuff receiving surface 122a of the belt 114a of the first conveyor 112a at the above-described distance (see, e.g., $W_{SS-P}$) away from a leading edge $S_{LE}$ of the elongated sheet S, when the second foodstuff hopper 136 meters the second foodstuff deposit D2 upon the upper surface $D1_U$ of the first foodstuff deposit D1, the second foodstuff deposit D2 may be metered into and be substantially contained by the second-foodstuff-deposit-receiving-channel $D1_C$ formed in the upper surface $D1_U$ of the first foodstuff deposit D1.

Referring to FIGS. 5B', 5B" and 5B'", the amount of the second foodstuff deposit D2 metered by the second foodstuff hopper 136 defining the thickness $T_{D2}$ of the second foodstuff deposit D2 may result in the second-foodstuff-deposit-receiving-channel $D1_C$ being: (1) entirely filled (see, e.g., FIG. 5B'), (2) partially filled (see, e.g., FIG. 5B") or (3) over-filled (see, e.g., FIG. 5B'"). In an example, when the second foodstuff deposit D2 metered by the second foodstuff hopper 136 entirely fills the second-foodstuff-deposit-receiving-channel $D1_C$ as seen in FIG. 5B', an upper surface $D2_U$ of the second foodstuff deposit D2 is substantially co-planar with/substantially aligned with the upper surface $D1_U$ of the first foodstuff deposit D1. In some instances, when the second foodstuff deposit D2 metered by the second foodstuff hopper 136 partially fills the second-foodstuff-deposit-receiving-channel $D1_C$ as seen in FIG. 5B", a portion of the thickness $T_{D1}$ of the first foodstuff deposit D1 that is upset by the second-foodstuff-deposit-receiving-channel $D1_C$ is not filled with the second foodstuff deposit D2 thereby resulting in the upper surface $D2_U$ of the second foodstuff deposit D2 being lower than the upper surface $D1_U$ of the first foodstuff deposit D1 such that the upper surface $D2_U$ of the second foodstuff deposit D2 is not co-planar with/not aligned with the upper surface $D1_U$ of the first foodstuff deposit D1. In other instances, when the second foodstuff deposit D2 metered by the second foodstuff hopper 136 over-fills the second-foodstuff-deposit-receiving-channel $D1_C$ as seen in FIG. 5B'", the volume of the second foodstuff deposit D2 metered by the second foodstuff hopper 136 exceeds the available volume defined by the second-foodstuff-deposit-receiving-channel $D1_C$ such that the upper surface $D2_U$ of the second foodstuff deposit D2 is higher than the upper surface $D1_U$ of the first foodstuff deposit D1, and, therefore, is not co-planar with/not aligned with the upper surface $D1_U$ of the first foodstuff deposit D1.

Referring to FIGS. 5A and 5B, the system 100 may also include a first slicing blade 140. The first slicing blade 140 may be located downstream of the second foodstuff deposit hopper 136 and upstream of the distal end $112a_D$ of the first conveyor 112a. The first slicing blade 140 may be arranged over a portion of the foodstuff receiving surface 122a of the belt 114a of the first conveyor 112a that supports the first foodstuff deposit D1 including the second foodstuff deposit D2 metered thereupon. The first slicing blade 140 is defined by a width $W_{140}$ (see, e.g., FIG. 5B) that may be greater than the width $W_{SS}$ of the elongated sheet S/each sheet segment SS.

Referring to FIG. 5A, an actuator 142 may be connected to the first slicing blade 140 in order to impart a periodic plunging motion to the first slicing blade 140 for causing the first slicing blade 140 to penetrate through both of the thickness $T_{D1}$ of the first foodstuff deposit D1 and the thickness $T_{D2}$ of the second foodstuff deposit D2. The periodic plunging motion of the first slicing bade 140 in combination with the speed of rotation of one or both of the proximal roller 116a and the distal roller 118a rotatably driving the belt 114a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length $L_{SS}$.

The speed of rotation of one or both of the proximal roller 116a and the distal roller 118a rotatably driving the belt 114a according to the direction of arrow A1 serially transports each sheet segment SS toward the distal end $112a_D$ of the first conveyor 112a. Once each sheet segment SS reaches the distal end $112a_D$ of the first conveyor 112a, each sheet segment SS is permitted to fall with the assistance of gravity from the foodstuff receiving surface 122a of the belt 114a of the first conveyor 112a toward the foodstuff receiving surface 122b of the belt 114b of the second conveyor 112b. The portion $122b_P$ of the foodstuff receiving surface 122b of the belt 114b of the second conveyor 112b that may be located near the proximal end $112b_P$ of the second conveyor 112b and aligned with the width $114a_W$ of the belt 114a of the first conveyor 112a at least partially directly receives each sheet segment SS from the distal end $112a_D$ of the first conveyor 112a.

The speed of rotation of one or both of the proximal roller 116b and the distal roller 118b rotatably driving the belt 114b of the second conveyor 112b according to the direction of arrow A2 transports each sheet segment SS toward the distal end $112b_D$ of the second conveyor 112b. As seen in FIG. 6B, the speed of rotation of one or both of the proximal roller 116b and the distal roller 118b rotatably driving the belt 114b of the second conveyor 112b may be selectively controlled (and, in some instances, is referenced from the speed of rotation of one or both of the proximal roller 116a and the distal roller 118a rotatably driving the belt 114a of the first conveyor 112a) in order to arrange: (1) a first portion of a rear surface $D1_R$ of the first foodstuff deposit D1 of a sheet segment SS transported from foodstuff receiving surface 122a of the belt 114a of the first conveyor 112a upon the foodstuff receiving surface 122b of the belt 114b of the second conveyor 112b and (2) a second portion of the rear surface $D1_R$ of the first foodstuff deposit D1 of the sheet segment SS transported from foodstuff receiving surface 122a of the belt 114a of the first conveyor 112a over: the second foodstuff deposit D2 and a portion of an upper surface $D1_U$ of a first foodstuff deposit D1 of a sheet segment SS that was immediately previously transported from foodstuff receiving surface 122a of the belt 114a of the first conveyor 112a upon the foodstuff receiving surface 122b of the belt 114b of the second conveyor 112b. As a result, a portion of the sheet segment SS that was previously transported from the foodstuff receiving surface 122a of the belt 114a of the first conveyor 112a to the foodstuff receiving surface 122b of the belt 114b of the second conveyor 112b may be partially laminated by the rear surface $D1_R$ of the first foodstuff deposit D1 of the sheet segment SS that is subsequently transported from the foodstuff receiving surface 122a of the belt 114a of the first conveyor 112a to the foodstuff receiving surface 122b of the belt 114b of the second conveyor 112b in order to thereby entirely encapsulate the second foodstuff deposit D2 between at least two layers of the first foodstuff deposit D1 defined by: (a) the first foodstuff deposit D1 directly supporting the second foodstuff deposit D2 and the rear surface $D1_R$ of the first foodstuff deposit D1 of the sheet segment SS that is subsequently transported from the foodstuff receiving surface 122a of the belt 114a of the first conveyor 112a to the foodstuff receiving surface 122b of the belt 114b of the second conveyor 112b. Furthermore, a portion of the rear surface $D1_R$ of the first foodstuff deposit D1 of the sheet segment SS that is subsequently transported from the foodstuff receiving surface 122a of the belt 114a of the first conveyor 112a to the foodstuff receiving surface 122b of the belt 114b of the second conveyor 112b is disposed over a portion of the upper surface $D1_U$ first foodstuff deposit D1 that: (1) does not support the second foodstuff deposit D2 and (2) is not defined by the width $W_{SS}$ of each sheet segment SS between the leading edge $ST_{LE}$ of the elongated strip ST and the leading edge $SS_{LE}$ of the sheet segment SS.

Referring to FIGS. 5B and 6A, regarding the encapsulation of the second foodstuff deposit D2 between at least two layers of the first foodstuff deposit D1 described above, in an example, the speed of rotation of one or both of the proximal roller 116b and the distal roller 118b rotatably driving the belt 114b of the second conveyor 112b may be selectively controlled in order to arrange a leading edge $SS_{LE}$ of a sheet segment SS in the immediate process of being transported from the foodstuff receiving surface 122a of the belt 114a of the first conveyor 112a to the foodstuff receiving surface 122b of the belt 114b of the second conveyor 112b at least directly over, or, alternatively, slightly ahead (as seen in FIGS. 6B and 7) of a leading edge $ST_{LE}$ of a strip ST (defined by the second foodstuff deposit D2) of a sheet segment SS that was immediately previously transported from the foodstuff receiving surface 122a of the belt 114a of the first conveyor 112a to the foodstuff receiving surface 122b of the belt 114b of the second conveyor 112b. As a result, the strip ST of each sheet segment SS that had been previously transported from the foodstuff receiving surface 122a of the belt 114a of the first conveyor 112a to the foodstuff receiving surface 122b of the belt 114b of the second conveyor 112b is covered by a portion of the rear surface $D1_R$ of the first foodstuff deposit D1 of a sheet segment SS that was subsequently deposited thereon.

Referring to FIGS. 6A and 6B, the system 100 may also include one or more pairs of compression rollers $144_1$, $144_2 \ldots 144_n$ arranged about the belt 114b of the second conveyor 112b. If more than one pair of compression rollers $144_1$, $144_2 \ldots 144_n$ are included in the system 100, the more than one pair of compression rollers $144_1$, $144_2 \ldots 144_n$ may be referred to as a plurality of compression rollers 144. The one or more pairs of compression rollers $144_1$, $144_2 \ldots 144_n$ arranged about the second conveyor 112b may be located near the proximal end $112b_P$ of the second conveyor 112b and downstream of the portion $122b_P$ of the foodstuff receiving surface 122b of the belt 114b of the second conveyor 112b that may be aligned with the width $114a_W$ of the belt 114a of the first conveyor 112a.

Each pair compression rollers $144_1$, $144_2 \ldots 144_n$ of the one or more pairs compression rollers $144_1$, $144_2 \ldots 144_n$ includes an upper compression roller $144_U$ and a lower compression roller $144_L$. The lower compression roller $144_L$ may be arranged adjacent the belt 114b of the second conveyor 112b. The surface of the belt 114b that the lower compression roller $144_L$ is arranged adjacent is opposite the foodstuff receiving surface 122b of the belt 114b of the second conveyor 112b.

The upper compression roller $144_U$ may be arranged in a spaced-apart relationship with respect to the foodstuff receiving surface 122b of the belt 114b of the second conveyor 112b. A gap or spacing between the upper compression roller $144_U$ and the foodstuff receiving surface 122b of the belt 114b of the second conveyor 112b is defined by a distance (see, e.g., $D_{144-1}$, $D_{144-1} \ldots D_{144-n}$). When more than one pair of compression rollers $144_1$, $144_2 \ldots 144_n$ are included in the system 100, the distance $D_{144-1}$, $D_{144-1} \ldots D_{144-n}$ defining the gap or spacing between the upper compression roller $144_U$ and the foodstuff receiving surface 122b of the belt 114b of the second conveyor 112b for each successive pair of compression rollers $144_1$, $144_2 \ldots 144_n$ may progressively decrease in dimension.

As one or both of the proximal roller 116b and the distal roller 118b rotatably drives the belt 114b of the second conveyor 112b according to the direction of arrow A2, the plurality of partially overlapped sheet segments SS are passed through the gaps or spacings defined by the distance $D_{144-1}$, $D_{144-1} \ldots D_{144-n}$. Because the partially overlapped sheet segments SS are defined by a height dimension that may be approximately equal to but slightly greater than the gap or spacing defined by the first distance $D_{144-1}$ associated with the first pair of compression rollers $144_1$, the upper compression roller $144_U$ of the first pair of compression rollers $144_1$ directly engages the upper surface $D1_U$ (defined by a first foodstuff deposit D1) of each sheet segment SS of the partially overlapped sheet segments SS for compressing the partially overlapped sheet segments SS between the upper compression roller $144_U$ of the first pair of compression rollers $144_1$ and the foodstuff receiving surface 122b of the belt 114b of the second conveyor 112b. As the partially overlapped sheet segments SS are passed through one or more subsequent gaps (e.g., $D_{144-1} \ldots D_{144-n}$) that progressively decrease in dimension, the partially overlapped sheet segments SS are further compressed in a substantially similar manner as described above.

As a result of being passed through the one or more gaps or spacings defined by the one or more pairs of compression rollers $144_1$, $144_2 \ldots 144_n$ described above, most or all of the voids V (see, e.g., FIG. 8A) between opposing layers of the first foodstuff deposit D1 (i.e., defined by a gap or spacing between a portion of the rear surface $D1_R$ of the first foodstuff deposit D1 and a portion of the upper surface $D1_U$ of an adjacent first foodstuff deposit D1) are negated as a result of the one or more pairs of compression rollers $144_1$, $144_2 \ldots 144_n$ compressing and thereby vertically shifting the material defining the first foodstuff deposit D1 into the gap or spacing defined by the voids V. When the material defining the first foodstuff deposit D1 is vertically shifted, the portion of the rear surface $D1_R$ of the first foodstuff deposit D1 and the portion of the upper surface $D1_U$ of the adjacent first foodstuff deposit D1 bind together. Furthermore, as the material defining the first foodstuff deposit D1 is shifted into the gap or spacing defined by the voids V, the second foodstuff deposit D2 in the form of at least one strip ST of each sheet segment SS is similarly vertically displaced into an area previously spatially occupied by the underlying (and vertically shifted) first foodstuff deposit D1. In particular, as the second foodstuff deposit D2 in the form of at least one strip ST of each sheet segment SS is shifted, the second foodstuff deposit D2 in the form of at least one strip ST of each sheet segment SS ultimately appears to merge into a substantially constant, uninterrupted layer defined by the second foodstuff deposit D2. As illustrated in FIG. 6B, in some configurations, the system 100 may include three aligned layers L1, L2, L3 formed by successive sheet segments SS and by the at least one strip ST. In such a configuration, if the width $W_{ST}$ of the at least one strip ST is greater than or equal to one-third of the width $W_{SS}$ of each sheet segment SS, the at least one strip ST may merge into the substantially constant, uninterrupted layer defined by the second foodstuff deposit D2 between consecutive layers of the first foodstuff deposit D1. In this regard, if the system includes "n" layers formed by successive sheet segments SS and the at least one strip ST, the at least one strip ST may merge into the substantially constant, uninterrupted layer defined by the second foodstuff deposit D2 between consecutive layers of the first foodstuff deposit D1 if the width $W_{ST}$ of the at least one strip ST is greater than or equal to the width $W_{SS}$ of each sheet segment SS divided by "n." Conversely, if the width $W_{ST}$ of the at least one strip ST is less than the width $W_{SS}$ of each sheet segment SS divided by "n," the at least one strip ST defined by the second foodstuff deposit D2 may be interrupted between consecutive layers of the first foodstuff deposit D1.

After passing through the one or more gaps or spacings defined by the one or more pairs compression rollers $144_1$, $144_2 \ldots 144_n$, the sheet segments SS are integrated into an elongated, pre-baked food product body B (see, e.g., FIGS. 6A-6B, 8B).

The elongated, pre-baked food product body B is generally defined by: (1) a first thickness segment defined by approximately one layer of the first foodstuff deposit D1, (2) a second thickness segment defined by approximately one layer of the second foodstuff deposit D2 and (3) a third thickness segment defined by approximately two layers of the first foodstuff deposit D1. As seen in FIG. 8B, a rear surface of the third thickness segment defined by approximately two layers of the first foodstuff deposit D1 is supported upon the foodstuff receiving surface 122b of the belt 114b of the second conveyor 112b.

Referring to FIGS. 6A and 6B, the system 100 may also include a second slicing blade 146. The second slicing blade 146 may be located downstream of the one or more compression rollers $144_1$, $144_2 \ldots 144_n$ and upstream of the distal end $112b_D$ of the second conveyor 112b. The second slicing blade 146 may be arranged over a portion of the foodstuff receiving surface 122b of the belt 114b of the second conveyor 112b that supports the elongated, pre-baked food product body B. The second slicing blade 146 is defined by a width $W_{146}$ (see, e.g., FIG. 6A) that may be greater than a width $W_B$ (see, e.g., FIG. 6A) of the elongated, pre-baked food product body B.

Referring to FIG. 6B, an actuator 148 may be connected to the second slicing blade 146 in order to impart a periodic plunging motion to the second slicing blade 146 for causing the second slicing blade 146 to penetrate through a thickness $T_B$ (see, e.g., FIG. 6B) of the elongated, pre-baked food product body B. The periodic plunging motion of the second slicing bade 146 in combination with the speed of rotation of one or both of the proximal roller 116b and the distal roller 118b rotatably driving the belt 114b according to the direction of arrow A2 results in the elongated, pre-baked food product body B being cut into a plurality of pre-baked food product body units U having any desirable shape, size or dimension.

Referring to FIGS. 6A and 6B, the system 100 may also include an oven 150. The oven 150 may be located downstream of the second slicing blade 146 and upstream of the distal end $112b_D$ of the second conveyor 112b. The oven 150 is arranged about the foodstuff receiving surface 122b of the belt 114b of the second conveyor 112b that supports the plurality of pre-baked food product body units U. As one or both of the proximal roller 116b and the distal roller 118b rotatably drives the belt 114b of the second conveyor 112b according to the direction of arrow A2, the plurality of pre-baked food product body units U are passed through the oven 150 in order to bake the plurality of pre-baked food product body units U.

Upon the plurality of pre-baked food product body units U exiting the oven 150 according to the direction of arrow A2, the plurality of pre-baked food product body units U may then be referred to as baked food products F. As one or both of the proximal roller 116b and the distal roller 118b rotatably drives the belt 114b of the second conveyor 112b according to the direction of arrow A2, the baked food products F may fall with the assistance of gravity off of the distal end $112b_D$ of the second conveyor 112b for subsequent processing or packaging.

Referring to FIGS. 5A-5B, 6A-6B, the system 100 may also include a controller 152. The controller 152 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)).

The controller 152 may be communicatively coupled (i.e., wirelessly connected or hardwired) to any of the above-described components (e.g., components 120a, 120b, 134, 138, 142, 144, 148, 150, 154) of the system 100 in order to control any of the components. For example, the controller 152 may control the motors 120a/120b for controlling the rate of rotation of the one or both of the proximal roller 116a/116b and the distal roller 118a/118b that rotatably drives the belt 114a/114b of the first conveyor 112a/the second conveyor 112b. In another example, the controller 152 may control the rotation of the pair of metering rollers 134 in order to control the rate of the amount of the first foodstuff deposit D1 being metered upon the foodstuff receiving surface 122a of the belt 114a of the first conveyor 112a. In yet another example, the controller 152 may control an open/partially open/closed state of the foodstuff metering valve 138 of the second foodstuff hopper 136 in order to control the rate of the amount of the second foodstuff deposit D2 being metered upon the first foodstuff deposit D1. In an example, the controller 152 may control the state of the actuator 142/148 for controlling the frequency of the periodic plunging motion of the first slicing blade 140/the second slicing blade 146. In another example, the controller 152 may control the motor 120b for controlling a rate of rotation of one or more of the upper compression roller $144_U$ and the lower compression roller $144_L$ of the one or more pairs compression rollers $144_1$, $144_2 \ldots 144_n$. In yet another example, the controller 152 may control the on state, off state and/or temperature of the oven 150. In another example, the controller 152 may control the motors 120a for controlling the rate of rotation of the foodstuff channel-forming member 154.

Figure 9A:
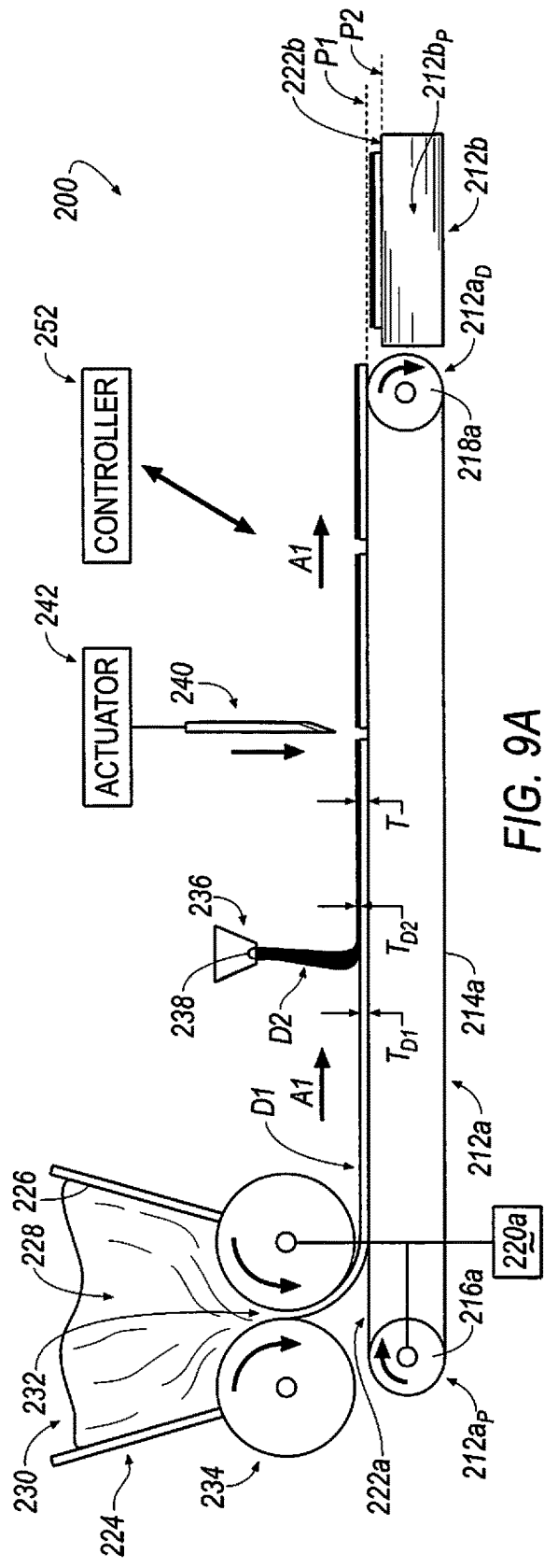
FIG. 9A is a side view of a portion of an exemplary food product manufacturing system.
Figure 9B:
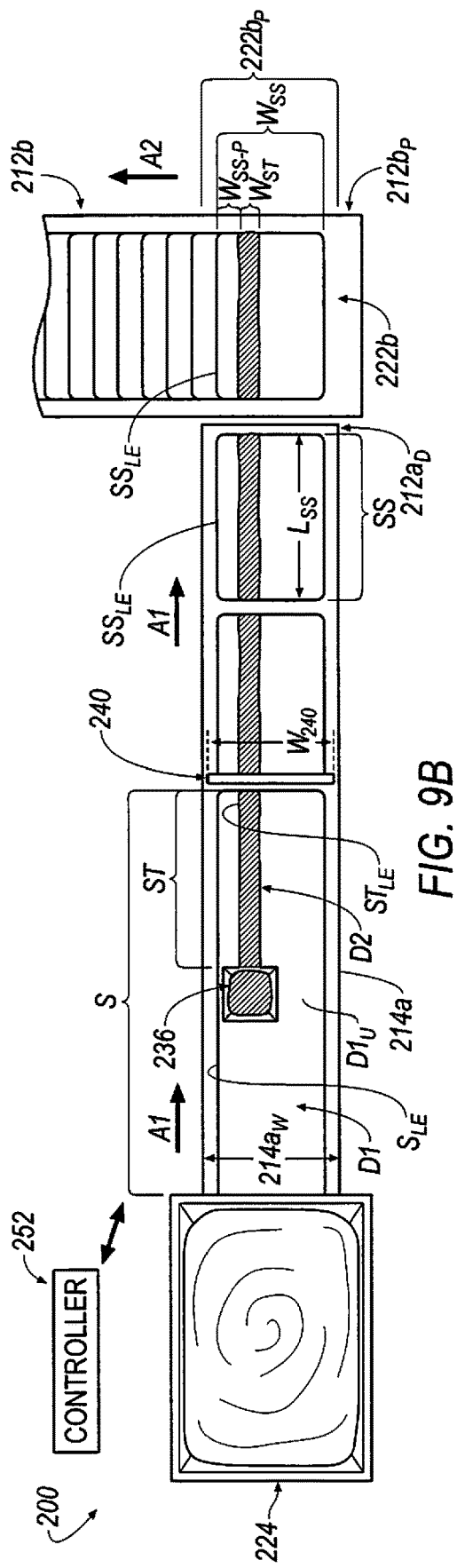
FIG. 9B is a top view of the portion of the food product manufacturing system of FIG. 9A.

Referring to FIGS. 9A-9B and 10A-10B, an exemplary food product manufacturing system is shown generally at 200. FIGS. 9A-9B illustrates a first portion of the food product manufacturing system 200. FIGS. 10A-10B illustrates a second portion of the food product manufacturing system 200. The food product manufacturing system 200 is hereinafter referred to as "the system."

Figure 11:
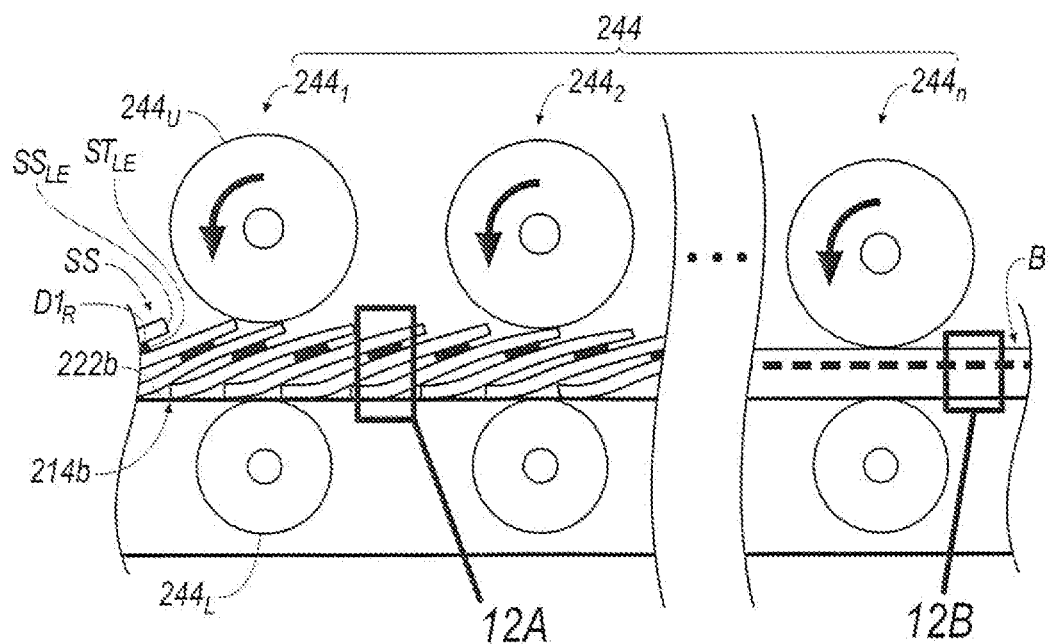
FIG. 11 is an enlarged view of a portion of the food product manufacturing system according to line 11 of FIG. 10B.
Figures 12A, 12B:
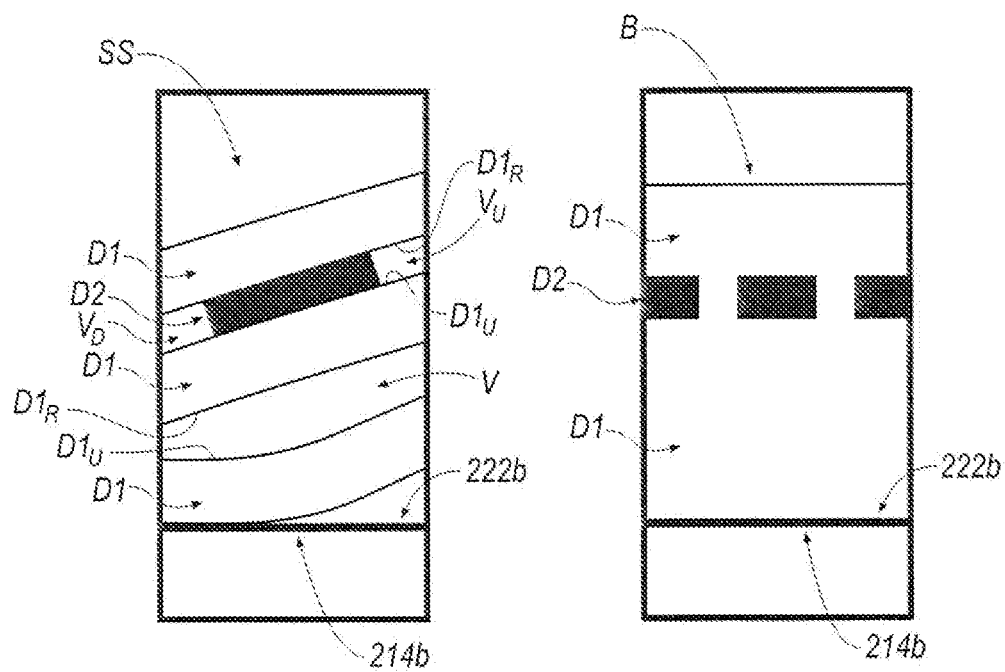
FIG. 12A is an enlarged view of a plurality of layers of first and second foodstuff deposits and a portion of the food product manufacturing system according to line 12A of FIG. 11.
FIG. 12B is an enlarged view of a plurality of layers of first and second foodstuff deposits defining a pre-baked food product body and a portion of the food product manufacturing system according to line 12B of FIG. 11.

The system 200 manufactures a baked food product F (see, e.g., FIGS. 10A-10B). The baked food product F is derived from at least a first foodstuff deposit D1 (see, e.g., FIGS. 9A, 9B) and a second foodstuff deposit D2 (see, e.g., FIGS. 9A, 9B). The baked food product F may be defined by several layers of the first foodstuff deposit D1 (e.g., approximately three layers of the first foodstuff deposit D1 as seen in FIGS. 11 and 12A) and at least one layer of the second foodstuff deposit D2 (e.g. approximately one layer of the second foodstuff deposit D2 as seen in FIGS. 11 and 12A). At least two layers of the first foodstuff deposit D1 encapsulates the at least one layer of the second foodstuff deposit D2. The first foodstuff deposit D1 may include dough. The second foodstuff deposit D2 may include a filling (such as, e.g., a fruit filling), a food coloring, a supplement (such as, e.g., a vitamin supplement) or the like.

As will be described in the following disclosure, the first foodstuff deposit D1 is metered in the form of an elongated sheet S (see, e.g., FIG. 9B). The second foodstuff deposit D2 is metered in the form of at least one strip ST (see, e.g., FIG. 9B) upon the elongated sheet S. The elongated sheet S including the at least one strip ST metered there-upon is subsequently divided into a plurality of sheet segments SS (see, e.g., FIG. 9B).

As seen in FIGS. 9A-9B, 10A-10B, the at least one strip ST metered upon the elongated sheet S is numerically defined to include one strip ST. Although one strip ST is metered upon the elongated sheet S according to the example described at FIGS. 9A-9B, 10A-10B, the at least one strip ST may be numerically defined to include more than one strip ST (see, e.g., FIGS. 17A-17B, 18A-18B where a first strip ST1 and a second strip ST2 are metered upon an elongated sheet S). Therefore, the at least one strip ST may include any desirable number of strips ST such as, for example, one, two, three, fourth, five or "n" strips (whereby "n" is any integer).

Referring to FIG. 9B, each sheet segment SS is defined by a length $L_{SS}$. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 9B, the at least one strip ST is defined by a width $W_{ST}$. The width $W_{ST}$ of the at least one strip ST is less than the width $W_{SS}$ of each sheet segment SS. Unlike the examples described above at FIGS. 1B and 5B, the width $W_{ST}$ of the at least one strip ST seen at FIG. 9B is not approximately equal to one-third of the width $W_{SS}$ of each sheet segment SS; rather, in an example, the width $W_{ST}$ of the at least one strip ST may be approximately equal to an amount less than one-third (e.g., approximately one-fifth) of the width $W_{SS}$ of each sheet segment SS. As will be described in the following disclosure at FIGS. 10B, 11, 12A, 12B, as a result of the comparatively smaller width $W_{ST}$ of the at least one strip ST of the example seen at FIG. 9B when compared to the width $W_{ST}$ of the at least one strip ST of the previously-described examples at FIGS. 1B and 5B, the layer of the second foodstuff deposit D2 of the baked food product F may appear to be periodically interrupted by the first foodstuff deposit D1 as opposed to being formed to include a substantially constant, uninterrupted layer that separates an upper first foodstuff deposit layer D1 from a lower first foodstuff deposit later D1.

Furthermore, in order to realize the selective layering of the baked food product F described above at FIGS. 11 and 12A whereby at least two layers of the first foodstuff deposit D1 encapsulates the at least one layer of the second foodstuff deposit D2, the at least one strip ST may be selectively metered upon the elongated sheet S at a distance away from a leading edge $S_{LE}$ of the elongated sheet S. The distance away from the leading edge $S_{LE}$ may be defined by a portion $W_{SS-P}$ of the width $W_{SS}$ of the elongated sheet S/each sheet segment SS. The portion $W_{SS-P}$ of the width $W_{SS}$ of the elongated sheet S/each sheet segment SS may be defined by a distance between the leading edge $S_{LE}$ of the elongated sheet S and a leading edge $ST_{LE}$ of the one strip ST. In an example, the distance (i.e., the portion $W_{SS-P}$ of the width $W_{SS}$ of each sheet segment SS) between the leading edge $ST_{LE}$ of the one strip ST and the leading edge $SS_{LE}$ of the sheet segment SS may be approximately equal to one-fourth of the width $W_{SS}$ of the elongated sheet S/each sheet segment SS.

With reference to FIGS. 9A and 9B, the system 200 may include a first conveyor 212a having a proximal end $212a_P$ and a distal end $212a_D$. The first conveyor 212a may include a belt 214a defined by a width $214a_W$ (see, e.g., FIG. 9B). The belt 214a may be rotatably supported by a proximal roller 216a (see, e.g., FIG. 9A) located at the proximal end $212a_P$ of the first conveyor 212a and a distal roller 218a (see, e.g., FIG. 9A) located at the distal end $212a_D$ of the first conveyor 212a.

A motor 220a (see, e.g., FIG. 9A) may be connected to one or both of the proximal roller 216a and the distal roller 218a in order to impart rotation of one or both of the proximal roller 216a and the distal roller 218a such that one or both of the proximal roller 216a and the distal roller 218a may rotatably drive the belt 214a according to the direction of arrow A1. Depending upon the rotated state of the belt 214a relative to the proximal roller 216a and the distal roller 218a, a segment of the belt 214a may generally define a foodstuff receiving surface 222a.

With reference to FIGS. 9A-9B and 10A-10B, the system 200 may include a second conveyor 212b having a proximal end $212b_P$ and a distal end $212b_D$. The second conveyor 212b may include a belt 214b defined by a width $214b_W$ (see, e.g., FIG. 10A) that is rotatably supported by a proximal roller 216b (see, e.g., FIG. 10B) located at the proximal end $212b_P$ of the second conveyor 212b and a distal roller 218b (see, e.g., FIG. 10B) located at the distal end $212b_D$ of the second conveyor 212b.

A motor 220b (see, e.g., FIG. 10B) may be connected to one or both of the proximal roller 216b and the distal roller 218b in order to impart rotation of one or both of the proximal roller 216b and the distal roller 218b such that one or both of the proximal roller 216b and the distal roller 218b may rotatably drive the belt 214b according to the direction of arrow A2. Depending upon the rotated state of the belt 214b relative to the proximal roller 216b and the distal roller 218b, a segment of the belt 214b may generally define a foodstuff receiving surface 222b.

As seen in FIGS. 9B and 10A, the second conveyor 212b may be transversely arranged with respect to the first conveyor 12a. In an example configuration, the second conveyor 12b is orthogonally arranged with respect to the first conveyor 212a. Accordingly, the driven direction A2 of the belt 214b of the second conveyor 212b is orthogonal to the driven direction A1 of the belt 214a of the first conveyor 212a.

As seen in FIGS. 9A-9B and 10A, the proximal end $212b_P$ of the second conveyor 212b may be located near the distal end 212a$_D$ of the first conveyor 212a. Furthermore, as seen in FIG. 10A, a portion 222b$_P$ of the foodstuff receiving surface 222b of the belt 214b of the second conveyor 212b that may be located near the proximal end 212b$_P$ of the second conveyor 212b may be approximately equal to and may be aligned with the width 214a$_W$ of the belt 214a of the first conveyor 212a.

As seen in FIG. 9A, a first plane P1 may be aligned with and may extend across the foodstuff receiving surface 222a of the belt 214a of the first conveyor 212a. A second plane P2 may be aligned with and may extend across the foodstuff receiving surface 222b of the belt 214b of the second conveyor 212b. The second plane P2: (1) may not intersect with the first plane P1, (2) may be substantially parallel to the first plane P1, and (3) may be located spatially below the first plane P1 (i.e., the foodstuff receiving surface 222b of the belt 214b of the second conveyor 212b may be located below the foodstuff receiving surface 222a of the belt 214a of the first conveyor 212a such that sheet segments SS are permitted to fall with the assistance of gravity from the foodstuff receiving surface 222a of the belt 214a of the first conveyor 212a to the foodstuff receiving surface 222b of the belt 214b of the second conveyor 212b as the sheet segments SS are transported upon the belt 214a according to the direction of the arrow A1). As will be described in the following disclosure, by arranging the proximal end 212b$_P$ of the second conveyor 212b near the distal end 212a$_D$ of the first conveyor 212a, and, in conjunction with the arrangement the foodstuff receiving surface 222b of the belt 214b of the second conveyor 212b spatially below the foodstuff receiving surface 222a of the belt 214a of the first conveyor 212a, successive sheet segments SS may be transported from the distal end 212a$_D$ of the first conveyor 212a to the proximal end 212b$_P$ of the second conveyor 212b in a partially overlapped fashion in order to encapsulate at least one layer of the second foodstuff deposit D2 between at least two layers of the first foodstuff deposit D1 as described above.

Referring to FIGS. 9A and 9B, the system 200 may also include a first foodstuff deposit hopper 224. The first foodstuff hopper 224 may be located near the proximal end 212a$_P$ of the first conveyor 212a and may be arranged over a portion of the foodstuff receiving surface 222a of the belt 214a of the first conveyor 212a. The first foodstuff hopper 224 may include a sidewall 226 defining a foodstuff-containing cavity 228. Access to the foodstuff-containing cavity 228 is permitted by an upper opening 230 and a lower opening 232. The first foodstuff hopper 224 may also include a pair of metering rollers 234 that are arranged about the lower opening 232.

Prior to being arranged upon the foodstuff receiving surface 222a of the belt 214a of the first conveyor 212a, the first foodstuff deposit D1 may be stowed within the foodstuff-containing cavity 228. The first foodstuff deposit D1 is evacuated out of the foodstuff-containing cavity 228 by way of the lower opening 232 of the first foodstuff hopper 224. The motor 220a may be connected to the pair of metering rollers 234 to impart rotation to the pair of metering rollers 234 for metering the first foodstuff deposit D1 upon the foodstuff receiving surface 222a of the belt 214a of the first conveyor 212a at a controlled rate. The controlled metering rate of the first foodstuff deposit D1 in combination with a speed of rotation of one or both of the proximal roller 216a and the distal roller 218a rotatably driving the belt 214a according to the direction of arrow A1 results in the first foodstuff deposit D1 being arranged upon the foodstuff receiving surface 222a of the belt 214a of the first conveyor 212a in a substantially uniform thickness T$_{D1}$.

Referring to FIGS. 9A and 9B, the system 200 may also include a second foodstuff deposit hopper 236. The second foodstuff hopper 236 may be located downstream of the first foodstuff deposit hopper 224 and upstream of the distal end 212a$_D$ of the first conveyor 212a. The second foodstuff deposit hopper 236 may be arranged over a portion but not all of the width 214a$_W$ of the belt 214a of the first conveyor 212a defining the foodstuff receiving surface 222a of the belt 214a of the first conveyor 212a that supports the first foodstuff deposit D1 metered from the first foodstuff hopper 224. The second foodstuff hopper 236 may be selectively spatially arranged over the portion of the foodstuff receiving surface 222a of the belt 214a of the first conveyor 212a in order to meter the second foodstuff deposit D2 upon the first foodstuff deposit D1 at the above-described distance (see, e.g., W$_{SS-P}$) away from a leading edge S$_{LE}$ of the elongated sheet S. A metering rate of the second foodstuff deposit D2 from the second foodstuff hopper 236 may be determined by, for example: (1) the physical characteristics (e.g. viscosity) of the second foodstuff deposit D2, (2) an open/partially open state of a foodstuff metering valve 238 of the second foodstuff hopper 236 and (3) the speed of rotation of one or both of the proximal roller 216a and the distal roller 218a rotatably driving the belt 214a according to the direction of arrow A1. As such, the second foodstuff deposit D2 may be metered upon the first foodstuff deposit D1 in a substantially uniform thickness T$_{D2}$.

The system 200 may also include a foodstuff channel-forming member (not shown but similar to that shown and described above at reference numeral 154 in FIGS. 5A, 5B). The motor 220a may be connected to the foodstuff channel-forming member to impart rotation to the foodstuff channel-forming member. Alternatively, or, in addition to being connected to the motor 220a, the foodstuff channel-forming member may be statically arranged over a portion of the foodstuff receiving surface 222a of the belt 214a of the first conveyor 212a at a distance by a support member (not shown). As described above, the foodstuff channel-forming member interferes with the movement of the metered first foodstuff deposit D1 as the metered first foodstuff deposit D1 is transported upon the foodstuff receiving surface 222a of the belt 214a of the first conveyor 212a downstream in the direction of the arrow A1 toward the foodstuff channel-forming member. Therefore, the foodstuff channel-forming member forms a second-foodstuff-deposit-receiving-channel D1$_C$ (see, e.g., FIGS. 5B, 5B', 5B'', 5B''') in the upper surface D1$_U$ of the first foodstuff deposit D1. When the second foodstuff hopper 236 meters the second foodstuff deposit D2 upon the upper surface D1$_U$ of the first foodstuff deposit D1, the second foodstuff deposit D2 may be metered into and be substantially contained by the second-foodstuff-deposit-receiving-channel D1$_C$ formed in the upper surface D1$_U$ of the first foodstuff deposit D1. In a substantially similar manner as described above, when the amount of the second foodstuff deposit D2 metered by the second foodstuff hopper 236 may be selectively controlled in order to result in the second-foodstuff-deposit-receiving-channel D1$_C$ being: (1) entirely filled with the second foodstuff deposit D2 (as seen in, e.g., FIG. 5B'), (2) partially filled with the second foodstuff deposit D2 (as seen in, e.g., FIG. 5B'') or (3) over-filled with the second foodstuff deposit D2 (as seen in, e.g., FIG. 5B''').

Referring to FIGS. 9A and 9B, the system 200 may also include a first slicing blade 240. The first slicing blade 240 may be located downstream of the second foodstuff deposit hopper 236 and upstream of the distal end 212a$_D$ of the first conveyor 212a. The first slicing blade 240 may be arranged over a portion of the foodstuff receiving surface 222a of the belt 214a of the first conveyor 212a that supports the first foodstuff deposit D1 including the second foodstuff deposit D2 metered thereupon. The first slicing blade 240 is defined by a width W$_{240}$ (see, e.g., FIG. 9B) that may be greater than the width W$_{SS}$ of the elongated sheet S/each sheet segment SS.

Referring to FIG. 9A, an actuator 242 may be connected to the first slicing blade 240 in order to impart a periodic plunging motion to the first slicing blade 240 for causing the first slicing blade 240 to penetrate through both of the thickness T$_{D1}$ of the first foodstuff deposit D1 and the thickness T$_{D2}$ of the second foodstuff deposit D2. The periodic plunging motion of the first slicing bade 240 in combination with the speed of rotation of one or both of the proximal roller 216a and the distal roller 218a rotatably driving the belt 214a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length L$_{SS}$.

The speed of rotation of one or both of the proximal roller 216a and the distal roller 218a rotatably driving the belt 214a according to the direction of arrow A1 serially transports each sheet segment SS toward the distal end 212a$_D$ of the first conveyor 212a. Once each sheet segment SS reaches the distal end 212a$_D$ of the first conveyor 212a, each sheet segment SS is permitted to fall with the assistance of gravity from the foodstuff receiving surface 222a of the belt 214a of the first conveyor 212a toward the foodstuff receiving surface 222b of the belt 214b of the second conveyor 212b. The portion 222b$_P$ of the foodstuff receiving surface 222b of the belt 214b of the second conveyor 212b that may be located near the proximal end 212b$_P$ of the second conveyor 212b and aligned with the width 214a$_W$ of the belt 214a of the first conveyor 212a at least partially directly receives each sheet segment SS from the distal end 212a$_D$ of the first conveyor 212a.

The speed of rotation of one or both of the proximal roller 216b and the distal roller 218b rotatably driving the belt 214b of the second conveyor 212b according to the direction of arrow A2 transports each sheet segment SS toward the distal end 212b$_D$ of the second conveyor 212b. As seen in FIG. 10B, the speed of rotation of one or both of the proximal roller 216b and the distal roller 218b rotatably driving the belt 214b of the second conveyor 212b may be selectively controlled (and, in some instances, is referenced from the speed of rotation of one or both of the proximal roller 216a and the distal roller 218a rotatably driving the belt 214a of the first conveyor 212a) in order to arrange: (1) a first portion of a rear surface D1$_R$ of the first foodstuff deposit D1 of a sheet segment SS transported from foodstuff receiving surface 222a of the belt 214a of the first conveyor 212a upon the foodstuff receiving surface 222b of the belt 214b of the second conveyor 212b and (2) a second portion of the rear surface D1$_R$ of the first foodstuff deposit D1 of the sheet segment SS transported from foodstuff receiving surface 222a of the belt 214a of the first conveyor 212a over: the second foodstuff deposit D2 and a portion of an upper surface D1$_U$ of a first foodstuff deposit D1 of a sheet segment SS that was immediately previously transported from foodstuff receiving surface 222a of the belt 214a of the first conveyor 212a upon the foodstuff receiving surface 222b of the belt 214b of the second conveyor 212b. As a result, a portion of the sheet segment SS that was previously transported from the foodstuff receiving surface 222a of the belt 214a of the first conveyor 212a to the foodstuff receiving surface 222b of the belt 214b of the second conveyor 212b may be partially laminated by the rear surface D1$_R$ of the first foodstuff deposit D1 of the sheet segment SS that is subsequently transported from the foodstuff receiving surface 222a of the belt 214a of the first conveyor 212a to the foodstuff receiving surface 222b of the belt 214b of the second conveyor 212b in order to thereby entirely encapsulate the second foodstuff deposit D2 between at least two layers of the first foodstuff deposit D1 defined by: (a) the first foodstuff deposit D1 directly supporting the second foodstuff deposit D2 and the rear surface D1$_R$ of the first foodstuff deposit D1 of the sheet segment SS that is subsequently transported from the foodstuff receiving surface 222a of the belt 214a of the first conveyor 212a to the foodstuff receiving surface 222b of the belt 214b of the second conveyor 212b. Furthermore, a portion of the rear surface D1$_R$ of the first foodstuff deposit D1 of the sheet segment SS that is subsequently transported from the foodstuff receiving surface 222a of the belt 214a of the first conveyor 212a to the foodstuff receiving surface 222b of the belt 214b of the second conveyor 212b is disposed over a portion of the upper surface D1$_U$ first foodstuff deposit D1 that: (1) does not support the second foodstuff deposit D2 and (2) is not defined by the width W$_{SS}$ of each sheet segment SS between the leading edge ST$_{LE}$ of the elongated strip ST and the leading edge SS$_{LE}$ of the sheet segment SS.

Referring to FIGS. 9B and 10A, regarding the encapsulation of the second foodstuff deposit D2 between at least two layers of the first foodstuff deposit D1 described above, in an example, the speed of rotation of one or both of the proximal roller 216b and the distal roller 218b rotatably driving the belt 214b of the second conveyor 212b may be selectively controlled in order to arrange a leading edge SS$_{LE}$ of a sheet segment SS in the immediate process of being transported from the foodstuff receiving surface 222a of the belt 214a of the first conveyor 212a to the foodstuff receiving surface 222b of the belt 214b of the second conveyor 212b at least directly over, or, alternatively, slightly ahead (as seen in FIGS. 10B and 11) of a leading edge ST$_{LE}$ of a strip ST (defined by the second foodstuff deposit D2) of a sheet segment SS that was immediately previously transported from the foodstuff receiving surface 222a of the belt 214a of the first conveyor 212a to the foodstuff receiving surface 222b of the belt 214b of the second conveyor 212b. As a result, the strip ST of each sheet segment SS that had been previously transported from the foodstuff receiving surface 222a of the belt 214a of the first conveyor 212a to the foodstuff receiving surface 222b of the belt 214b of the second conveyor 212b is covered by a portion of the rear surface D1$_R$ of the first foodstuff deposit D1 of a sheet segment SS that was subsequently deposited thereon.

Referring to FIGS. 10A and 10B, the system 200 may also include one or more pairs of compression rollers 244$_1$, 244$_2$ . . . 244$_n$ arranged about the belt 214b of the second conveyor 212b. If more than one pair of compression rollers 244$_1$, 244$_2$ . . . 244$_n$ is included in the system 200, the more than one pair of compression rollers 244$_1$, 244$_2$ . . . 244$_n$ may be referred to as a plurality of compression rollers 244. The one or more pairs of compression rollers 244$_1$, 244$_2$ . . . 244$_n$ arranged about the second conveyor 212b may be located near the proximal end 212b$_P$ of the second conveyor 212b and downstream of the portion 222b$_P$ of the foodstuff receiving surface 222b of the belt 214b of the second conveyor 212b that may be aligned with the width 214a$_W$ of the belt 214a of the first conveyor 212a.

Each pair compression rollers 244$_1$, 244$_2$ ... 244$_n$ of the one or more pairs compression rollers 244$_1$, 244$_2$ ... 244$_n$ includes an upper compression roller 244$_U$ and a lower compression roller 244$_L$. The lower compression roller 244$_L$ may be arranged adjacent the belt 214b of the second conveyor 212b. The surface of the belt 214b that the lower compression roller 244$_L$ is arranged adjacent is opposite the foodstuff receiving surface 222b of the belt 214b of the second conveyor 212b.

The upper compression roller 244$_U$ may be arranged in a spaced-apart relationship with respect to the foodstuff receiving surface 222b of the belt 214b of the second conveyor 212b. A gap or spacing between the upper compression roller 244$_U$ and the foodstuff receiving surface 222b of the belt 214b of the second conveyor 212b is defined by a distance (see, e.g., D$_{244-1}$, D$_{244-1}$ ... D$_{244-n}$). When more than one pair of compression rollers 244$_1$, 244$_2$ ... 244$_n$ are included in the system 200, the distance D$_{244-1}$, D$_{244-1}$ ... D$_{244-n}$ defining the gap or spacing between the upper compression roller 244$_U$ and the foodstuff receiving surface 222b of the belt 214b of the second conveyor 212b for each successive pair of compression rollers 244$_1$, 244$_2$ ... 244$_n$ may progressively decrease in dimension.

As one or both of the proximal roller 216b and the distal roller 218b rotatably drives the belt 214b of the second conveyor 212b according to the direction of arrow A2, the plurality of partially overlapped sheet segments SS are passed through the gaps or spacings defined by the distance D$_{244-1}$, D$_{244-1}$ ... D$_{244-n}$. Because the partially overlapped sheet segments SS are defined by a height dimension that may be approximately equal to but slightly greater than the gap or spacing defined by the first distance D$_{244-1}$ associated with the first pair of compression rollers 244$_1$, the upper compression roller 244$_U$ of the first pair of compression rollers 244$_1$ directly engages the upper surface D1$_U$ (defined by a first foodstuff deposit D1) of each sheet segment SS of the partially overlapped sheet segments SS for compressing the partially overlapped sheet segments SS between the upper compression roller 244$_U$ of the first pair of compression rollers 244$_1$ and the foodstuff receiving surface 222b of the belt 214b of the second conveyor 212b. As the partially overlapped sheet segments SS are passed through one or more subsequent gaps (e.g., D$_{244-1}$ ... D$_{244-n}$) that progressively decrease in dimension, the partially overlapped sheet segments SS are further compressed in a substantially similar manner as described above.

As a result of being passed through the one or more gaps or spacings defined by the one or more pairs of compression rollers 244$_1$, 244$_2$ ... 244$_n$ described above, most or all of the voids V, V$_U$, V$_D$ (see, e.g., FIG. 12A) between opposing layers of the first foodstuff deposit D1 (i.e., defined by a gap or spacing between a portion of the rear surface D1$_R$ of the first foodstuff deposit D1 and a portion of the upper surface D1$_U$ of an adjacent first foodstuff deposit D1) are negated as a result of the one or more pairs of compression rollers 244$_1$, 244$_2$ ... 244$_n$ compressing and thereby vertically shifting the material defining the first foodstuff deposit D1 into the gap or spacing defined by the voids V, V$_U$, V$_D$. When the material defining the first foodstuff deposit D1 is vertically shifted, the portion of the rear surface D1$_R$ of the first foodstuff deposit D1 and the portion of the upper surface D1$_U$ of the adjacent first foodstuff deposit D1 bind together.

Furthermore, as the material defining the first foodstuff deposit D1 is shifted into the gap or spacing defined by the voids V, V$_U$, V$_D$, the second foodstuff deposit D2 in the form of at least one strip ST of each sheet segment SS is similarly vertically displaced into an area previously spatially occupied by the underlying (and vertically shifted) first foodstuff deposit D1. Unlike the examples described above where an elongated, pre-baked food product body B of FIGS. 4B, 8B is formed having the second foodstuff deposit D2 of each sheet segment SS ultimately appearing to merge into a substantially constant, uninterrupted layer as a result of the above-described vertical shifting, the second foodstuff deposit D2 of the elongated, pre-baked food product body B seen in FIG. 12B ultimately appears as an interrupted layer. The interruption of the layer defined by the second foodstuff deposit D2 results from the width W$_{ST}$ of the at least one strip ST of each sheet segment SS being relatively thinner (e.g., approximately equal to an amount less than one-third (e.g., approximately one-fifth) of the width W$_{SS}$ of each sheet segment SS). As a result, when the one or more pairs of compression rollers 244$_1$, 244$_2$ ... 244$_n$ compress the partially overlapped sheet segments SS, with reference to FIG. 12A, an upper-most first foodstuff deposit D1 fills an upstream void V$_U$ (see, e.g., FIG. 12A) and a downstream void V$_D$ (see, e.g., FIG. 12A) that are adjacent opposite edges of the second foodstuff deposit D2 in order to create the interrupted layer of the second foodstuff deposit D2 of the elongated, pre-baked food product body B (see, e.g., FIGS. 10B, 11 and 12B).

Referring to FIGS. 12A-12B, the elongated, pre-baked food product body B is generally defined by: (1) a first thickness segment defined by approximately the uppermost layer of the first foodstuff deposit D1, (2) a second thickness segment defined by a portion of one or both of the uppermost layer of the first foodstuff deposit D1, the lowermost layer of the first foodstuff deposit D1 and the interrupted second foodstuff deposit D2 and (3) a third thickness segment defined by approximately two layers of the first foodstuff deposit D1 that supports the second foodstuff deposit D2 and a lowermost layer of the first foodstuff deposit D1. As seen in FIG. 12B, a rear surface of the third thickness segment defined by approximately two layers of the first foodstuff deposit D1 is supported upon the foodstuff receiving surface 222b of the belt 214b of the second conveyor 212b.

Referring to FIGS. 10A and 10B, the system 200 may also include a second slicing blade 246. The second slicing blade 246 may be located downstream of the one or more compression rollers 244$_1$, 244$_2$ ... 244$_n$ and upstream of the distal end 212bn of the second conveyor 212b. The second slicing blade 246 may be arranged over a portion of the foodstuff receiving surface 222b of the belt 214b of the second conveyor 212b that supports the elongated, pre-baked food product body B. The second slicing blade 246 is defined by a width W246 (see, e.g., FIG. 10A) that may be greater than a width W$_B$ (see, e.g., FIG. 10A) of the elongated, pre-baked food product body B.

Referring to FIG. 10B, an actuator 248 may be connected to the second slicing blade 246 in order to impart a periodic plunging motion to the second slicing blade 246 for causing the second slicing blade 246 to penetrate through a thickness T$_B$ (see, e.g., FIG. 10B) of the elongated, pre-baked food product body B. The periodic plunging motion of the second slicing bade 246 in combination with the speed of rotation of one or both of the proximal roller 216b and the distal roller 218b rotatably driving the belt 214b according to the direction of arrow A2 results in the elongated, pre-baked food product body B being cut into a plurality of pre-baked food product body units U having any desirable shape, size or dimension.

Referring to FIGS. 10A and 10B, the system 200 may also include an oven 250. The oven 250 may be located downstream of the second slicing blade 246 and upstream of the distal end 212$b_D$ of the second conveyor 212$b$. The oven 250 is arranged about the foodstuff receiving surface 222$b$ of the belt 214$b$ of the second conveyor 212$b$ that supports the plurality of pre-baked food product body units U. As one or both of the proximal roller 216$b$ and the distal roller 218$b$ rotatably drives the belt 214$b$ of the second conveyor 212$b$ according to the direction of arrow A2, the plurality of pre-baked food product body units U are passed through the oven 250 in order to bake the plurality of pre-baked food product body units U.

Upon the plurality of pre-baked food product body units U exiting the oven 250 according to the direction of arrow A2, the plurality of pre-baked food product body units U may then be referred to as baked food products F. As one or both of the proximal roller 216$b$ and the distal roller 218$b$ rotatably drives the belt 214$b$ of the second conveyor 212$b$ according to the direction of arrow A2, the baked food products F may fall with the assistance of gravity off of the distal end 212$b_D$ of the second conveyor 212$b$ for subsequent processing or packaging.

Referring to FIGS. 9A-9B, 10A-10B, the system 200 may also include a controller 252. The controller 252 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)).

The controller 252 may be communicatively coupled (i.e., wirelessly connected or hardwired) to any of the above-described components (e.g., components 220$a$, 220$b$, 234, 238, 242, 244, 248, 250) of the system 200 in order to control any of the components. For example, the controller 252 may control the motors 220$a$/220$b$ for controlling the rate of rotation of the one or both of the proximal roller 216$a$/216$b$ and the distal roller 218$a$/218$b$ that rotatably drives the belt 214$a$/214$b$ of the first conveyor 212$a$/the second conveyor 212$b$. In another example, the controller 252 may control the rotation of the pair of metering rollers 234 in order to control the rate of the amount of the first foodstuff deposit D1 being metered upon the foodstuff receiving surface 222$a$ of the belt 214$a$ of the first conveyor 212$a$. In yet another example, the controller 252 may control an open/partially open/closed state of the foodstuff metering valve 238 of the second foodstuff hopper 236 in order to control the rate of the amount of the second foodstuff deposit D2 being metered upon the first foodstuff deposit D1. In an example, the controller 252 may control the state of the actuator 242/248 for controlling the frequency of the periodic plunging motion of the first slicing blade 240/the second slicing blade 246. In another example, the controller 252 may control the motor 220$b$ for controlling a rate of rotation of one or more of the upper compression roller 244$_U$ and the lower compression roller 244$_L$ of the one or more pairs compression rollers 244$_1$, 244$_2$ ... 244$_n$. In yet another example, the controller 252 may control the on state, off state and/or temperature of the oven 250.

Referring to FIGS. 13A-13B and 14A-14B, an exemplary food product manufacturing system is shown generally at 300. FIGS. 13A-13B illustrates a first portion of the food product manufacturing system 300. FIGS. 14A-14B illustrates a second portion of the food product manufacturing system 300. The food product manufacturing system 300 is hereinafter referred to as "the system."

Figure 15:
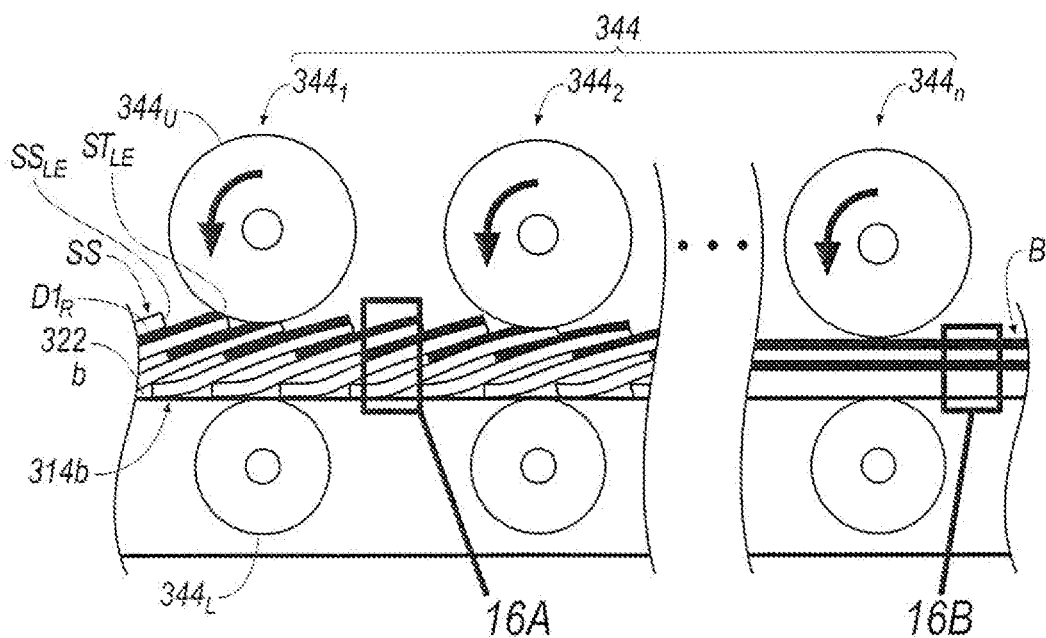
FIG. 15 is an enlarged view of a portion of the food product manufacturing system according to line 15 of FIG. 14B.
Figures 16A, 16B:
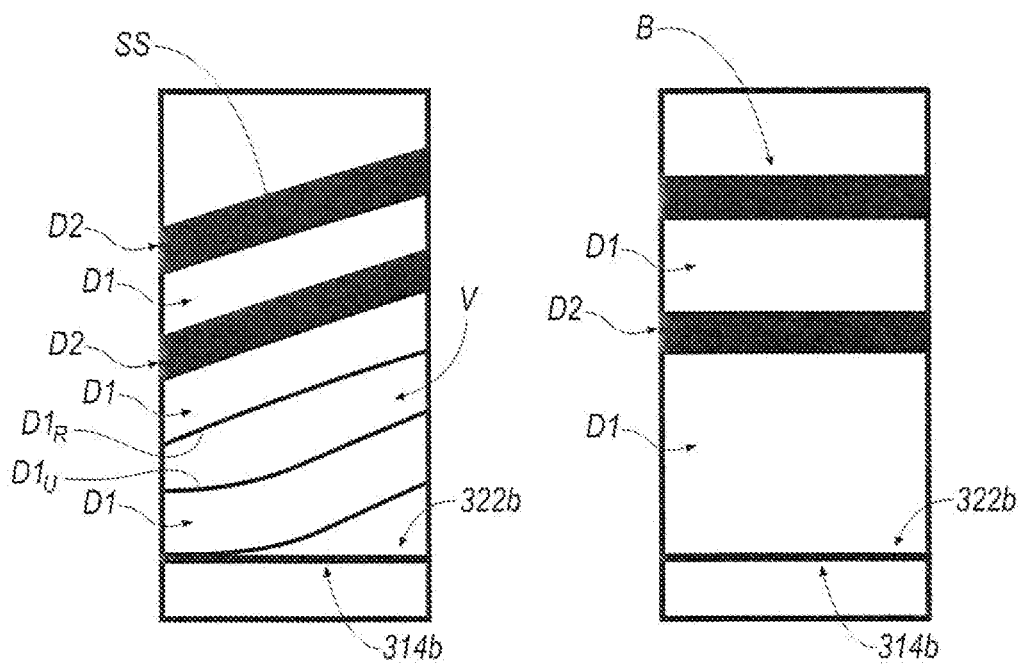
FIG. 16A is an enlarged view of a plurality of layers of first and second foodstuff deposits and a portion of the food product manufacturing system according to line 16A of FIG. 15.
FIG. 16B is an enlarged view of a plurality of layers of first and second foodstuff deposits defining a pre-baked food product body and a portion of the food product manufacturing system according to line 16B of FIG. 15.

The system 300 manufactures a baked food product F (see, e.g., FIGS. 14A-14B). The baked food product F is derived from at least a first foodstuff deposit D1 (see, e.g., FIGS. 13A, 13B) and a second foodstuff deposit D2 (see, e.g., FIGS. 13A, 13B). The baked food product F may be defined by several layers of the first foodstuff deposit D1 (e.g., approximately three layers of the first foodstuff deposit D1 as seen in FIGS. 15 and 16A) and at least one layer of the second foodstuff deposit D2 (e.g. approximately two layers of the second foodstuff deposit D2 as seen in FIGS. 15 and 16A). At least two layers of the first foodstuff deposit D1 encapsulates one of the two layers of the second foodstuff deposit D2 whereas the other layer of the second foodstuff deposit D2 is only supported by one of the layers defined by the first foodstuff deposit D1 and not encapsulated between layers of the first foodstuff deposit D1. The first foodstuff deposit D1 may include dough. The second foodstuff deposit D2 may include a filling (such as, e.g., a fruit filling), a food coloring, a supplement (such as, e.g., a vitamin supplement) or the like.

As will be described in the following disclosure, the first foodstuff deposit D1 is metered in the form of an elongated sheet S (see, e.g., FIG. 13B). The second foodstuff deposit D2 is metered in the form of at least one strip ST (see, e.g., FIG. 13B) upon the elongated sheet S. The elongated sheet S including the at least one strip ST metered there-upon is subsequently divided into a plurality of sheet segments SS (see, e.g., FIG. 13B).

As seen in FIGS. 13A-13B, 14A-14B, the at least one strip ST metered upon the elongated sheet S is numerically defined to include one strip ST. Although one strip ST is metered upon the elongated sheet S according to the example described at FIGS. 13A-13B, 14A-14B, the at least one strip ST may be numerically defined to include more than one strip ST (see, e.g., FIGS. 17A-17B, 18A-18B where a first strip ST1 and a second strip ST2 are metered upon an elongated sheet S). Therefore, the at least one strip ST may include any desirable number of strips ST such as, for example, one, two, three, fourth, five or "n" strips (whereby "n" is any integer).

Referring to FIG. 13B, each sheet segment SS is defined by a length $L_{SS}$. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 13B, the at least one strip ST is defined by a width $W_{ST}$. The width $W_{ST}$ of the at least one strip ST is less than the width $W_{SS}$ of each sheet segment SS. Unlike the examples described above at FIGS. 1B and 5B, the width $W_{ST}$ of the at least one strip ST seen at FIG. 13B is not approximately equal to one-third of the width $W_{SS}$ of each sheet segment SS; rather, in an example, the width $W_{ST}$ of the at least one strip ST may be approximately equal to an amount greater than one-third (e.g., approximately one-half) of the width $W_{SS}$ of each sheet segment SS. As will be described in the following disclosure at FIGS. 14B, 15, 16A, 16B, as a result of the comparatively greater width $W_{ST}$ of the at least one strip ST of the example seen at FIG. 13B when compared to the width $W_{ST}$ of the at least one strip ST of the previously-described examples at FIGS. 1B and 5B, the baked food product F will appear to include two uninterrupted layers of the second foodstuff deposit D2 as opposed to one uninterrupted layer of the second foodstuff deposit D2.

Furthermore, unlike the embodiments described above at FIGS. 1B, 5B and 9B, in order to realize the selective layering of the baked food product F described above at FIGS. 15 and 16A whereby the baked food product F includes two uninterrupted layers of the second foodstuff deposit D2 with one of the two layers of the second foodstuff deposit D2 being encapsulated by at least two layers of the first foodstuff deposit D1 and the other of the two layers of the second foodstuff deposit D2 forming the uppermost layer of the baked food product F being supported by one of the layers defined by the first foodstuff deposit D1 and not encapsulated between layers of the first foodstuff deposit D1, the at least one strip ST is not selectively metered upon the elongated sheet S at a distance away from a leading edge $S_{LE}$ of the elongated sheet S (as described above in the preceding embodiments, the distance was defined by a portion $W_{SS-P}$ of the width $W_{SS}$ of the elongated sheet S/each sheet segment SS whereby the portion $W_{SS-P}$ of the width $W_{SS}$ of the elongated sheet S/each sheet segment SS was defined by a distance between the leading edge $S_{LE}$ of the elongated sheet S and a leading edge $ST_{LE}$ of the one strip ST). Rather, in some instances as seen, for example, at FIGS. 13B and 15, the leading edge $ST_{LE}$ of the one strip ST may be aligned with the leading edge $S_{LE}$ of the elongated sheet S. In other words, the distance between the leading edge $ST_{LE}$ of the one strip ST and the leading edge $SS_{LE}$ of the sheet segment SS may be approximately equal to zero.

With reference to FIGS. 13A and 13B, the system 300 may include a first conveyor 312a having a proximal end 312$a_P$ and a distal end 312$a_D$. The first conveyor 312a may include a belt 314a defined by a width 314$a_W$ (see, e.g., FIG. 13B). The belt 314a may be rotatably supported by a proximal roller 316a (see, e.g., FIG. 13A) located at the proximal end 312$a_P$ of the first conveyor 312a and a distal roller 318a (see, e.g., FIG. 13A) located at the distal end 312$a_D$ of the first conveyor 312a.

A motor 320a (see, e.g., FIG. 13A) may be connected to one or both of the proximal roller 316a and the distal roller 318a in order to impart rotation of one or both of the proximal roller 316a and the distal roller 318a such that one or both of the proximal roller 316a and the distal roller 318a may rotatably drive the belt 314a according to the direction of arrow A1. Depending upon the rotated state of the belt 314a relative to the proximal roller 316a and the distal roller 318a, a segment of the belt 314a may generally define a foodstuff receiving surface 322a.

With reference to FIGS. 13A-13B and 14A-14B, the system 300 may include a second conveyor 312b having a proximal end 312$b_P$ and a distal end 312$b_D$. The second conveyor 312b may include a belt 314b defined by a width 314$b_W$ (see, e.g., FIG. 14A) that is rotatably supported by a proximal roller 316b (see, e.g., FIG. 14B) located at the proximal end 312$b_P$ of the second conveyor 312b and a distal roller 318b (see, e.g., FIG. 14B) located at the distal end 312$b_D$ of the second conveyor 312b.

A motor 320b (see, e.g., FIG. 14B) may be connected to one or both of the proximal roller 316b and the distal roller 318b in order to impart rotation of one or both of the proximal roller 316b and the distal roller 318b such that one or both of the proximal roller 316b and the distal roller 318b may rotatably drive the belt 314b according to the direction of arrow A2. Depending upon the rotated state of the belt 314b relative to the proximal roller 316b and the distal roller 318b, a segment of the belt 314b may generally define a foodstuff receiving surface 322b.

As seen in FIGS. 13B and 14A, the second conveyor 312b may be transversely arranged with respect to the first conveyor 12a. In an example configuration, the second conveyor 12b is orthogonally arranged with respect to the first conveyor 312a. Accordingly, the driven direction A2 of the belt 314b of the second conveyor 312b is orthogonal to the driven direction A1 of the belt 314a of the first conveyor 312a.

As seen in FIGS. 13A-13B and 14A, the proximal end 312$b_P$ of the second conveyor 312b may be located near the distal end 312$a_D$ of the first conveyor 312a. Furthermore, as seen in FIG. 14A, a portion 322$b_P$ of the foodstuff receiving surface 322b of the belt 314b of the second conveyor 312b that may be located near the proximal end 312$b_P$ of the second conveyor 312b may be approximately equal to and may be aligned with the width 314$a_W$ of the belt 314a of the first conveyor 312a.

As seen in FIG. 13A, a first plane P1 may be aligned with and may extend across the foodstuff receiving surface 322a of the belt 314a of the first conveyor 312a. A second plane P2 may be aligned with and may extend across the foodstuff receiving surface 322b of the belt 314b of the second conveyor 312b. The second plane P2: (1) may not intersect with the first plane P1, (2) may be substantially parallel to the first plane P1, and (3) may be located spatially below the first plane P1 (i.e., the foodstuff receiving surface 322b of the belt 314b of the second conveyor 312b may be located below the foodstuff receiving surface 322a of the belt 314a of the first conveyor 312a such that sheet segments SS are permitted to fall with the assistance of gravity from the foodstuff receiving surface 322a of the belt 314a of the first conveyor 312a to the foodstuff receiving surface 322b of the belt 314b of the second conveyor 312b as the sheet segments SS are transported upon the belt 314a according to the direction of the arrow A1). As will be described in the following disclosure, by arranging the proximal end 312$b_P$ of the second conveyor 312b near the distal end 312$a_D$ of the first conveyor 312a, and, in conjunction with the arrangement the foodstuff receiving surface 322b of the belt 314b of the second conveyor 312b spatially below the foodstuff receiving surface 322a of the belt 314a of the first conveyor 312a, successive sheet segments SS may be transported from the distal end 312$a_D$ of the first conveyor 312a to the proximal end 312$b_P$ of the second conveyor 312b in a partially overlapped fashion in order to encapsulate a first portion of the at least one layer of the second foodstuff deposit D2 between at least two layers of the first foodstuff deposit D1 whereas a second portion of the at least one layer of the second foodstuff deposit D2 is not encapsulated by two layers of the first foodstuff deposit D1, but, rather, is supported by one layer of the first foodstuff deposit D1.

Referring to FIGS. 13A and 13B, the system 300 may also include a first foodstuff deposit hopper 324. The first foodstuff hopper 324 may be located near the proximal end 312$a_P$ of the first conveyor 312a and may be arranged over a portion of the foodstuff receiving surface 322a of the belt 314a of the first conveyor 312a. The first foodstuff hopper 324 may include a sidewall 326 defining a foodstuff-containing cavity 328. Access to the foodstuff-containing cavity 328 is permitted by an upper opening 330 and a lower opening 332. The first foodstuff hopper 324 may also include a pair of metering rollers 334 that are arranged about the lower opening 332.

Prior to being arranged upon the foodstuff receiving surface 322a of the belt 314a of the first conveyor 312a, the first foodstuff deposit D1 may be stowed within the foodstuff-containing cavity 328. The first foodstuff deposit D1 is evacuated out of the foodstuff-containing cavity 328 by way of the lower opening 332 of the first foodstuff hopper 324. The motor 320a may be connected to the pair of metering rollers 334 to impart rotation to the pair of metering rollers 334 for metering the first foodstuff deposit D1 upon the foodstuff receiving surface 322a of the belt 314a of the first conveyor 312a at a controlled rate. The controlled metering rate of the first foodstuff deposit D1 in combination with a speed of rotation of one or both of the proximal roller 316a and the distal roller 318a rotatably driving the belt 314a according to the direction of arrow A1 results in the first foodstuff deposit D1 being arranged upon the foodstuff receiving surface 322a of the belt 314a of the first conveyor 312a in a substantially uniform thickness $T_{D1}$.

Referring to FIGS. 13A and 13B, the system 300 may also include a second foodstuff deposit hopper 336. The second foodstuff hopper 336 may be located downstream of the first foodstuff deposit hopper 324 and upstream of the distal end $312a_D$ of the first conveyor 312a. The second foodstuff deposit hopper 336 may be arranged over a portion but not all of the width $314a_W$ of the belt 314a of the first conveyor 312a defining the foodstuff receiving surface 322a of the belt 314a of the first conveyor 312a that supports the first foodstuff deposit D1 metered from the first foodstuff hopper 324. The second foodstuff hopper 336 may be selectively spatially arranged over the portion of the foodstuff receiving surface 322a of the belt 314a of the first conveyor 312a in order to meter the second foodstuff deposit D2 upon the first foodstuff deposit D1 at the above-described in a manner that is substantially aligned with a leading edge $S_{LE}$ of the elongated sheet S. A metering rate of the second foodstuff deposit D2 from the second foodstuff hopper 336 may be determined by, for example: (1) the physical characteristics (e.g. viscosity) of the second foodstuff deposit D2, (2) an open/partially open state of a foodstuff metering valve 338 of the second foodstuff hopper 336 and (3) the speed of rotation of one or both of the proximal roller 316a and the distal roller 318a rotatably driving the belt 314a according to the direction of arrow A1. As such, the second foodstuff deposit D2 may be metered upon the first foodstuff deposit D1 in a substantially uniform thickness $T_{D2}$.

The system 300 may also include a foodstuff channel-forming member (not shown but similar to that shown and described above at reference numeral 154 in FIGS. 5A, 5B). The motor 320a may be connected to the foodstuff channel-forming member to impart rotation to the foodstuff channel-forming member. Alternatively, or, in addition to being connected to the motor 320a, the foodstuff channel-forming member may be statically arranged over a portion of the foodstuff receiving surface 322a of the belt 314a of the first conveyor 312a at a distance by a support member (not shown). As described above, the foodstuff channel-forming member interferes with the movement of the metered first foodstuff deposit D1 as the metered first foodstuff deposit D1 is transported upon the foodstuff receiving surface 322a of the belt 314a of the first conveyor 312a downstream in the direction of the arrow A1 toward the foodstuff channel-forming member. Therefore, the foodstuff channel-forming member forms a second-foodstuff-deposit-receiving-channel $D1_C$ (see, e.g., FIGS. 5B, 5B', 5B'', 5B''') in the upper surface $D1_U$ of the first foodstuff deposit D1. When the second foodstuff hopper 336 meters the second foodstuff deposit D2 upon the upper surface $D1_U$ of the first foodstuff deposit D1, the second foodstuff deposit D2 may be metered into and be substantially contained by the second-foodstuff-deposit-receiving-channel $D1_C$ formed in the upper surface $D1_U$ of the first foodstuff deposit D1. In a substantially similar manner as described above, when the amount of the second foodstuff deposit D2 metered by the second foodstuff hopper 336 may be selectively controlled in order to result in the second-foodstuff-deposit-receiving-channel $D1_C$ being: (1) entirely filled with the second foodstuff deposit D2 (as seen in, e.g., FIG. 5B'), (2) partially filled with the second foodstuff deposit D2 (as seen in, e.g., FIG. 5B'') or (3) over-filled with the second foodstuff deposit D2 (as seen in, e.g., FIG. 5B''').

Referring to FIGS. 13A and 13B, the system 300 may also include a first slicing blade 340. The first slicing blade 340 may be located downstream of the second foodstuff deposit hopper 336 and upstream of the distal end $312a_D$ of the first conveyor 312a. The first slicing blade 340 may be arranged over a portion of the foodstuff receiving surface 322a of the belt 314a of the first conveyor 312a that supports the first foodstuff deposit D1 including the second foodstuff deposit D2 metered thereupon. The first slicing blade 340 is defined by a width $W_{340}$ (see, e.g., FIG. 13B) that may be greater than the width $W_{SS}$ of the elongated sheet S/each sheet segment SS.

Referring to FIG. 13A, an actuator 342 may be connected to the first slicing blade 340 in order to impart a periodic plunging motion to the first slicing blade 340 for causing the first slicing blade 340 to penetrate through both of the thickness $T_{D1}$ of the first foodstuff deposit D1 and the thickness $T_{D2}$ of the second foodstuff deposit D2. The periodic plunging motion of the first slicing bade 340 in combination with the speed of rotation of one or both of the proximal roller 316a and the distal roller 318a rotatably driving the belt 314a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length $L_{SS}$.

The speed of rotation of one or both of the proximal roller 316a and the distal roller 318a rotatably driving the belt 314a according to the direction of arrow A1 serially transports each sheet segment SS toward the distal end $312a_D$ of the first conveyor 312a. Once each sheet segment SS reaches the distal end $312a_D$ of the first conveyor 312a, each sheet segment SS is permitted to fall with the assistance of gravity from the foodstuff receiving surface 322a of the belt 314a of the first conveyor 312a toward the foodstuff receiving surface 322b of the belt 314b of the second conveyor 312b. The portion $322b_P$ of the foodstuff receiving surface 322b of the belt 314b of the second conveyor 312b that may be located near the proximal end $312b_P$ of the second conveyor 312b and aligned with the width $314a_W$ of the belt 314a of the first conveyor 312a at least partially directly receives each sheet segment SS from the distal end $312a_D$ of the first conveyor 312a.

The speed of rotation of one or both of the proximal roller 316b and the distal roller 318b rotatably driving the belt 314b of the second conveyor 312b according to the direction of arrow A2 transports each sheet segment SS toward the distal end $312b_D$ of the second conveyor 312b. As seen in FIG. 14B, the speed of rotation of one or both of the proximal roller 316b and the distal roller 318b rotatably driving the belt 314b of the second conveyor 312b may be selectively controlled (and, in some instances, is referenced from the speed of rotation of one or both of the proximal roller 316a and the distal roller 318a rotatably driving the belt 314a of the first conveyor 312a) in order to arrange: (1)

a first portion of a rear surface $D1_R$ of the first foodstuff deposit D1 of a sheet segment SS transported from foodstuff receiving surface 322a of the belt 314a of the first conveyor 312a upon the foodstuff receiving surface 322b of the belt 314b of the second conveyor 312b and (2) a second portion of the rear surface $D1_R$ of the first foodstuff deposit D1 of the sheet segment SS transported from foodstuff receiving surface 322a of the belt 314a of the first conveyor 312a over: the second foodstuff deposit D2 and a portion of an upper surface $D1_U$ of a first foodstuff deposit D1 of a sheet segment SS that was immediately previously transported from foodstuff receiving surface 322a of the belt 314a of the first conveyor 312a upon the foodstuff receiving surface 322b of the belt 314b of the second conveyor 312b. As a result, a portion of the sheet segment SS that was previously transported from the foodstuff receiving surface 322a of the belt 314a of the first conveyor 312a to the foodstuff receiving surface 322b of the belt 314b of the second conveyor 312b may be partially laminated by the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b in order to thereby partially encapsulate the second foodstuff deposit D2 between at least two layers of the first foodstuff deposit D1 defined by: (a) the first foodstuff deposit D1 directly supporting the second foodstuff deposit D2 and the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b. Furthermore, a portion of the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b is disposed over a portion of the upper surface $D1_U$ first foodstuff deposit D1 that does not support the second foodstuff deposit D2. Yet even further, the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b is not arranged over a portion of elongated strip ST that extends from and is substantially aligned with the leading edge $S_{LE}$ of the elongated sheet S; as a result, the portion of elongated strip ST that extends from and is substantially aligned with the leading edge $S_{LE}$ of the elongated sheet S that is not covered by the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b will ultimately define an uppermost layer of the baked food product F defined by one of the two layers of the second foodstuff deposit D2 of the baked food product F.

Referring to FIGS. 13B and 14A, in an example, the speed of rotation of one or both of the proximal roller 316b and the distal roller 318b rotatably driving the belt 314b of the second conveyor 312b may be selectively controlled in order to expose the portion of elongated strip ST that extends from and is substantially aligned with the leading edge $S_{LE}$ of the elongated sheet S. As a result, the strip ST of each sheet segment SS that had been previously transported from the foodstuff receiving surface 322a of the belt 314a of the first conveyor 312a to the foodstuff receiving surface 322b of the belt 314b of the second conveyor 312b is not covered by a portion of the rear surface $D1_R$ of the first foodstuff deposit D1 of a sheet segment SS that was subsequently deposited thereon.

Referring to FIGS. 14A and 14B, the system 300 may also include one or more pairs of compression rollers $344_1$, $344_2 \ldots 344_n$ arranged about the belt 314b of the second conveyor 312b. If more than one pair of compression rollers $344_1$, $344_2 \ldots 344_n$ are included in the system 300, the more than one pair of compression rollers $344_1$, $344_2 \ldots 344_n$ may be referred to as a plurality of compression rollers 344. The one or more pairs of compression rollers $344_1$, $344_2 \ldots 344_n$ arranged about the second conveyor 312b may be located near the proximal end $312b_P$ of the second conveyor 312b and downstream of the portion $322b_P$ of the foodstuff receiving surface 322b of the belt 314b of the second conveyor 312b that may be aligned with the width $314a_W$ of the belt 314a of the first conveyor 312a.

Each pair compression rollers $344_1$, $344_2 \ldots 344_n$ of the one or more pairs compression rollers $344_1$, $344_2 \ldots 344_n$ includes an upper compression roller $344_U$ and a lower compression roller $344_L$. The lower compression roller $344_L$ may be arranged adjacent the belt 314b of the second conveyor 312b. The surface of the belt 314b that the lower compression roller $344_L$ is arranged adjacent is opposite the foodstuff receiving surface 322b of the belt 314b of the second conveyor 312b.

The upper compression roller $344_U$ may be arranged in a spaced-apart relationship with respect to the foodstuff receiving surface 322b of the belt 314b of the second conveyor 312b. A gap or spacing between the upper compression roller $344_U$ and the foodstuff receiving surface 322b of the belt 314b of the second conveyor 312b is defined by a distance (see, e.g., $D_{344-1}$, $D_{344-1} \ldots D_{344-n}$). When more than one pair of compression rollers $344_1$, $344_2 \ldots 344_n$ are included in the system 300, the distance $D_{344-1}$, $D_{344-1} \ldots D_{344-n}$ defining the gap or spacing between the upper compression roller $344_U$ and the foodstuff receiving surface 322b of the belt 314b of the second conveyor 312b for each successive pair of compression rollers $344_1$, $344_2 \ldots 344_n$ may progressively decrease in dimension.

As one or both of the proximal roller 316b and the distal roller 318b rotatably drives the belt 314b of the second conveyor 312b according to the direction of arrow A2, the plurality of partially overlapped sheet segments SS are passed through the gaps or spacings defined by the distance $D_{344-1}$, $D_{344-1} \ldots D_{344-n}$. Because the partially overlapped sheet segments SS are defined by a height dimension that may be approximately equal to but slightly greater than the gap or spacing defined by the first distance $D_{344-1}$ associated with the first pair of compression rollers $344_1$, the upper compression roller $344_U$ of the first pair of compression rollers $344_1$ directly engages the upper surface $D1_U$ (defined by a first foodstuff deposit D1) of each sheet segment SS of the partially overlapped sheet segments SS for compressing the partially overlapped sheet segments SS between the upper compression roller $344_U$ of the first pair of compression rollers $344_1$ and the foodstuff receiving surface 322b of the belt 314b of the second conveyor 312b. As the partially overlapped sheet segments SS are passed through one or more subsequent gaps (e.g., $D_{344-1} \ldots D_{344-n}$) that progressively decrease in dimension, the partially overlapped sheet segments SS are further compressed in a substantially similar manner as described above.

As a result of being passed through the one or more gaps or spacings defined by the one or more pairs of compression rollers $344_1$, $344_2$ ... $344_n$ described above, most or all of the voids V (see, e.g., FIG. 16A) between opposing layers of the first foodstuff deposit D1 (i.e., defined by a gap or spacing between a portion of the rear surface $D1_R$ of the first foodstuff deposit D1 and a portion of the upper surface $D1_U$ of an adjacent first foodstuff deposit D1) are negated as a result of the one or more pairs of compression rollers $344_1$, $344_2$ ... $344_n$ compressing and thereby vertically shifting the material defining the first foodstuff deposit D1 into the gap or spacing defined by the voids V. When the material defining the first foodstuff deposit D1 is vertically shifted, the portion of the rear surface $D1_R$ of the first foodstuff deposit D1 and the portion of the upper surface $D1_U$ of the adjacent first foodstuff deposit D1 bind together.

Furthermore, as the material defining the first foodstuff deposit D1 is shifted into the gap or spacing defined by the voids V, the second foodstuff deposit D2 in the form of at least one strip ST of each sheet segment SS is similarly vertically displaced into an area previously spatially occupied by the underlying (and vertically shifted) first foodstuff deposit D1. In particular, as a portion of the second foodstuff deposit D2 (that is covered by the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b) is shifted, the portion of the second foodstuff deposit D2 ultimately appears to merge with adjacent portions of the second foodstuff deposit D2 (that are similarly covered by the rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b). However, unlike the examples described above at FIGS. 1B and 5B where a portion of the upper surface $D1_U$ of the first foodstuff deposit D1 defined by the portion $W_{SS-P}$ of the width $W_{SS}$ of the sheet segment SS does not support the second foodstuff deposit D2 defined by the at least one strip ST, the portion of the second foodstuff deposit D2 that is not covered by the rear surface $D1_R$ of the first foodstuff deposit D1 of the sheet segment SS merges with adjacent uncovered portions of the second foodstuff deposit D2 to form an uppermost layer of the elongated, pre-baked food product body B seen in FIG. 16B Referring to FIGS. 16A-16B, the elongated, pre-baked food product body B is generally defined by: (1) a first thickness segment defined by approximately a first portion of the second foodstuff deposit D2 that is not covered by rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b, (2) a second thickness segment defined by the uppermost layer of the first foodstuff deposit D1, (3) a third thickness defined by the second portion of the foodstuff deposit D2 that is covered by rear surface $D1_R$ of the first foodstuff deposit D1 of the sheet segment SS that is subsequently transported from the foodstuff receiving surface 322a of the belt 314a of the first conveyor 312a to the foodstuff receiving surface 322b of the belt 314b of the second conveyor 312b and (4) a fourth thickness segment defined by approximately two layers of the first foodstuff deposit D1 that supports the second foodstuff deposit D2 and a lowermost layer of the first foodstuff deposit D1. As seen in FIG. 16B, a rear surface of the fourth thickness segment defined by approximately two layers of the first foodstuff deposit D1 is supported upon the foodstuff receiving surface 322b of the belt 314b of the second conveyor 312b.

Referring to FIGS. 14A and 14B, the system 300 may also include a second slicing blade 346. The second slicing blade 346 may be located downstream of the one or more compression rollers $344_1$, $344_2$ ... $344_n$ and upstream of the distal end $312b_D$ of the second conveyor 312b. The second slicing blade 346 may be arranged over a portion of the foodstuff receiving surface 322b of the belt 314b of the second conveyor 312b that supports the elongated, pre-baked food product body B. The second slicing blade 346 is defined by a width $W_{346}$ (see, e.g., FIG. 14A) that may be greater than a width $W_B$ (see, e.g., FIG. 14A) of the elongated, pre-baked food product body B.

Referring to FIG. 14B, an actuator 348 may be connected to the second slicing blade 346 in order to impart a periodic plunging motion to the second slicing blade 346 for causing the second slicing blade 346 to penetrate through a thickness $T_B$ (see, e.g., FIG. 14B) of the elongated, pre-baked food product body B. The periodic plunging motion of the second slicing bade 346 in combination with the speed of rotation of one or both of the proximal roller 316b and the distal roller 318b rotatably driving the belt 314b according to the direction of arrow A2 results in the elongated, pre-baked food product body B being cut into a plurality of pre-baked food product body units U having any desirable shape, size or dimension.

Referring to FIGS. 14A and 14B, the system 300 may also include an oven 350. The oven 350 may be located downstream of the second slicing blade 346 and upstream of the distal end $312b_D$ of the second conveyor 312b. The oven 350 is arranged about the foodstuff receiving surface 322b of the belt 314b of the second conveyor 312b that supports the plurality of pre-baked food product body units U. As one or both of the proximal roller 316b and the distal roller 318b rotatably drives the belt 314b of the second conveyor 312b according to the direction of arrow A2, the plurality of pre-baked food product body units U are passed through the oven 350 in order to bake the plurality of pre-baked food product body units U.

Upon the plurality of pre-baked food product body units U exiting the oven 350 according to the direction of arrow A2, the plurality of pre-baked food product body units U may then be referred to as baked food products F. As one or both of the proximal roller 316b and the distal roller 318b rotatably drives the belt 314b of the second conveyor 312b according to the direction of arrow A2, the baked food products F may fall with the assistance of gravity off of the distal end $312b_D$ of the second conveyor 312b for subsequent processing or packaging.

Referring to FIGS. 13A-13B, 14A-14B, the system 300 may also include a controller 352. The controller 352 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles).

The controller 352 may be communicatively coupled (i.e., wirelessly connected or hardwired) to any of the above-described components (e.g., components 320a, 320b, 334, 338, 342, 344, 348, 350) of the system 300 in order to control any of the components. For example, the controller 352 may control the motors 320a/320b for controlling the rate of rotation of the one or both of the proximal roller 316a/316b and the distal roller 318a/318b that rotatably drives the belt 314a/314b of the first conveyor 312a/the second conveyor 312b. In another example, the controller 352 may control the rotation of the pair of metering rollers 334 in order to control the rate of the amount of the first foodstuff deposit D1 being metered upon the foodstuff receiving surface 322a of the belt 314a of the first conveyor 312a. In yet another example, the controller 352 may control an open/partially open/closed state of the foodstuff metering valve 338 of the second foodstuff hopper 336 in order to control the rate of the amount of the second foodstuff deposit D2 being metered upon the first foodstuff deposit D1. In an example, the controller 352 may control the state of the actuator 342/348 for controlling the frequency of the periodic plunging motion of the first slicing blade 340/the second slicing blade 346. In another example, the controller 352 may control the motor 320b for controlling a rate of rotation of one or more of the upper compression roller $344_U$ and the lower compression roller $344_L$ of the one or more pairs compression rollers $344_1$, $344_2$ ... $344_n$. In yet another example, the controller 352 may control the on state, off state and/or temperature of the oven 350.

Referring to FIGS. 17A-17B and 18A-18B, an exemplary food product manufacturing system is shown generally at 400. FIGS. 17A-17B illustrates a first portion of the food product manufacturing system 400. FIGS. 18A-18B illustrates a second portion of the food product manufacturing system 400. The food product manufacturing system 400 is hereinafter referred to as "the system."

Figure 19:
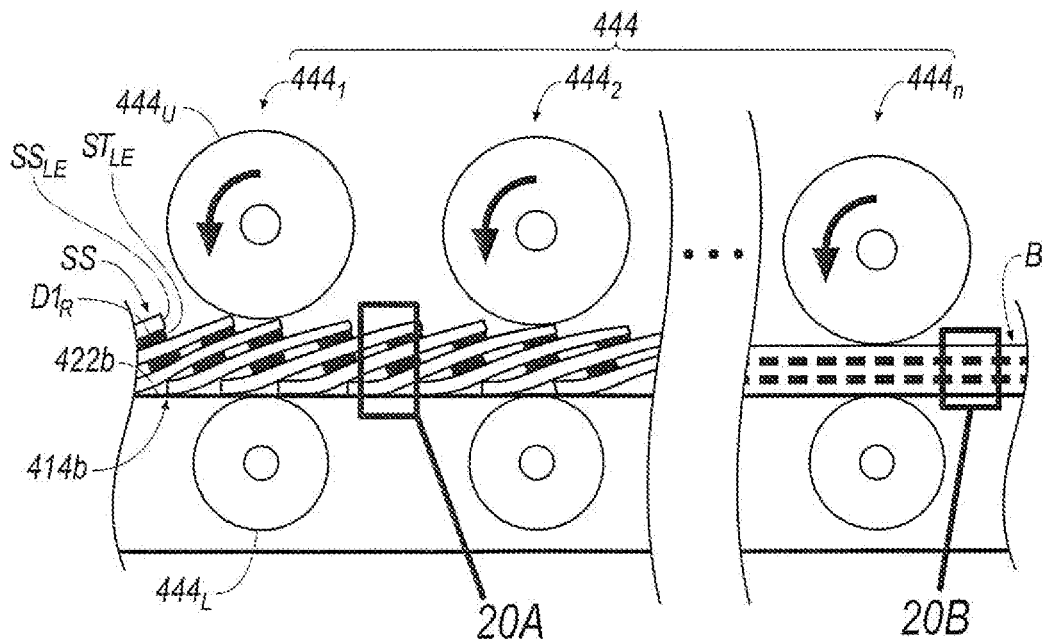
FIG. 19 is an enlarged view of a portion of the food product manufacturing system according to line 19 of FIG. 18B.
Figures 20A, 20B:
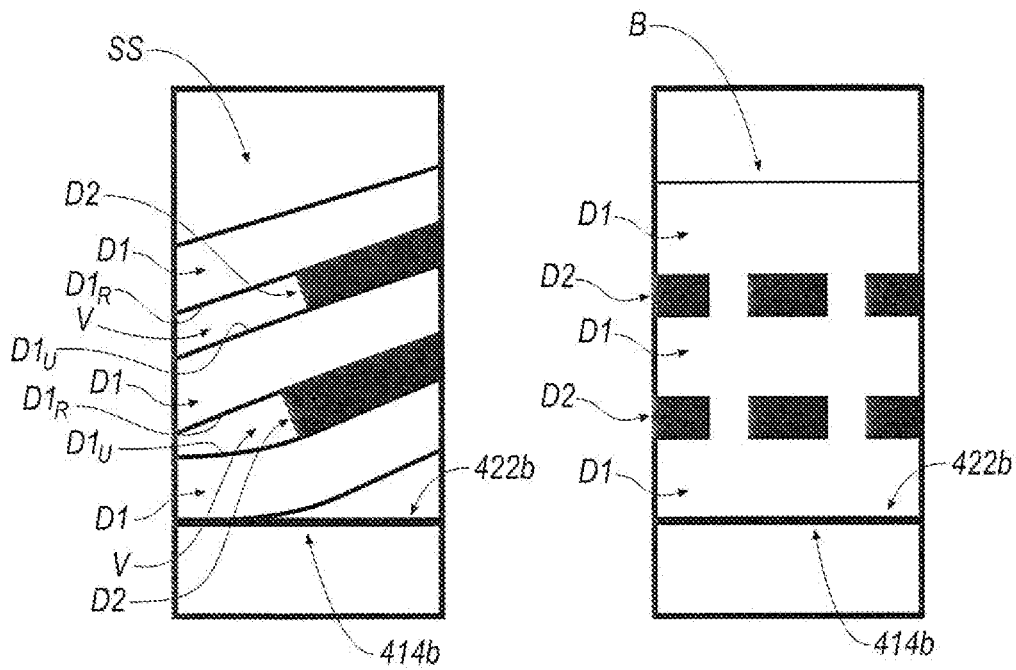
FIG. 20A is an enlarged view of a plurality of layers of first and second foodstuff deposits and a portion of the food product manufacturing system according to line 20A of FIG. 19.
FIG. 20B is an enlarged view of a plurality of layers of first and second foodstuff deposits defining a pre-baked food product body and a portion of the food product manufacturing system according to line 20B of FIG. 19.

The system 400 manufactures a baked food product F (see, e.g., FIGS. 18A-18B). The baked food product F is derived from at least a first foodstuff deposit D1 (see, e.g., FIGS. 17A, 17B) and a second foodstuff deposit D2 (see, e.g., FIGS. 17A, 17B). The baked food product F may be defined by several layers of the first foodstuff deposit D1 (e.g., approximately three layers of the first foodstuff deposit D1 as seen in FIGS. 19 and 20A) and at least one layer of the second foodstuff deposit D2 (e.g. approximately two layers of the second foodstuff deposit D2 as seen in FIGS. 19 and 20A). At least two layers of the first foodstuff deposit D1 encapsulates each of the two layers of the second foodstuff deposit D2. The first foodstuff deposit D1 may include dough. The second foodstuff deposit D2 may include a filling (such as, e.g., a fruit filling), a food coloring, a supplement (such as, e.g., a vitamin supplement) or the like.

As will be described in the following disclosure, the first foodstuff deposit D1 is metered in the form of an elongated sheet S (see, e.g., FIG. 17B). The second foodstuff deposit D2 is metered in the form of at least two strips ST1, ST2 (see, e.g., FIG. 17B) upon the elongated sheet S. The elongated sheet S including the at least two strips ST1, ST2 metered there-upon is subsequently divided into a plurality of sheet segments SS (see, e.g., FIG. 17B).

As seen in FIGS. 17A-17B, 18A-18B, the at least two strips ST1, ST2 metered upon the elongated sheet S is numerically defined to include two strips with a first strip being identified at reference numeral ST1 and a second strip identified at reference numeral ST2. Although two strips ST1, ST2 are metered upon the elongated sheet S according to the example described at FIGS. 17A-17B, 18A-18B, the at least two strips ST1, ST2 may be numerically defined to include less than two strips ST1, ST2, or, alternatively, more than two strips ST1, ST2. Therefore, the at least two strips ST1, ST2 may include any desirable number of strips ST1, ST2 such as, for example, one, two, three, fourth, five or "n" strips (whereby "n" is any integer). The second foodstuff deposit D2 of the first strip ST1 may be different than the second foodstuff deposit D2 of the second strip and different than the second foodstuff deposit of an "nth" strip STn (not shown). For example, the second foodstuff deposit D2 of the first strip ST1 may be one of a fruit filling, a cream, a cheese powder, salt, sugar, etc., the second foodstuff deposit D2 of the second strip ST2 may be another of a fruit filling, a cream, a cheese powder, salt, sugar, etc., and the second foodstuff deposit D2 of the "nth" strip STn may be yet another of a fruit filling, a cream, a cheese powder, salt, sugar, etc.

Referring to FIG. 17B, each sheet segment SS is defined by a length $L_{SS}$. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 17B, each of the at least two strips ST1, ST2 is defined by a width $W_{ST}$. The width $W_{ST}$ of each of the at least two strips ST1, ST2 is less than the width $W_{SS}$ of each sheet segment SS. Unlike the examples described above at FIGS. 1B and 5B, the width $W_{ST}$ of each of the at least two strips ST1, ST2 seen at FIG. 17B is not approximately equal to one-third of the width $W_{SS}$ of each sheet segment SS; rather, in an example, the width $W_{ST}$ of each of the at least two strips ST1, ST2 may be approximately equal to an amount less than one-third (e.g., approximately one-fifth) of the width $W_{SS}$ of each sheet segment SS. As will be described in the following disclosure at FIGS. 18B, 19, 20A, 20B, as a result of the comparatively smaller width $W_{ST}$ of each of the at least two strips ST1, ST2 of the example seen at FIG. 17B when compared to the width $W_{ST}$ of the at least one strip ST of the previously-described examples at FIGS. 1B and 5B, the layers of the second foodstuff deposit D2 of the baked food product F as seen at FIGS. 18B, 19, 20B may appear to be periodically interrupted by the first foodstuff deposit D1 as opposed to being formed to include a substantially constant, uninterrupted layer that separates an upper first foodstuff deposit layer D1 from a lower first foodstuff deposit later D1.

Furthermore, in order to realize the selective layering of the baked food product F described above at FIGS. 19 and 20A whereby at least two layers of the first foodstuff deposit D1 encapsulates the at least one layer of the second foodstuff deposit D2, the first strips ST1 may be selectively metered upon the elongated sheet S at a distance away from a leading edge $S_{LE}$ of the elongated sheet S, and, a leading edge of the second strip ST2 may be selectively metered upon the elongated sheet S at a distance away from a trailing edge of the first strip ST1; the distance of the first strip ST1 away from the leading edge $S_{LE}$ of the elongated sheet S may be defined by a portion $W_{SS-P}$ of the width $W_{SS}$ of the elongated sheet S/each sheet segment SS. The portion $W_{SS-P}$ of the width $W_{SS}$ of the elongated sheet S/each sheet segment SS may be defined by a distance between the leading edge $S_{LE}$ of the elongated sheet S and a leading edge $ST_{LE}$ of the first strip ST1. In an example, the distance (i.e., the portion $W_{SS-P}$ of the width $W_{SS}$ of each sheet segment SS) between the leading edge $ST_{LE}$ of the first strip ST1 and the leading edge $SS_{LE}$ of the sheet segment SS may be approximately equal to one-fourth of the width $W_{SS}$ of the elongated sheet S/each sheet segment SS. In another example, the distance between the leading edge of the second strip ST2 and the trailing edge of the first strip ST1 may be approximately equal to one-fourth of the width $W_{SS}$ of the elongated sheet S/each sheet segment SS.

With reference to FIGS. 17A and 17B, the system 400 may include a first conveyor 412a having a proximal end 412a$_P$ and a distal end 412a$_D$. The first conveyor 412a may include a belt 414a defined by a width 414a$_W$ (see, e.g., FIG. 17B). The belt 414a may be rotatably supported by a proximal roller 416a (see, e.g., FIG. 17A) located at the proximal end 412a$_P$ of the first conveyor 412a and a distal roller 418a (see, e.g., FIG. 17A) located at the distal end 412a$_D$ of the first conveyor 412a.

A motor 420a (see, e.g., FIG. 17A) may be connected to one or both of the proximal roller 416a and the distal roller 418a in order to impart rotation of one or both of the proximal roller 416a and the distal roller 418a such that one or both of the proximal roller 416a and the distal roller 418a may rotatably drive the belt 414a according to the direction of arrow A1. Depending upon the rotated state of the belt 414a relative to the proximal roller 416a and the distal roller 418a, a segment of the belt 414a may generally define a foodstuff receiving surface 422a.

With reference to FIGS. 17A-17B and 18A-18B, the system 400 may include a second conveyor 412b having a proximal end 412b$_P$ and a distal end 412b$_D$. The second conveyor 412b may include a belt 414b defined by a width 414b$_W$ (see, e.g., FIG. 18A) that is rotatably supported by a proximal roller 416b (see, e.g., FIG. 18B) located at the proximal end 412b$_P$ of the second conveyor 412b and a distal roller 418b (see, e.g., FIG. 18B) located at the distal end 412b$_D$ of the second conveyor 412b.

A motor 420b (see, e.g., FIG. 18B) may be connected to one or both of the proximal roller 416b and the distal roller 418b in order to impart rotation of one or both of the proximal roller 416b and the distal roller 418b such that one or both of the proximal roller 416b and the distal roller 418b may rotatably drive the belt 414b according to the direction of arrow A2. Depending upon the rotated state of the belt 414b relative to the proximal roller 416b and the distal roller 418b, a segment of the belt 414b may generally define a foodstuff receiving surface 422b.

As seen in FIGS. 17B and 18A, the second conveyor 412b may be transversely arranged with respect to the first conveyor 12a. In an example configuration, the second conveyor 12b is orthogonally arranged with respect to the first conveyor 412a. Accordingly, the driven direction A2 of the belt 414b of the second conveyor 412b is orthogonal to the driven direction A1 of the belt 414a of the first conveyor 412a.

As seen in FIGS. 17A-17B and 18A, the proximal end 412b$_P$ of the second conveyor 412b may be located near the distal end 412a$_D$ of the first conveyor 412a. Furthermore, as seen in FIG. 18A, a portion 422b$_P$ of the foodstuff receiving surface 422b of the belt 414b of the second conveyor 412b that may be located near the proximal end 412b$_P$ of the second conveyor 412b may be approximately equal to and may be aligned with the width 414a$_W$ of the belt 414a of the first conveyor 412a.

As seen in FIG. 17A, a first plane P1 may be aligned with and may extend across the foodstuff receiving surface 422a of the belt 414a of the first conveyor 412a. A second plane P2 may be aligned with and may extend across the foodstuff receiving surface 422b of the belt 414b of the second conveyor 412b. The second plane P2: (1) may not intersect with the first plane P1, (2) may be substantially parallel to the first plane P1, and (3) may be located spatially below the first plane P1 (i.e., the foodstuff receiving surface 422b of the belt 414b of the second conveyor 412b may be located below the foodstuff receiving surface 422a of the belt 414a of the first conveyor 412a such that sheet segments SS are permitted to fall with the assistance of gravity from the foodstuff receiving surface 422a of the belt 414a of the first conveyor 412a to the foodstuff receiving surface 4221, of the belt 414b of the second conveyor 412b as the sheet segments SS are transported upon the belt 414a according to the direction of the arrow A1). As will be described in the following disclosure, by arranging the proximal end 412b$_P$ of the second conveyor 412b near the distal end 412a$_D$ of the first conveyor 412a, and, in conjunction with the arrangement the foodstuff receiving surface 422b of the belt 414b of the second conveyor 412b spatially below the foodstuff receiving surface 422a of the belt 414a of the first conveyor 412a, successive sheet segments SS may be transported from the distal end 412a$_D$ of the first conveyor 412a to the proximal end 412b$_P$ of the second conveyor 412b in a partially overlapped fashion in order to encapsulate at least one layer of the second foodstuff deposit D2 between at least two layers of the first foodstuff deposit D1 as described above.

Referring to FIGS. 17A and 17B, the system 400 may also include a first foodstuff deposit hopper 424. The first foodstuff hopper 424 may be located near the proximal end 412a$_P$ of the first conveyor 412a and may be arranged over a portion of the foodstuff receiving surface 422a of the belt 414a of the first conveyor 412a. The first foodstuff hopper 424 may include a sidewall 426 defining a foodstuff-containing cavity 428. Access to the foodstuff-containing cavity 428 is permitted by an upper opening 430 and a lower opening 432. The first foodstuff hopper 424 may also include a pair of metering rollers 434 that are arranged about the lower opening 432.

Prior to being arranged upon the foodstuff receiving surface 422a of the belt 414a of the first conveyor 412a, the first foodstuff deposit D1 may be stowed within the foodstuff-containing cavity 428. The first foodstuff deposit D1 is evacuated out of the foodstuff-containing cavity 428 by way of the lower opening 432 of the first foodstuff hopper 424. The motor 420a may be connected to the pair of metering rollers 434 to impart rotation to the pair of metering rollers 434 for metering the first foodstuff deposit D1 upon the foodstuff receiving surface 422a of the belt 414a of the first conveyor 412a at a controlled rate. The controlled metering rate of the first foodstuff deposit D1 in combination with a speed of rotation of one or both of the proximal roller 416a and the distal roller 418a rotatably driving the belt 414a according to the direction of arrow A1 results in the first foodstuff deposit D1 being arranged upon the foodstuff receiving surface 422a of the belt 414a of the first conveyor 412a in a substantially uniform thickness $T_{D1}$.

Referring to FIGS. 17A and 17B, the system 400 may also include a second foodstuff deposit hopper 436. The second foodstuff hopper 436 may be located downstream of the first foodstuff deposit hopper 424 and upstream of the distal end 412a$_D$ of the first conveyor 412a. The second foodstuff deposit hopper 436 may be arranged over a portion but not all of the width 414a$_W$ of the belt 414a of the first conveyor 412a defining the foodstuff receiving surface 422a of the belt 414a of the first conveyor 412a that supports the first foodstuff deposit D1 metered from the first foodstuff hopper 424. The second foodstuff hopper 436 may be selectively spatially arranged over the portion of the foodstuff receiving surface 422a of the belt 414a of the first conveyor 412a in order to meter the second foodstuff deposit D2 upon the first foodstuff deposit D1 in the form of a first strip ST1 at the above-described distance (see, e.g., $W_{SS-P}$) away from a leading edge $S_{LE}$ of the elongated sheet S and a second strip ST2 at a distance away from a trailing edge of the first strip ST1. A metering rate of the second foodstuff deposit D2 from the second foodstuff hopper 436 may be determined by, for example: (1) the physical characteristics (e.g. viscosity) of the second foodstuff deposit D2, (2) an open/partially open state of a foodstuff metering valve 438 of the second foodstuff hopper 436 and (3) the speed of rotation of one or both of the proximal roller 416a and the distal roller 418a rotatably driving the belt 414a according to the direction of arrow A1. As such, the second foodstuff deposit D2 may be metered upon the first foodstuff deposit D1 in a substantially uniform thickness $T_{D2}$.

The system 400 may also include a foodstuff channel-forming member (not shown but similar to that shown and described above at reference numeral 154 in FIGS. 5A, 5B). The motor 420a may be connected to the foodstuff channel-forming member to impart rotation to the foodstuff channel-forming member. Alternatively, or, in addition to being connected to the motor 420a, the foodstuff channel-forming member may be statically arranged over a portion of the foodstuff receiving surface 422a of the belt 414a of the first conveyor 412a at a distance by a support member (not shown). As described above, the foodstuff channel-forming member interferes with the movement of the metered first foodstuff deposit D1 as the metered first foodstuff deposit D1 is transported upon the foodstuff receiving surface 422a of the belt 414a of the first conveyor 412a downstream in the direction of the arrow A1 toward the foodstuff channel-forming member. Therefore, the foodstuff channel-forming member forms a second-foodstuff-deposit-receiving-channel $D1_C$ (see, e.g., FIGS. 5B, 5B', 5B", 5B''') in the upper surface $D1_U$ of the first foodstuff deposit D1. When the second foodstuff hopper 436 meters the second foodstuff deposit D2 upon the upper surface $D1_U$ of the first foodstuff deposit D1, the second foodstuff deposit D2 may be metered into and be substantially contained by the second-foodstuff-deposit-receiving-channel $D1_C$ formed in the upper surface $D1_U$ of the first foodstuff deposit D1. In a substantially similar manner as described above, when the amount of the second foodstuff deposit D2 metered by the second foodstuff hopper 436 may be selectively controlled in order to result in the second-foodstuff-deposit-receiving-channel $D1_C$ being: (1) entirely filled with the second foodstuff deposit D2 (as seen in, e.g., FIG. 5B'), (2) partially filled with the second foodstuff deposit D2 (as seen in, e.g., FIG. 5B") or (3) over-filled with the second foodstuff deposit D2 (as seen in, e.g., FIG. 5B''').

Referring to FIGS. 17A and 17B, the system 400 may also include a first slicing blade 440. The first slicing blade 440 may be located downstream of the second foodstuff deposit hopper 436 and upstream of the distal end $412a_D$ of the first conveyor 412a. The first slicing blade 440 may be arranged over a portion of the foodstuff receiving surface 422a of the belt 414a of the first conveyor 412a that supports the first foodstuff deposit D1 including the second foodstuff deposit D2 metered thereupon. The first slicing blade 440 is defined by a width $W_{440}$ (see, e.g., FIG. 17B) that may be greater than the width $W_{SS}$ of the elongated sheet S/each sheet segment SS.

Referring to FIG. 17A, an actuator 442 may be connected to the first slicing blade 440 in order to impart a periodic plunging motion to the first slicing blade 440 for causing the first slicing blade 440 to penetrate through both of the thickness $T_{D1}$ of the first foodstuff deposit D1 and the thickness $T_{D2}$ of the second foodstuff deposit D2. The periodic plunging motion of the first slicing bade 440 in combination with the speed of rotation of one or both of the proximal roller 416a and the distal roller 418a rotatably driving the belt 414a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length $L_{SS}$.

The speed of rotation of one or both of the proximal roller 416a and the distal roller 418a rotatably driving the belt 414a according to the direction of arrow A1 serially transports each sheet segment SS toward the distal end $412a_D$ of the first conveyor 412a. Once each sheet segment SS reaches the distal end $412a_D$ of the first conveyor 412a, each sheet segment SS is permitted to fall with the assistance of gravity from the foodstuff receiving surface 422a of the belt 414a of the first conveyor 412a toward the foodstuff receiving surface 422b of the belt 414b of the second conveyor 412b. The portion $422b_P$ of the foodstuff receiving surface 422b of the belt 414b of the second conveyor 412b that may be located near the proximal end $412b_P$ of the second conveyor 412b and aligned with the width $414a_W$ of the belt 414a of the first conveyor 412a at least partially directly receives each sheet segment SS from the distal end $412a_D$ of the first conveyor 412a.

The speed of rotation of one or both of the proximal roller 416b and the distal roller 418b rotatably driving the belt 414b of the second conveyor 412b according to the direction of arrow A2 transports each sheet segment SS toward the distal end $412b_D$ of the second conveyor 412b. As seen in FIG. 18B, the speed of rotation of one or both of the proximal roller 416b and the distal roller 418b rotatably driving the belt 414b of the second conveyor 412b may be selectively controlled (and, in some instances, is referenced from the speed of rotation of one or both of the proximal roller 416a and the distal roller 418a rotatably driving the belt 414a of the first conveyor 412a) in order to arrange: (1) a first portion of a rear surface $D1_R$ of the first foodstuff deposit D1 of a sheet segment SS transported from foodstuff receiving surface 422a of the belt 414a of the first conveyor 412a upon the foodstuff receiving surface 422b of the belt 414b of the second conveyor 412b and (2) a second portion of the rear surface $D1_R$ of the first foodstuff deposit D1 of the sheet segment SS transported from foodstuff receiving surface 422a of the belt 414a of the first conveyor 412a over: the second foodstuff deposit D2 and a portion of an upper surface $D1_U$ of a first foodstuff deposit D1 of a sheet segment SS that was immediately previously transported from foodstuff receiving surface 422a of the belt 414a of the first conveyor 412a upon the foodstuff receiving surface 422b of the belt 414b of the second conveyor 412b. As a result, a portion of the sheet segment SS that was previously transported from the foodstuff receiving surface 422a of the belt 414a of the first conveyor 412a to the foodstuff receiving surface 422b of the belt 414b of the second conveyor 412b may be partially laminated by the rear surface $D1_R$ of the first foodstuff deposit D1 of the sheet segment SS that is subsequently transported from the foodstuff receiving surface 422a of the belt 414a of the first conveyor 412a to the foodstuff receiving surface 422b of the belt 414b of the second conveyor 412b in order to thereby entirely encapsulate the second foodstuff deposit D2 between at least two layers of the first foodstuff deposit D1 defined by: (a) the first foodstuff deposit D1 directly supporting the second foodstuff deposit D2 and the rear surface $D1_R$ of the first foodstuff deposit D1 of the sheet segment SS that is subsequently transported from the foodstuff receiving surface 422a of the belt 414a of the first conveyor 412a to the foodstuff receiving surface 422b of the belt 414b of the second conveyor 412b. Furthermore, a portion of the rear surface $D1_R$ of the first foodstuff deposit D1 of the sheet segment SS that is subsequently transported from the foodstuff receiving surface 422a of the belt 414a of the first conveyor 412a to the foodstuff receiving surface 422b of the belt 414b of the second conveyor 412b is disposed over a portion of the upper surface $D1_U$ first foodstuff deposit D1 that: (1) does not support the second foodstuff deposit D2 and (2) is not defined by the width $W_{SS}$ of each sheet segment SS between the leading edge $ST_{LE}$ of the elongated strip ST and the leading edge $SS_{LE}$ of the sheet segment SS.

Referring to FIGS. 17B and 18A, regarding the encapsulation of the second foodstuff deposit D2 between at least two layers of the first foodstuff deposit D1 described above, in an example, the speed of rotation of one or both of the proximal roller 416b and the distal roller 418b rotatably driving the belt 414b of the second conveyor 412b may be selectively controlled in order to arrange a leading edge $SS_{LE}$ of a sheet segment SS in the immediate process of being transported from the foodstuff receiving surface 422a of the belt 414a of the first conveyor 412a to the foodstuff receiving surface 422b of the belt 414b of the second conveyor 412b at least directly over, or, alternatively, slightly ahead (as seen in FIGS. 18B and 19) of a leading edge $ST_{LE}$ of the first strip ST1 (defined by the second foodstuff deposit D2) of a sheet segment SS that was immediately previously transported from the foodstuff receiving surface 422a of the belt 414a of the first conveyor 412a to the foodstuff receiving surface 422b of the belt 414b of the second conveyor 412b. As a result, both of the first strip ST1 and the second strip ST2 of each sheet segment SS that had been previously transported from the foodstuff receiving surface 422a of the belt 414a of the first conveyor 412a to the foodstuff receiving surface 422b of the belt 414b of the second conveyor 412b is covered by a portion of the rear surface $D1_R$ of the first foodstuff deposit D1 of a sheet segment SS that was subsequently deposited thereon.

Referring to FIGS. 18A and 18B, the system 400 may also include one or more pairs of compression rollers $444_1$, $444_2 \ldots 444_n$ arranged about the belt 414b of the second conveyor 412b. If more than one pair of compression rollers $444_1, 444_2 \ldots 444_n$ are included in the system 400, the more than one pair of compression rollers $444_1, 444_2 \ldots 444_n$ may be referred to as a plurality of compression rollers 444. The one or more pairs of compression rollers $444_1, 444_2 \ldots 444_n$ arranged about the second conveyor 412b may be located near the proximal end $412b_P$ of the second conveyor 412b and downstream of the portion $422b_P$ of the foodstuff receiving surface 422b of the belt 414b of the second conveyor 412b that may be aligned with the width $414a_W$ of the belt 414a of the first conveyor 412a.

Each pair compression rollers $444_1, 444_2 \ldots 444_n$ of the one or more pairs compression rollers $444_1, 444_2 \ldots 444_n$ includes an upper compression roller $444_U$ and a lower compression roller $444_L$. The lower compression roller $444_L$ may be arranged adjacent the belt 414b of the second conveyor 412b. The surface of the belt 414b that the lower compression roller $444_L$ is arranged adjacent is opposite the foodstuff receiving surface 422b of the belt 414b of the second conveyor 412b.

The upper compression roller $444_U$ may be arranged in a spaced-apart relationship with respect to the foodstuff receiving surface 422b of the belt 414b of the second conveyor 412b. A gap or spacing between the upper compression roller $444_U$ and the foodstuff receiving surface 422b of the belt 414b of the second conveyor 412b is defined by a distance (see, e.g., $D_{444-1}, D_{444-1} \ldots D_{444-n}$). When more than one pair of compression rollers $444_1, 444_2 \ldots 444_n$ are included in the system 400, the distance $D_{444-1}, D_{444-1} \ldots D_{444-n}$ defining the gap or spacing between the upper compression roller $444_U$ and the foodstuff receiving surface 422b of the belt 414b of the second conveyor 412b for each successive pair of compression rollers $444_1, 444_2 \ldots 444_n$ may progressively decrease in dimension.

As one or both of the proximal roller 416b and the distal roller 418b rotatably drives the belt 414b of the second conveyor 412b according to the direction of arrow A2, the plurality of partially overlapped sheet segments SS are passed through the gaps or spacings defined by the distance $D_{444-1}, D_{444-1} \ldots D_{444-n}$. Because the partially overlapped sheet segments SS are defined by a height dimension that may be approximately equal to but slightly greater than the gap or spacing defined by the first distance $D_{444-1}$ associated with the first pair of compression rollers $444_1$, the upper compression roller $444_U$ of the first pair of compression rollers $444_1$ directly engages the upper surface $D1_U$ (defined by a first foodstuff deposit D1) of each sheet segment SS of the partially overlapped sheet segments SS for compressing the partially overlapped sheet segments SS between the upper compression roller $444_U$ of the first pair of compression rollers $444_1$ and the foodstuff receiving surface 422b of the belt 414b of the second conveyor 412b. As the partially overlapped sheet segments SS are passed through one or more subsequent gaps (e.g., $D_{444-1} \ldots D_{444-n}$) that progressively decrease in dimension, the partially overlapped sheet segments SS are further compressed in a substantially similar manner as described above.

As a result of being passed through the one or more gaps or spacings defined by the one or more pairs of compression rollers $444_1, 444_2 \ldots 444_n$ described above, most or all of the voids V (see, e.g., FIG. 20A) between opposing layers of the first foodstuff deposit D1 (i.e., defined by a gap or spacing between a portion of the rear surface $D1_R$ of the first foodstuff deposit D1 and a portion of the upper surface $D1_U$ of an adjacent first foodstuff deposit D1) are negated as a result of the one or more pairs of compression rollers $444_1$, $444_2 \ldots 444_n$ compressing and thereby vertically shifting the material defining the first foodstuff deposit D1 into the gap or spacing defined by the voids V. When the material defining the first foodstuff deposit D1 is vertically shifted, the portion of the rear surface $D1_R$ of the first foodstuff deposit D1 and the portion of the upper surface $D1_U$ of the adjacent first foodstuff deposit D1 bind together.

Furthermore, as the material defining the first foodstuff deposit D1 is shifted into the gap or spacing defined by the voids V, the second foodstuff deposit D2 in the form of the first strip ST1 and the second strip ST2 of each sheet segment SS are similarly vertically displaced into an area previously spatially occupied by the underlying (and vertically shifted) first foodstuff deposit D1. Unlike the examples described above where an elongated, pre-baked food product body B of FIGS. 4B, 8B is formed having the second foodstuff deposit D2 of each sheet segment SS ultimately appearing to merge into a substantially constant, uninterrupted layer as a result of the above-described vertical shifting, the second foodstuff deposit D2 of the elongated, pre-baked food product body B seen in FIG. 20B ultimately appears as an interrupted layer. The interruption of the layer defined by the second foodstuff deposit D2 results from the width $W_{ST}$ of each of the first strip ST1 and the second strip ST2 of each sheet segment SS being relatively thinner (e.g., approximately equal to an amount less than one-third (e.g., approximately one-fifth) of the width $W_{SS}$ of each sheet segment SS). As a result, when the one or more pairs of compression rollers $444_1$, $444_2$ . . . $444_n$ compress the partially overlapped sheet segments SS, with reference to FIG. 20A, an upper-most first foodstuff deposit D1 fills an upstream and downstream voids that are adjacent opposite edges of the second foodstuff deposit D2 in order to create the interrupted layer of the second foodstuff deposit D2 of the elongated, pre-baked food product body B (see, e.g., FIGS. 18B, 19 and 20B).

Referring to FIGS. 20A-20B, the elongated, pre-baked food product body B is generally defined by: (1) a first thickness segment defined by approximately the uppermost layer of the first foodstuff deposit D1, (2) a second thickness segment defined by a portion of one or both of neighboring layers of the first foodstuff deposit D1 and the interrupted second foodstuff deposit D2 defined by the first strip ST1, (3) a third thickness segment defined by approximately two layers of the first foodstuff deposit D1 that supports the second foodstuff deposit D2 and a lowermost layer of the first foodstuff deposit D1, (4) a fourth thickness segment defined by a portion of one or both of neighboring layers of the first foodstuff deposit D1 that supports the second foodstuff deposit D2 and the interrupted second foodstuff deposit D2 defined by the second strip ST2 and (5) a fifth thickness defined by one layer of the first foodstuff deposit D1 that supports the second foodstuff deposit D2. As seen in FIG. 20B, a rear surface of the third thickness segment defined by approximately one layer of the first foodstuff deposit D1 is supported upon the foodstuff receiving surface 422b of the belt 414b of the second conveyor 412b.

Referring to FIGS. 18A and 18B, the system 400 may also include a second slicing blade 446. The second slicing blade 446 may be located downstream of the one or more compression rollers $444_1$, $444_2$ . . . $444_n$ and upstream of the distal end $412b_D$ of the second conveyor 412b. The second slicing blade 446 may be arranged over a portion of the foodstuff receiving surface 422b of the belt 414b of the second conveyor 412b that supports the elongated, pre-baked food product body B. The second slicing blade 446 is defined by a width W446 (see, e.g., FIG. 18A) that may be greater than a width $W_B$ (see, e.g., FIG. 18A) of the elongated, pre-baked food product body B.

Referring to FIG. 18B, an actuator 448 may be connected to the second slicing blade 446 in order to impart a periodic plunging motion to the second slicing blade 446 for causing the second slicing blade 446 to penetrate through a thickness $T_B$ (see, e.g., FIG. 18B) of the elongated, pre-baked food product body B. The periodic plunging motion of the second slicing bade 446 in combination with the speed of rotation of one or both of the proximal roller 416b and the distal roller 418b rotatably driving the belt 414b according to the direction of arrow A2 results in the elongated, pre-baked food product body B being cut into a plurality of pre-baked food product body units U having any desirable shape, size or dimension.

Referring to FIGS. 18A and 18B, the system 400 may also include an oven 450. The oven 450 may be located downstream of the second slicing blade 446 and upstream of the distal end $412b_D$ of the second conveyor 412b. The oven 450 is arranged about the foodstuff receiving surface 422b of the belt 414b of the second conveyor 412b that supports the plurality of pre-baked food product body units U. As one or both of the proximal roller 416b and the distal roller 418b rotatably drives the belt 414b of the second conveyor 412b according to the direction of arrow A2, the plurality of pre-baked food product body units U are passed through the oven 450 in order to bake the plurality of pre-baked food product body units U.

Upon the plurality of pre-baked food product body units U exiting the oven 450 according to the direction of arrow A2, the plurality of pre-baked food product body units U may then be referred to as baked food products F. As one or both of the proximal roller 416b and the distal roller 418b rotatably drives the belt 414b of the second conveyor 412b according to the direction of arrow A2, the baked food products F may fall with the assistance of gravity off of the distal end $412b_D$ of the second conveyor 412b for subsequent processing or packaging.

Referring to FIGS. 17A-17B, 18A-18B, the system 400 may also include a controller 452. The controller 452 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)).

The controller 452 may be communicatively coupled (i.e., wirelessly connected or hardwired) to any of the above-described components (e.g., components 420a, 420b, 434, 438, 442, 444, 448, 450) of the system 400 in order to control any of the components. For example, the controller 452 may control the motors 420a/420b for controlling the rate of rotation of the one or both of the proximal roller 416a/416b and the distal roller 418a/418b that rotatably drives the belt 414a/414b of the first conveyor 412a/the second conveyor 412b. In another example, the controller 452 may control the rotation of the pair of metering rollers 434 in order to control the rate of the amount of the first foodstuff deposit D1 being metered upon the foodstuff receiving surface 422a of the belt 414a of the first conveyor 412a. In yet another example, the controller 452 may control an open/partially open/closed state of the foodstuff metering valve 438 of the second foodstuff hopper 436 in order to control the rate of the amount of the second foodstuff deposit D2 being metered upon the first foodstuff deposit D1. In an example, the controller 452 may control the state of the actuator 442/448 for controlling the frequency of the periodic plunging motion of the first slicing blade 440/the second slicing blade 446. In another example, the controller 452 may control the motor 420b for controlling a rate of rotation of one or more of the upper compression roller $444_U$ and the lower compression roller $444_L$ of the one or more pairs compression rollers $444_1$, $444_2$ . . . $444_n$. In yet another example, the controller 452 may control the on state, off state and/or temperature of the oven 450.

Referring to FIGS. 21A-21B and 22A-22B, an exemplary food product manufacturing system is shown generally at 500. FIGS. 21A-21B illustrates a first portion of the food product manufacturing system 500. FIGS. 22A-22B illustrates a second portion of the food product manufacturing system 500. The food product manufacturing system 500 is hereinafter referred to as "the system."

Figure 23:
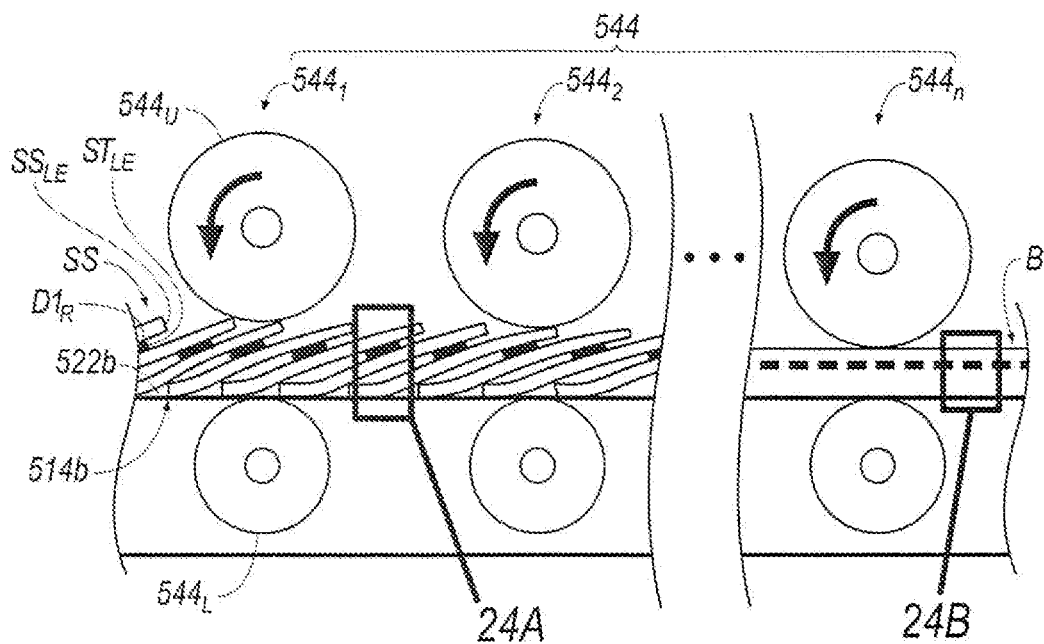
FIG. 23 is an enlarged view of a portion of the food product manufacturing system according to line 23 of FIG. 22B.
Figures 24A, 24B:
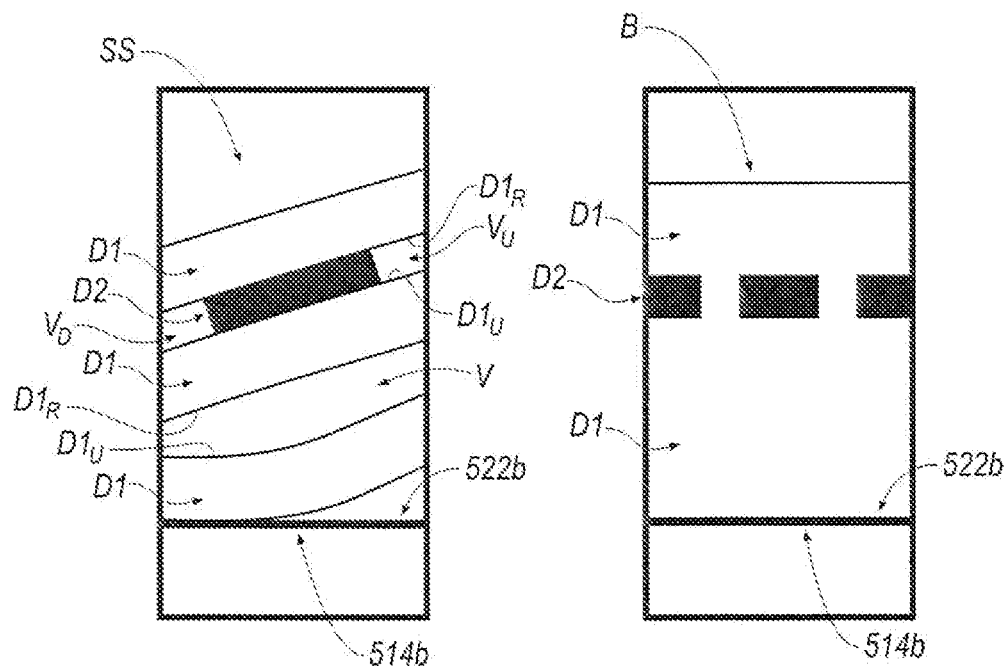
FIG. 24A is an enlarged view of a plurality of layers of first and second foodstuff deposits and a portion of the food product manufacturing system according to line 24A of FIG. 23.
FIG. 24B is an enlarged view of a plurality of layers of first and second foodstuff deposits defining a pre-baked food product body and a portion of the food product manufacturing system according to line 24B of FIG. 23.

The system 500 manufactures a baked food product F (see, e.g., FIGS. 22A-22B). The baked food product F is derived from at least a first foodstuff deposit D1 (see, e.g., FIGS. 21A, 21B) and a second foodstuff deposit D2 (see, e.g., FIGS. 21A, 21B). The baked food product F may be defined by several layers of the first foodstuff deposit D1 (e.g., approximately three layers of the first foodstuff deposit D1 as seen in FIGS. 23 and 24A) and at least one layer of the second foodstuff deposit D2 (e.g. approximately one layer of the second foodstuff deposit D2 as seen in FIGS. 23 and 24A). At least two layers of the first foodstuff deposit D1 encapsulates the at least one layer of the second foodstuff deposit D2. The first foodstuff deposit D1 may include dough. The second foodstuff deposit D2 may include a filling (such as, e.g., a fruit filling), a food coloring, a supplement (such as, e.g., a vitamin supplement) or the like.

As will be described in the following disclosure, the first foodstuff deposit D1 is metered in the form of an elongated sheet S (see, e.g., FIG. 21B). The second foodstuff deposit D2 is metered in the form of a row of periodically interrupted strips ST (see, e.g., FIG. 21B) upon the elongated sheet S. The elongated sheet S including the row of periodically interrupted strips ST metered there-upon is subsequently divided into a plurality of sheet segments SS (see, e.g., FIG. 21B).

As seen in FIGS. 21A-21B, 22A-22B, the row of periodically interrupted strips ST metered upon the elongated sheet S is numerically defined to include one row. Although one row of periodically interrupted strips ST is metered upon the elongated sheet S according to the example described at FIGS. 21A-21B, 22A-22B, the row of periodically interrupted strips ST may be numerically defined to include more than one row of periodically interrupted strips ST (see, e.g., FIGS. 17A-17B, 18A-18B where a first strip ST1 (i.e., a "first row") and a second strip ST2 (i.e., a "second row") are metered upon an elongated sheet 5). Therefore, the row of periodically interrupted strips ST may include any desirable number of rows of periodically interrupted strips ST such as, for example, one, two, three, fourth, five or "n" rows of periodically interrupted strips (whereby "n" is any integer).

Referring to FIG. 21B, each sheet segment SS is defined by a length $L_{SS}$. The elongated sheet S and each sheet segment SS is defined by a width $W_{SS}$. Because each sheet segment SS is derived from the elongated sheet S, and, therefore, are each defined to include the same width dimension $W_{SS}$, the reference numeral designating the width $W_{SS}$ of the sheet segment SS may be interchangeably utilized when describing the width of the elongated sheet S.

As seen in FIG. 21B, the row of periodically interrupted strips ST is defined by a width $W_{ST}$. The width $W_{ST}$ of the row of periodically interrupted strips ST is less than the width $W_{SS}$ of each sheet segment SS. Unlike the examples described above at FIGS. 1B and 5B, the width $W_{ST}$ of the row of periodically interrupted strips ST seen at FIG. 21B is not approximately equal to one-third of the width $W_{SS}$ of each sheet segment SS; rather, in an example, the width $W_{ST}$ of the row of periodically interrupted strips ST may be approximately equal to an amount less than one-third (e.g., approximately one-fifth) of the width $W_{SS}$ of each sheet segment SS. As will be described in the following disclosure at FIGS. 22B, 23, 24A, 24B, as a result of the comparatively smaller width $W_{ST}$ of the row of periodically interrupted strips ST of the example seen at FIG. 21B when compared to the width $W_{ST}$ of the at least one strip ST of the previously-described examples at FIGS. 1B and 5B, the layer of the second foodstuff deposit D2 of the baked food product F seen at FIGS. 23 and 24B may appear to be periodically interrupted by the first foodstuff deposit D1 as opposed to being formed to include a substantially constant, uninterrupted layer that separates an upper first foodstuff deposit layer D1 from a lower first foodstuff deposit later D1.

Furthermore, in order to realize the selective layering of the baked food product F described above at FIGS. 23 and 24A whereby at least two layers of the first foodstuff deposit D1 encapsulates the at least one layer of the second foodstuff deposit D2, the row of periodically interrupted strips ST may be selectively metered upon the elongated sheet S at a distance away from a leading edge $S_{LE}$ of the elongated sheet S. The distance away from the leading edge $S_{LE}$ may be defined by a portion $W_{SS-P}$ of the width $W_{SS}$ of the elongated sheet S/each sheet segment SS. The portion $W_{SS-P}$ of the width $W_{SS}$ of the elongated sheet S/each sheet segment SS may be defined by a distance between the leading edge $S_{LE}$ of the elongated sheet S and a leading edge $ST_{LE}$ of each strip of the row of periodically interrupted strips ST. In an example, the distance (i.e., the portion $W_{SS-P}$ of the width $W_{SS}$ of each sheet segment SS) between the leading edge $ST_{LE}$ of each strip of the row of periodically interrupted strips ST and the leading edge $SS_{LE}$ of the sheet segment SS may be approximately equal to one-fourth of the width $W_{SS}$ of the elongated sheet S/each sheet segment SS.

With reference to FIGS. 21A and 21B, the system 500 may include a first conveyor 512a having a proximal end $512a_P$ and a distal end $512a_D$. The first conveyor 512a may include a belt 514a defined by a width $514a_W$ (see, e.g., FIG. 21B). The belt 514a may be rotatably supported by a proximal roller 516a (see, e.g., FIG. 21A) located at the proximal end $512a_P$ of the first conveyor 512a and a distal roller 518a (see, e.g., FIG. 21A) located at the distal end $512a_D$ of the first conveyor 512a.

A motor 520a (see, e.g., FIG. 21A) may be connected to one or both of the proximal roller 516a and the distal roller 518a in order to impart rotation of one or both of the proximal roller 516a and the distal roller 518a such that one or both of the proximal roller 516a and the distal roller 518a may rotatably drive the belt 514a according to the direction of arrow A1. Depending upon the rotated state of the belt 514a relative to the proximal roller 516a and the distal roller 518a, a segment of the belt 514a may generally define a foodstuff receiving surface 522a.

With reference to FIGS. 21A-21B and 22A-22B, the system 500 may include a second conveyor 512b having a proximal end $512b_P$ and a distal end $512b_D$. The second conveyor 512b may include a belt 514b defined by a width $514b_W$ (see, e.g., FIG. 22A) that is rotatably supported by a proximal roller 516b (see, e.g., FIG. 22B) located at the proximal end $512b_P$ of the second conveyor 512b and a distal roller 518b (see, e.g., FIG. 22B) located at the distal end $512b_D$ of the second conveyor 512b.

A motor 520b (see, e.g., FIG. 22B) may be connected to one or both of the proximal roller 516b and the distal roller 518b in order to impart rotation of one or both of the proximal roller 516b and the distal roller 518b such that one or both of the proximal roller 516b and the distal roller 518b may rotatably drive the belt 514b according to the direction of arrow A2. Depending upon the rotated state of the belt 514b relative to the proximal roller 516b and the distal roller 518b, a segment of the belt 514b may generally define a foodstuff receiving surface 522b.

As seen in FIGS. 21B and 22A, the second conveyor 512b may be transversely arranged with respect to the first conveyor 12a. In an example configuration, the second conveyor 12b is orthogonally arranged with respect to the first conveyor 512a. Accordingly, the driven direction A2 of the belt 514b of the second conveyor 512b is orthogonal to the driven direction A1 of the belt 514a of the first conveyor 512a.

As seen in FIGS. 21A-21B and 22A, the proximal end $512b_P$ of the second conveyor 512b may be located near the distal end $512a_D$ of the first conveyor 512a. Furthermore, as seen in FIG. 22A, a portion $522b_P$ of the foodstuff receiving surface 522b of the belt 514b of the second conveyor 512b that may be located near the proximal end 512$b_P$ of the second conveyor 512$b$ may be approximately equal to and may be aligned with the width 514$a_W$ of the belt 514$a$ of the first conveyor 512$a$.

As seen in FIG. 21A, a first plane P1 may be aligned with and may extend across the foodstuff receiving surface 522$a$ of the belt 514$a$ of the first conveyor 512$a$. A second plane P2 may be aligned with and may extend across the foodstuff receiving surface 522$b$ of the belt 514$b$ of the second conveyor 512$b$. The second plane P2: (1) may not intersect with the first plane P1, (2) may be substantially parallel to the first plane P1, and (3) may be located spatially below the first plane P1 (i.e., the foodstuff receiving surface 522$b$ of the belt 514$b$ of the second conveyor 512$b$ may be located below the foodstuff receiving surface 522$a$ of the belt 514$a$ of the first conveyor 512$a$ such that sheet segments SS are permitted to fall with the assistance of gravity from the foodstuff receiving surface 522$a$ of the belt 514$a$ of the first conveyor 512$a$ to the foodstuff receiving surface 522$b$ of the belt 514$b$ of the second conveyor 512$b$ as the sheet segments SS are transported upon the belt 514$a$ according to the direction of the arrow A1). As will be described in the following disclosure, by arranging the proximal end 512$b_P$ of the second conveyor 512$b$ near the distal end 512$a_D$ of the first conveyor 512$a$, and, in conjunction with the arrangement the foodstuff receiving surface 522$b$ of the belt 514$b$ of the second conveyor 512$b$ spatially below the foodstuff receiving surface 522$a$ of the belt 514$a$ of the first conveyor 512$a$, successive sheet segments SS may be transported from the distal end 512$a_D$ of the first conveyor 512$a$ to the proximal end 512$b_P$ of the second conveyor 512$b$ in a partially overlapped fashion in order to encapsulate at least one layer of the second foodstuff deposit D2 between at least two layers of the first foodstuff deposit D1 as described above.

Referring to FIGS. 21A and 21B, the system 500 may also include a first foodstuff deposit hopper 524. The first foodstuff hopper 524 may be located near the proximal end 512$a_P$ of the first conveyor 512$a$ and may be arranged over a portion of the foodstuff receiving surface 522$a$ of the belt 514$a$ of the first conveyor 512$a$. The first foodstuff hopper 524 may include a sidewall 526 defining a foodstuff-containing cavity 528. Access to the foodstuff-containing cavity 528 is permitted by an upper opening 530 and a lower opening 532. The first foodstuff hopper 524 may also include a pair of metering rollers 534 that are arranged about the lower opening 532.

Prior to being arranged upon the foodstuff receiving surface 522$a$ of the belt 514$a$ of the first conveyor 512$a$, the first foodstuff deposit D1 may be stowed within the foodstuff-containing cavity 528. The first foodstuff deposit D1 is evacuated out of the foodstuff-containing cavity 528 by way of the lower opening 532 of the first foodstuff hopper 524. The motor 520$a$ may be connected to the pair of metering rollers 534 to impart rotation to the pair of metering rollers 534 for metering the first foodstuff deposit D1 upon the foodstuff receiving surface 522$a$ of the belt 514$a$ of the first conveyor 512$a$ at a controlled rate. The controlled metering rate of the first foodstuff deposit D1 in combination with a speed of rotation of one or both of the proximal roller 516$a$ and the distal roller 518$a$ rotatably driving the belt 514$a$ according to the direction of arrow A1 results in the first foodstuff deposit D1 being arranged upon the foodstuff receiving surface 522$a$ of the belt 514$a$ of the first conveyor 512$a$ in a substantially uniform thickness $T_{D1}$.

Referring to FIGS. 21A and 21B, the system 500 may also include a second foodstuff deposit hopper 536. The second foodstuff hopper 536 may be located downstream of the first foodstuff deposit hopper 524 and upstream of the distal end 512$a_D$ of the first conveyor 512$a$. The second foodstuff deposit hopper 536 may be arranged over a portion but not all of the width 514$a_W$ of the belt 514$a$ of the first conveyor 512$a$ defining the foodstuff receiving surface 522$a$ of the belt 514$a$ of the first conveyor 512$a$ that supports the first foodstuff deposit D1 metered from the first foodstuff hopper 524. The second foodstuff hopper 536 may be selectively spatially arranged over the portion of the foodstuff receiving surface 522$a$ of the belt 514$a$ of the first conveyor 512$a$ in order to meter the second foodstuff deposit D2 in the form of the row of periodically interrupted strips ST upon the first foodstuff deposit D1 at the above-described distance (see, e.g., $W_{SS-P}$) away from a leading edge $S_{LE}$ of the elongated sheet S. A metering rate of the second foodstuff deposit D2 defined by the row of periodically interrupted strips ST from the second foodstuff hopper 536 may be determined by, for example: (1) the physical characteristics (e.g. viscosity) of the second foodstuff deposit D2, (2) an open state, a partially open state or a closed state of a foodstuff metering valve 538 of the second foodstuff hopper 536 and (3) the speed of rotation of one or both of the proximal roller 516$a$ and the distal roller 518$a$ rotatably driving the belt 514$a$ according to the direction of arrow A1. As such, the second foodstuff deposit D2 may be metered upon the first foodstuff deposit D1 in a substantially uniform thickness $T_{D2}$. Furthermore, in order to form the row of periodically interrupted strips ST defined by the second foodstuff deposit D2, the foodstuff metering valve 538 is repeated oscillated in an open state and a closed state.

The system 500 may also include a foodstuff channel-forming member (not shown but similar to that shown and described above at reference numeral 154 in FIGS. 5A, 5B). The motor 520$a$ may be connected to the foodstuff channel-forming member to impart rotation to the foodstuff channel-forming member. Alternatively, or, in addition to being connected to the motor 520$a$, the foodstuff channel-forming member may be statically arranged over a portion of the foodstuff receiving surface 522$a$ of the belt 514$a$ of the first conveyor 512$a$ at a distance by a support member (not shown). As described above, the foodstuff channel-forming member interferes with the movement of the metered first foodstuff deposit D1 as the metered first foodstuff deposit D1 is transported upon the foodstuff receiving surface 522$a$ of the belt 514$a$ of the first conveyor 512$a$ downstream in the direction of the arrow A1 toward the foodstuff channel-forming member. Therefore, the foodstuff channel-forming member forms a second-foodstuff-deposit-receiving-channel D1$_C$ (see, e.g., FIGS. 5B, 5B', 5B", 5B'") in the upper surface D1$_U$ of the first foodstuff deposit D1. When the second foodstuff hopper 536 meters the second foodstuff deposit D2 upon the upper surface D1$_U$ of the first foodstuff deposit D1, the second foodstuff deposit D2 may be metered into and be substantially contained by the second-foodstuff-deposit-receiving-channel D1$_C$ formed in the upper surface D1$_U$ of the first foodstuff deposit D1. In a substantially similar manner as described above, when the amount of the second foodstuff deposit D2 metered by the second foodstuff hopper 536 may be selectively controlled in order to result in the second-foodstuff-deposit-receiving-channel D1$_C$ being: (1) entirely filled with the second foodstuff deposit D2 (as seen in, e.g., FIG. 5B'), (2) partially filled with the second foodstuff deposit D2 (as seen in, e.g., FIG. 5B") or (3) over-filled with the second foodstuff deposit D2 (as seen in, e.g., FIG. 5B'").

Referring to FIGS. 21A and 21B, the system 500 may also include a first slicing blade 540. The first slicing blade 540 may be located downstream of the second foodstuff deposit hopper 536 and upstream of the distal end $512a_D$ of the first conveyor 512a. The first slicing blade 540 may be arranged over a portion of the foodstuff receiving surface 522a of the belt 514a of the first conveyor 512a that supports the first foodstuff deposit D1 including the second foodstuff deposit D2 metered thereupon. The first slicing blade 540 is defined by a width $W_{540}$ (see, e.g., FIG. 21B) that may be greater than the width $W_{SS}$ of the elongated sheet S/each sheet segment SS.

Referring to FIG. 21A, an actuator 542 may be connected to the first slicing blade 540 in order to impart a periodic plunging motion to the first slicing blade 540 for causing the first slicing blade 540 to penetrate through both of the thickness $T_{D1}$ of the first foodstuff deposit D1 and the thickness $T_{D2}$ of the second foodstuff deposit D2. The periodic plunging motion of the first slicing bade 540 in combination with the speed of rotation of one or both of the proximal roller 516a and the distal roller 518a rotatably driving the belt 514a according to the direction of arrow A1 results in the elongated sheet S defined by the first foodstuff deposit D1 including the second foodstuff deposit D2 metered thereupon to be cut into a plurality of sheet segments SS with each sheet segment SS being defined by the length $L_{SS}$.

The speed of rotation of one or both of the proximal roller 516a and the distal roller 518a rotatably driving the belt 514a according to the direction of arrow A1 serially transports each sheet segment SS toward the distal end $512a_D$ of the first conveyor 512a. Once each sheet segment SS reaches the distal end $512a_D$ of the first conveyor 512a, each sheet segment SS is permitted to fall with the assistance of gravity from the foodstuff receiving surface 522a of the belt 514a of the first conveyor 512a toward the foodstuff receiving surface 522b of the belt 514b of the second conveyor 512b. The portion $522b_P$ of the foodstuff receiving surface 522b of the belt 514b of the second conveyor 512b that may be located near the proximal end $512b_P$ of the second conveyor 512b and aligned with the width $514a_W$ of the belt 514a of the first conveyor 512a at least partially directly receives each sheet segment SS from the distal end $512a_D$ of the first conveyor 512a.

The speed of rotation of one or both of the proximal roller 516b and the distal roller 518b rotatably driving the belt 514b of the second conveyor 512b according to the direction of arrow A2 transports each sheet segment SS toward the distal end $512b_D$ of the second conveyor 512b. As seen in FIG. 22B, the speed of rotation of one or both of the proximal roller 516b and the distal roller 518b rotatably driving the belt 514b of the second conveyor 512b may be selectively controlled (and, in some instances, is referenced from the speed of rotation of one or both of the proximal roller 516a and the distal roller 518a rotatably driving the belt 514a of the first conveyor 512a) in order to arrange: (1) a first portion of a rear surface $D1_R$ of the first foodstuff deposit D1 of a sheet segment SS transported from foodstuff receiving surface 522a of the belt 514a of the first conveyor 512a upon the foodstuff receiving surface 522b of the belt 514b of the second conveyor 512b and (2) a second portion of the rear surface $D1_R$ of the first foodstuff deposit D1 of the sheet segment SS transported from foodstuff receiving surface 522a of the belt 514a of the first conveyor 512a over: the second foodstuff deposit D2 and a portion of an upper surface $D1_U$ of a first foodstuff deposit D1 of a sheet segment SS that was immediately previously transported from foodstuff receiving surface 522a of the belt 514a of the first conveyor 512a upon the foodstuff receiving surface 522b of the belt 514b of the second conveyor 512b. As a result, a portion of the sheet segment SS that was previously transported from the foodstuff receiving surface 522a of the belt 514a of the first conveyor 512a to the foodstuff receiving surface 522b of the belt 214b of the second conveyor 512b may be partially laminated by the rear surface $D1_R$ of the first foodstuff deposit D1 of the sheet segment SS that is subsequently transported from the foodstuff receiving surface 522a of the belt 514a of the first conveyor 512a to the foodstuff receiving surface 522b of the belt 514b of the second conveyor 512b in order to thereby entirely encapsulate the second foodstuff deposit D2 between at least two layers of the first foodstuff deposit D1 defined by: (a) the first foodstuff deposit D1 directly supporting the second foodstuff deposit D2 and the rear surface $D1_R$ of the first foodstuff deposit D1 of the sheet segment SS that is subsequently transported from the foodstuff receiving surface 522a of the belt 514a of the first conveyor 512a to the foodstuff receiving surface 522b of the belt 514b of the second conveyor 512b. Furthermore, a portion of the rear surface $D1_R$ of the first foodstuff deposit D1 of the sheet segment SS that is subsequently transported from the foodstuff receiving surface 522a of the belt 514a of the first conveyor 512a to the foodstuff receiving surface 522b of the belt 514b of the second conveyor 512b is disposed over a portion of the upper surface $D1_U$ first foodstuff deposit D1 that: (1) does not support the second foodstuff deposit D2 and (2) is not defined by the width $W_{SS}$ of each sheet segment SS between the leading edge $ST_{LE}$ of the row of periodically interrupted strips ST and the leading edge $SS_{LE}$ of the sheet segment SS.

Referring to FIGS. 21B and 22A, regarding the encapsulation of the second foodstuff deposit D2 between at least two layers of the first foodstuff deposit D1 described above, in an example, the speed of rotation of one or both of the proximal roller 516b and the distal roller 518b rotatably driving the belt 514b of the second conveyor 512b may be selectively controlled in order to arrange a leading edge $SS_{LE}$ of a sheet segment SS in the immediate process of being transported from the foodstuff receiving surface 522a of the belt 514a of the first conveyor 512a to the foodstuff receiving surface 522b of the belt 514b of the second conveyor 512b at least directly over, or, alternatively, slightly ahead (as seen in FIGS. 22B and 23) of a leading edge $ST_{LE}$ of a leading strip of the row of periodically interrupted strips ST (defined by the second foodstuff deposit D2) of a sheet segment SS that was immediately previously transported from the foodstuff receiving surface 522a of the belt 514a of the first conveyor 512a to the foodstuff receiving surface 522b of the belt 514b of the second conveyor 512b. As a result, the row of periodically interrupted strips ST of each sheet segment SS that had been previously transported from the foodstuff receiving surface 522a of the belt 514a of the first conveyor 512a to the foodstuff receiving surface 522b of the belt 514b of the second conveyor 512b is covered by a portion of the rear surface $D1_R$ of the first foodstuff deposit D1 of a sheet segment SS that was subsequently deposited thereon.

Referring to FIGS. 22A and 22B, the system 500 may also include one or more pairs of compression rollers $544_1$, $544_2$ ... $544_n$ arranged about the belt 514b of the second conveyor 512b. If more than one pair of compression rollers $544_1$, $544_2$ ... $544_n$ are included in the system 500, the more than one pair of compression rollers $544_1$, $544_2$ ... $544_n$ may be referred to as a plurality of compression rollers 544. The one or more pairs of compression rollers $544_1, 544_2 \ldots 544_n$ arranged about the second conveyor $512b$ may be located near the proximal end $512b_P$ of the second conveyor $512b$ and downstream of the portion $522b_P$ of the foodstuff receiving surface $522b$ of the belt $514b$ of the second conveyor $512b$ that may be aligned with the width $514a_W$ of the belt $514a$ of the first conveyor $512a$.

Each pair compression rollers $544_1, 544_2 \ldots 544_n$ of the one or more pairs compression rollers $544_1, 544_2 \ldots 544_n$ includes an upper compression roller $544_U$ and a lower compression roller $544_L$. The lower compression roller $544_L$ may be arranged adjacent the belt $514b$ of the second conveyor $512b$. The surface of the belt $514b$ that the lower compression roller $544_L$ is arranged adjacent is opposite the foodstuff receiving surface $522b$ of the belt $514b$ of the second conveyor $512b$.

The upper compression roller $544_U$ may be arranged in a spaced-apart relationship with respect to the foodstuff receiving surface $522b$ of the belt $514b$ of the second conveyor $512b$. A gap or spacing between the upper compression roller $544_U$ and the foodstuff receiving surface $522b$ of the belt $514b$ of the second conveyor $512b$ is defined by a distance (see, e.g., $D_{544\text{-}1}, D_{544\text{-}1} \ldots D_{544\text{-}n}$). When more than one pair of compression rollers $544_1, 544_2 \ldots 544_n$ are included in the system $500$, the distance $D_{544\text{-}1}, D_{544\text{-}1} \ldots D_{544\text{-}n}$ defining the gap or spacing between the upper compression roller $544_U$ and the foodstuff receiving surface $522b$ of the belt $514b$ of the second conveyor $512b$ for each successive pair of compression rollers $544_1, 544_2 \ldots 544_n$ may progressively decrease in dimension.

As one or both of the proximal roller $516b$ and the distal roller $518b$ rotatably drives the belt $514b$ of the second conveyor $512b$ according to the direction of arrow $A2$, the plurality of partially overlapped sheet segments SS are passed through the gaps or spacings defined by the distance $D_{544\text{-}1}, D_{544\text{-}1} \ldots D_{544\text{-}n}$. Because the partially overlapped sheet segments SS are defined by a height dimension that may be approximately equal to but slightly greater than the gap or spacing defined by the first distance $D_{544\text{-}1}$ associated with the first pair of compression rollers $544_1$, the upper compression roller $544_U$ of the first pair of compression rollers $544_1$ directly engages the upper surface $D1_U$ (defined by a first foodstuff deposit D1) of each sheet segment SS of the partially overlapped sheet segments SS for compressing the partially overlapped sheet segments SS between the upper compression roller $544_U$ of the first pair of compression rollers $544_1$ and the foodstuff receiving surface $522b$ of the belt $514b$ of the second conveyor $512b$. As the partially overlapped sheet segments SS are passed through one or more subsequent gaps (e.g., $D_{544\text{-}1} \ldots D_{544\text{-}n}$) that progressively decrease in dimension, the partially overlapped sheet segments SS are further compressed in a substantially similar manner as described above.

As a result of being passed through the one or more gaps or spacings defined by the one or more pairs of compression rollers $544_1, 544_2 \ldots 544_n$ described above, most or all of the voids V, $V_U$, $V_D$ (see, e.g., FIG. 24A) between opposing layers of the first foodstuff deposit D1 (i.e., defined by a gap or spacing between a portion of the rear surface $D1_R$ of the first foodstuff deposit D1 and a portion of the upper surface $D1_U$ of an adjacent first foodstuff deposit D1) are negated as a result of the one or more pairs of compression rollers $544_1, 544_2 \ldots 544_n$ compressing and thereby vertically shifting the material defining the first foodstuff deposit D1 into the gap or spacing defined by the voids V, $V_U$, $V_D$. When the material defining the first foodstuff deposit D1 is vertically shifted, the portion of the rear surface $D1_R$ of the first foodstuff deposit D1 and the portion of the upper surface $D1_U$ of the adjacent first foodstuff deposit D1 bind together.

Furthermore, as the material defining the first foodstuff deposit D1 is shifted into the gap or spacing defined by the voids V, $V_U$, $V_D$, the second foodstuff deposit D2 in the form of the row of periodically interrupted strips ST of each sheet segment SS is similarly vertically displaced into an area previously spatially occupied by the underlying (and vertically shifted) first foodstuff deposit D1. Unlike the examples described above where an elongated, pre-baked food product body B of FIGS. 4B, 8B is formed having the second foodstuff deposit D2 of each sheet segment SS ultimately appearing to merge into a substantially constant, uninterrupted layer as a result of the above-described vertical shifting, the second foodstuff deposit D2 of the elongated, pre-baked food product body B seen in FIG. 24B ultimately appears as an interrupted layer. The interruption of the layer defined by the second foodstuff deposit D2 results from one or both of the width $W_{ST}$ of the row of periodically interrupted strips ST of each sheet segment SS being relatively thinner (e.g., approximately equal to an amount less than one-third (e.g., approximately one-fifth) of the width $W_{SS}$ of each sheet segment SS) and the distance between each strip of the row of periodically interrupted strips ST. As a result, when the one or more pairs of compression rollers $544_1, 544_2 \ldots 544_n$ compress the partially overlapped sheet segments SS, with reference to FIG. 24A, an upper-most first foodstuff deposit D1 fills an upstream void $V_U$ (see, e.g., FIG. 24A) and a downstream void $V_D$ (see, e.g., FIG. 24A) that are adjacent opposite edges of the second foodstuff deposit D2 in order to create the interrupted layer of the second foodstuff deposit D2 of the elongated, pre-baked food product body B (see, e.g., FIGS. 22B, 23 and 24B).

Referring to FIGS. 24A-24B, the elongated, pre-baked food product body B is generally defined by: (1) a first thickness segment defined by approximately the uppermost layer of the first foodstuff deposit D1, (2) a second thickness segment defined by a portion of the uppermost layer of the first foodstuff deposit D1 and the interrupted second foodstuff deposit D2 and (3) a third thickness segment defined by approximately two layers of the first foodstuff deposit D1 that supports the second foodstuff deposit D2 and a lower-most layer of the first foodstuff deposit D1. As seen in FIG. 24B, a rear surface of the third thickness segment defined by approximately two layers of the first foodstuff deposit D1 is supported upon the foodstuff receiving surface $522b$ of the belt $514b$ of the second conveyor $512b$.

Referring to FIGS. 22A and 22B, the system $500$ may also include a second slicing blade $546$. The second slicing blade $546$ may be located downstream of the one or more compression rollers $544_1, 544_2 \ldots 544_n$ and upstream of the distal end $512b_D$ of the second conveyor $512b$. The second slicing blade $546$ may be arranged over a portion of the foodstuff receiving surface $522b$ of the belt $514b$ of the second conveyor $512b$ that supports the elongated, pre-baked food product body B. The second slicing blade $546$ is defined by a width $W_{546}$ (see, e.g., FIG. 22A) that may be greater than a width $W_B$ (see, e.g., FIG. 22A) of the elongated, pre-baked food product body B.

Referring to FIG. 22B, an actuator $548$ may be connected to the second slicing blade $546$ in order to impart a periodic plunging motion to the second slicing blade $546$ for causing the second slicing blade $546$ to penetrate through a thickness $T_B$ (see, e.g., FIG. 22B) of the elongated, pre-baked food product body B. The periodic plunging motion of the second slicing bade $546$ in combination with the speed of rotation of one or both of the proximal roller $516b$ and the distal roller 518b rotatably driving the belt 514b according to the direction of arrow A2 results in the elongated, pre-baked food product body B being cut into a plurality of pre-baked food product body units U having any desirable shape, size or dimension.

Referring to FIGS. 22A and 22B, the system 500 may also include an oven 550. The oven 550 may be located downstream of the second slicing blade 546 and upstream of the distal end 512$b_D$ of the second conveyor 512b. The oven 550 is arranged about the foodstuff receiving surface 522b of the belt 514b of the second conveyor 512b that supports the plurality of pre-baked food product body units U. As one or both of the proximal roller 516b and the distal roller 518b rotatably drives the belt 514b of the second conveyor 512b according to the direction of arrow A2, the plurality of pre-baked food product body units U are passed through the oven 550 in order to bake the plurality of pre-baked food product body units U.

Upon the plurality of pre-baked food product body units U exiting the oven 550 according to the direction of arrow A2, the plurality of pre-baked food product body units U may then be referred to as baked food products F. As one or both of the proximal roller 516b and the distal roller 518b rotatably drives the belt 514b of the second conveyor 512b according to the direction of arrow A2, the baked food products F may fall with the assistance of gravity off of the distal end 512$b_D$ of the second conveyor 512b for subsequent processing or packaging.

Referring to FIGS. 21A-21B, 22A-22B, the system 500 may also include a controller 552. The controller 552 may be a computing resource such as, for example, a digital computer, and may include, but is not limited to: one or more electronic digital processors or central processing units (CPUs) in communication with one or more storage resources (e.g., memory, flash memory, dynamic random access memory (DRAM), phase change memory (PCM), and/or disk drives having spindles)).

The controller 552 may be communicatively coupled (i.e., wirelessly connected or hardwired) to any of the above-described components (e.g., components 520a, 520b, 534, 538, 542, 544, 548, 550) of the system 500 in order to control any of the components. For example, the controller 552 may control the motors 520a/520b for controlling the rate of rotation of the one or both of the proximal roller 516a/516b and the distal roller 518a/518b that rotatably drives the belt 514a/514b of the first conveyor 512a/the second conveyor 512b. In another example, the controller 552 may control the rotation of the pair of metering rollers 534 in order to control the rate of the amount of the first foodstuff deposit D1 being metered upon the foodstuff receiving surface 522a of the belt 514a of the first conveyor 512a. In yet another example, the controller 552 may control an open/partially open/closed state of the foodstuff metering valve 538 of the second foodstuff hopper 536 in order to control the rate of the amount of the second foodstuff deposit D2 being metered upon the first foodstuff deposit D1. In an example, the controller 552 may control the state of the actuator 542/548 for controlling the frequency of the periodic plunging motion of the first slicing blade 540/the second slicing blade 546. In another example, the controller 552 may control the motor 520b for controlling a rate of rotation of one or more of the upper compression roller 544$_U$ and the lower compression roller 544$_L$ of the one or more pairs compression rollers 544$_1$, 544$_2$ ... 544$_n$. In yet another example, the controller 552 may control the on state, off state and/or temperature of the oven 550.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for manufacturing a food product, comprising:
    transporting a first elongated sheet of a first foodstuff in a first driven direction along a first conveyor, the first elongated sheet having a first width extending from a first edge extending in a direction parallel to the first driven direction to a second edge formed on an opposite side of the first elongated sheet from the first edge;
    while transporting the first elongated sheet in the first direction:
        forming, using a foodstuff channel-forming member, a second-foodstuff-deposit-receiving channel in an upper surface of the first elongated sheet, wherein:

the foodstuff channel-forming member is statically arranged at a height above the first conveyor that is less than a thickness of the first elongated sheet;

while forming the second-foodstuff-deposit-receiving channel and with the foodstuff channel-forming member statically arranged at the height above the first conveyor, movement of the first elongated sheet relative to the foodstuff channel-forming member consists of movement in the first direction; and a channel edge of the second-foodstuff-deposit-receiving channel nearest to the first edge of the first elongated sheet is spaced from the first edge of the first elongated sheet;

depositing a strip of a second foodstuff upon a portion of the upper surface of the first elongated sheet in a direction parallel to the first driven direction, wherein depositing the strip of the second foodstuff upon the portion of the upper surface includes depositing the second foodstuff into the second-foodstuff-deposit-receiving channel, the strip having a second width (i) extending from a third edge extending in a direction parallel to the first drive direction to a fourth edge formed on an opposite side of the strip from the third edge, and (ii) less than or equal to approximately one-third of the first width, wherein the third edge of the strip is spaced apart from the first edge of the first elongated sheet by a first distance equal to approximately one-fourth of the first width; and separating the first elongated sheet into a series of sheet segments each including the first foodstuff and the strip of the second foodstuff;

serially transporting each of the sheet segments from the first conveyor moving in the first driven direction to a second conveyor moving in a second driven direction that is transverse to the first driven direction, whereby each subsequent sheet segment is stacked upon an immediately preceding sheet segment and the strip of the second foodstuff of the immediately preceding sheet segment encapsulated between the first foodstuff of the immediately preceding sheet segment and the first foodstuff of the subsequent sheet segment; and compressing the subsequent and immediately preceding sheet segments to form a second elongated sheet including a layer of the second foodstuff encapsulated between a first layer of the first foodstuff and a second layer of the first foodstuff; and separating the second elongated sheet into a plurality of food product body units.

2. The method of claim 1, wherein forming the second elongated sheet includes:
forming a first thickness segment defined by approximately one layer of the first foodstuff;
forming a second thickness segment defined by approximately one uninterrupted layer of the second foodstuff; and
forming a third thickness segment defined by approximately two layers of the first foodstuff.

3. The method of claim 1, wherein forming the second elongated sheet includes:
forming a first thickness segment defined by approximately one layer of the first foodstuff;
forming a second thickness segment defined by, in part, approximately one interrupted layer of the second foodstuff; and forming a third thickness segment defined by approximately two layers of the first foodstuff, wherein the second foodstuff defining the second thickness segment is interrupted with portions of the first foodstuff extending into the second thickness segment from one or both of the first thickness segment and the third thickness segment.

4. The method of claim 1, wherein forming the second elongated sheet includes:
forming a first thickness segment defined by approximately one layer of the second foodstuff;
forming a second thickness segment defined by approximately one layer of the first foodstuff;
forming a third thickness segment defined by approximately one layer of the second foodstuff; and
forming a fourth thickness segment defined by approximately two layers of the first foodstuff.

5. The method of claim 1, wherein forming the second elongated sheet includes:
forming a first thickness segment defined by approximately one layer of the first foodstuff;
forming a second thickness segment defined by, in part, by approximately one interrupted layer of the second foodstuff;
forming a third thickness segment defined by approximately two layers of the first foodstuff;
forming a fourth thickness segment defined by, in part, approximately one interrupted layer of the second foodstuff; and
forming a fifth thickness segment defined by approximately one layer of the first foodstuff.

6. The method of claim 1, wherein prior to depositing the strip of the second foodstuff upon the portion of the upper surface of the first elongated sheet, the method further comprises:
selectively arranging a second foodstuff dispenser over a portion of the first width of the first elongated sheet for depositing the second foodstuff upon the portion of the upper surface of the first elongated sheet in a form of the strip.

7. The method of claim 2, wherein the first thickness segment is an uppermost segment of the second elongated sheet, and wherein the third thickness segment is a lowermost segment of the second elongated sheet, wherein the second thickness segment is disposed between the first thickness segment and the third thickness segment.

8. The method of claim 3, wherein the first thickness segment is an uppermost segment of the second elongated sheet, and wherein the third thickness segment is a lowermost segment of second elongated sheet, wherein the second thickness segment is disposed between the first thickness segment and the third thickness segment.

9. The method of claim 4, wherein the first thickness segment is an uppermost segment of the second elongated sheet, and wherein the fourth thickness segment is a lowermost segment of the second elongated sheet, wherein the second thickness segment is disposed between the first thickness segment and the third thickness segment, wherein the third thickness segment is disposed between the second thickness segment and the fourth thickness segment.

10. The method of claim 5, wherein the second foodstuff defining the second thickness segment is interrupted with portions of the first foodstuff extending into the second thickness segment from one or both of the first thickness segment and the third thickness segment, wherein the second foodstuff defining the fourth thickness segment is interrupted with portions of the first foodstuff extending into the fourth thickness segment from one or both of the third thickness segment and the fifth thickness segment, wherein the first thickness segment is an uppermost segment of the second elongated sheet and wherein the fifth thickness segment is a lowermost segment of the second elongated sheet, wherein the second thickness segment is disposed between the first thickness segment and the third thickness segment, wherein the third thickness segment is disposed between the second thickness segment and the fourth thickness segment, wherein the fourth thickness segment is disposed between the third thickness segment and the fifth thickness segment.

11. The method of claim 1, wherein depositing the strip of the second foodstuff upon the portion of the upper surface of the first elongated sheet includes:
flowing the second foodstuff without any interruption such that that one strip of the second foodstuff defines an uninterrupted strip.

12. The method of claim 1, wherein depositing the strip of the second foodstuff upon the portion of the upper surface of the first elongated sheet includes:
periodically interrupting a flow of the second foodstuff such that that one strip of the second foodstuff defines an interrupted strip.

13. The method of claim 6, wherein the at least one strip of the second foodstuff includes a first strip and a second strip, wherein each of the first strip and the second strip of the second foodstuff are each defined by a width that is less than a width of the first elongated sheet.

14. The method of claim 13, wherein the width of each of the first strip and the second strip of the second foodstuff is approximately equal to one-fifth of the width of the first elongated sheet.

15. The method of claim 1, further comprising: entirely filling the second-foodstuff-deposit-receiving channel with the second foodstuff.

16. The method of claim 1, further comprising: partially filling the second-foodstuff-deposit-receiving channel with the second foodstuff.

17. The method of claim 1, further comprising: overfilling the second-foodstuff-deposit-receiving channel with the second foodstuff.

* * * * *